(12) United States Patent
Igarashi et al.

(10) Patent No.: US 6,982,933 B2
(45) Date of Patent: *Jan. 3, 2006

(54) RECORDING AND/OR REPRODUCING APPARATUS AND RECORDING MEDIUM CARTRIDGE HOLDER

(75) Inventors: Takeshi Igarashi, Kanagawa (JP);
Yutaka Fukuyama, Kanagawa (JP);
Takashi Suezaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/096,430

(22) Filed: Apr. 1, 2005

(65) Prior Publication Data

US 2005/0174683 A1    Aug. 11, 2005

Related U.S. Application Data

(60) Continuation of application No. 10/435,974, filed on May 12, 2003, now Pat. No. 6,901,035, which is a division of application No. 09/851,821, filed on May 9, 2001, now Pat. No. 6,657,925.

(30) Foreign Application Priority Data

May 11, 2000    (JP)    ............................ P2000-138748

(51) Int. Cl.
*G11B 11/00*    (2006.01)
(52) U.S. Cl. ................ 369/13.21; 720/639; 360/99.06; 369/13.34
(58) Field of Classification Search ............ 369/13.21, 369/13.34; 720/639

See application file for complete search history.

(56) References Cited

U.S. PATENT DOCUMENTS

| 4,989,106 | A | * | 1/1991 | Uehara | .................... | 360/99.02 |
| 5,130,869 | A | * | 7/1992 | Kikuya et al. | ........... | 360/99.06 |
| 5,771,217 | A | * | 6/1998 | Takahashi et al. | .......... | 720/602 |
| 5,805,552 | A | * | 9/1998 | Tozune et al. | .............. | 720/610 |
| 5,995,469 | A | * | 11/1999 | Uwabo et al. | .............. | 720/635 |
| 6,272,092 | B1 | * | 8/2001 | Arai et al. | .................. | 720/635 |
| 6,370,088 | B1 | * | 4/2002 | Nakaya | ................... | 369/13.21 |
| 6,597,533 | B1 | * | 7/2003 | Tanishima | ............... | 360/99.06 |

* cited by examiner

*Primary Examiner*—Tan Dinh
(74) *Attorney, Agent, or Firm*—Jay H. Maioli

(57)    ABSTRACT

A recording and/or reproducing apparatus for recording and/or reproducing signals on and/or from a recording medium includes a recording and/or reproducing portion for recording and/or reproducing signals on and/or from the recording medium, a carrying portion for carrying the recording medium, and first and second sliders. The first slider is movable in one direction for moving the carrying portion together with the recording medium up to a specific withdrawal position. The second slider is movable in a direction being substantially the same as the one direction for moving the recording medium carried by the carrying portion to a recording and/or reproducing position corresponding to a position of the recording and/or reproducing portion. The first slider and the second slider are overlapped to each other in the vertical direction.

1 Claim, 52 Drawing Sheets

F I G. 24
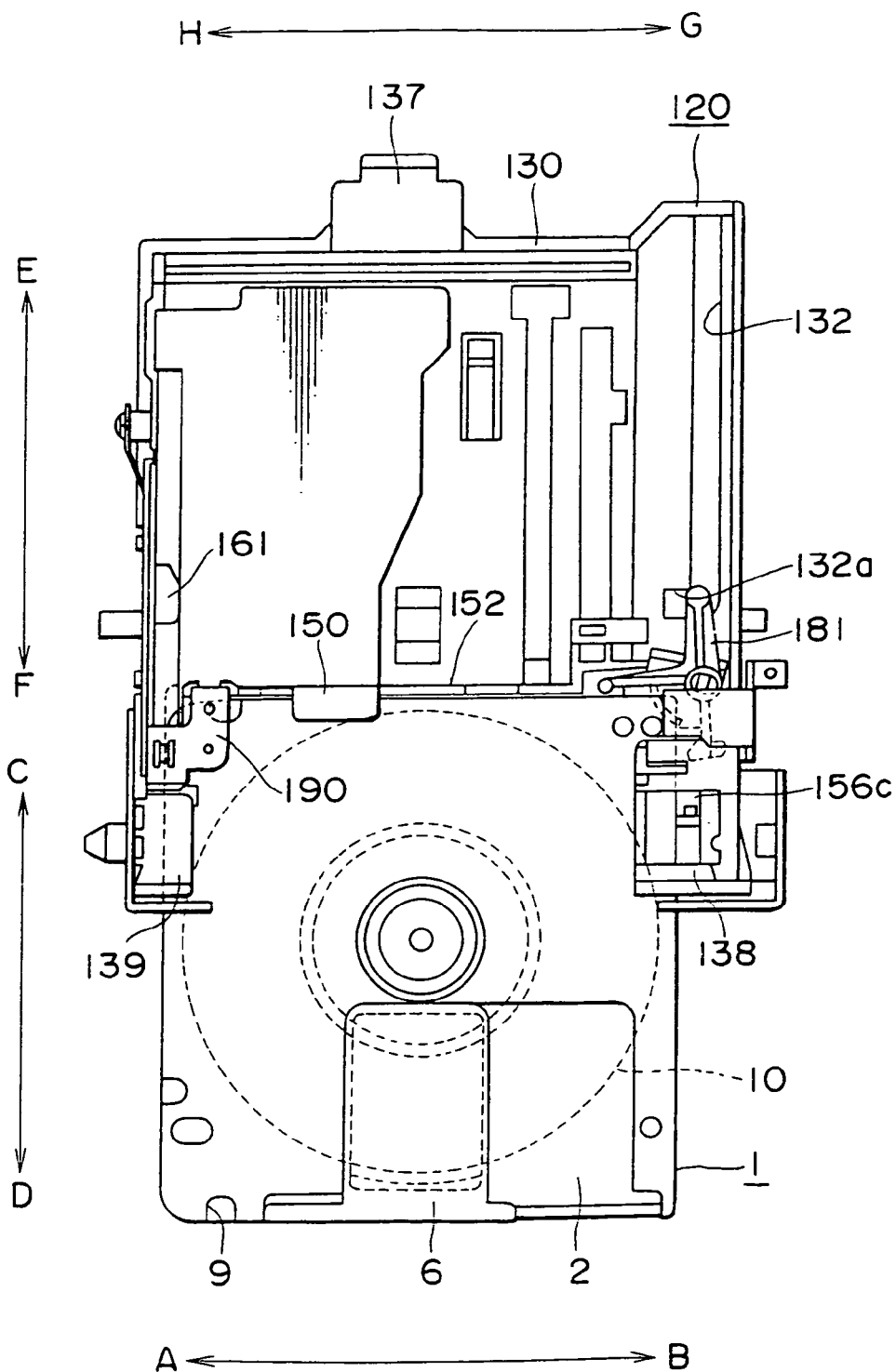

RECORDING AND/OR REPRODUCING APPARATUS AND RECORDING MEDIUM CARTRIDGE HOLDER

This is a continuation of prior application Ser. No. 10/435,974 filed May 12, 2003 now U.S. Pat. No. 6,901,035 which is a division of application Ser. No. 09/851,821, filed May 9, 2001, now U.S. Pat. No. 6,657,925.

BACKGROUND OF THE INVENTION

The present invention relates to a new recording and/or reproducing apparatus and a new recording medium cartridge holder. In particular, the present invention relates to a technique for realizing space saving of a recording and/or reproducing apparatus, and to a technique for preventing improper insertion of a recording medium cartridge, that is, insertion of a recording medium cartridge in an orientation other than a normal orientation in a recording medium cartridge holder with a simple mechanism.

In recording and/or reproducing apparatuses for recording and/or reproducing signals on and/or from a recording medium disk, it is required to provide a loading mechanism, that is, a mechanism for withdrawing the recording medium disk to a specific position in an apparatus main body and mounting the recording medium disk to a specific mounting position, and also to provide a mode formation mechanism, that is, a mechanism for bringing each of members into a specific state suitable for a reproducing or recording mode.

In related art recording and/or reproducing apparatuses, the above-described loading mechanism and mode formation mechanism have been provided at separate locations, particularly, as viewed from above, as individual mechanisms. Accordingly, there has arisen a problem that since these mechanisms are disposed at respective spaces, it is required to ensure a large space for these mechanisms in the apparatus.

On the other hand, there has been known a recording medium cartridge configured such that a recording medium is contained in a flat cartridge case formed into a rectangular shape having a long-side and short-side as viewed from above, wherein the recording medium cartridge is inserted with its long-side portion directed forwardly in the insertion direction.

In a recording and/or reproducing apparatus using the above-described recording medium cartridge, it is required to prevent the insertion of the recording medium cartridge in an orientation other than a normal orientation, that is, improper insertion of the recording medium cartridge in a recording medium cartridge holding portion for holding the recording medium cartridge.

Various mechanisms have been proposed for preventing insertion of a recording medium cartridge in a cartridge holder of a recording and/or reproducing apparatus with the front and rear sides or the upper and lower sides erroneously reversed to each other; however, effective means for preventing insertion of a recording medium cartridge in a cartridge holder with a short-side portion thereof directed forwardly in the insertion direction have been little proposed, and the proposed means have presented problems in terms of complicated mechanism and poor usability.

SUMMARY OF THE INVENTION

A first object of the present invention is to provide a recording and/or reproducing apparatus capable of realizing space saving.

A second object of the present invention is to provide a recording and/or reproducing apparatus capable of certainly preventing a recording medium cartridge, in which a recording medium is contained in a flat cartridge case formed into a rectangular shape having a long-side and short-side as viewed from above, the recording medium cartridge being inserted into a recording medium cartridge holding portion with its long-side portion directed forwardly in the insertion direction, from being inserted in the recording medium cartridge holding portion in an orientation other than a normal orientation, with a simple structure.

To achieve the above first object, according to a first aspect of the present invention, there is provided a recording and/or reproducing apparatus for recording and/or reproducing signals on and/or from a recording medium, including: recording and/or reproducing means for recording and/or reproducing signals on and/or from the recording medium; carrying means for carrying the recording medium; a first slider movable in one direction for moving the carrying means together with the recording medium up to a specific withdrawal position; and a second slider movable in a direction being substantially the same as the one direction for moving the recording medium carried by the carrying means to a recording and/or reproducing position corresponding to a position of the recording and/or reproducing means; wherein the first slider and the second slider are overlapped to each other in the vertical direction.

With this configuration, since the first slider mainly used for loading operation and the second slider mainly used for mode formation operation are overlapped to each other, it is possible to realize space saving, particularly, as seen from above.

The recording and/or reproducing means preferably includes a disk rotation drive mechanism for rotating a disk as the recording medium; and a signal recording and/or reproducing mechanism for recording and/or reproducing signals on and/or from the disk while being moved in the radial direction of the disk rotated by the disk rotation drive mechanism.

The first slider and the second slider are preferably driven by one motor.

With this configuration, it is possible to further enhance the space saving effect.

Preferably, the recording and/or reproducing means includes a magnetic head device for recording signals on the disk; and the second slider is further movable, after moving the disk to the recording and/or reproducing position, in the one direction for moving the magnetic head device to a position corresponding to a position of the disk mounted on the disk rotation drive mechanism.

With this configuration, it is possible to realize two different modes only by changing the movement amount of the second slider in the one direction, and hence to obtain a complicated function with a simple structure.

Preferably, the recording and/or reproducing apparatus further includes a disk holder having the carrying means; wherein the disk holder includes a main supporting member for movably supporting the carrying means, the main supporting member being movable in the direction perpendicular to a main body of the recording and/or reproducing apparatus; and the main supporting member is moved from the upper end to the lower end of a movement range thereof by movement of the second slider from the initial position to a specific position, to mount the disk supported by the carrying means on the disk rotation drive mechanism.

With this configuration, it is possible to make the movement space of the disk holder smaller than that of a related art disk holder turned to mount/dismount a recording medium disk on/from a disk rotation drive mechanism, and hence to reduce a space, particularly, in the height direction, of the recording and/or reproducing apparatus of the present invention.

Preferably, each of the first slider and the second slider has rack teeth meshed with a pinion gear rotated by the one motor; until the recording medium is withdrawn from the initial position to the specific withdrawal position, only the rack teeth of the first slider are meshed with the pinion gear and only the first slider is moved by rotation of the pinion gear; at the final stage of the movement of the first slider, the second slider is pushed by the first slider to be moved in the one direction, whereby the rack teeth of the second slider are meshed with the pinion gear and the rack teeth of the first slider are removed from the pinion gear; and only the second slider is moved in the one direction by further rotation of the pinion gear.

With this configuration, it is possible to move the two sliders in sequence at any time with a simple mechanism, and hence to enhance the space saving effect.

To achieve the above second object, according to a second aspect of the present invention, there is provided a recording and/or reproducing apparatus including: a recording medium cartridge holding portion in which a recording medium cartridge, configured such that a recording medium is contained in a flat cartridge case formed into a rectangular shape having a long-side and short-side, is inserted with its long-side portion directed forwardly in the insertion direction. The recording medium cartridge holding portion includes a main support portion; a carrying portion, supported on the main support portion in such a manner as to be movable from a standby position to a specific withdrawal position, for withdrawing the recording medium cartridge held at the standby position to the specific withdrawal position; a lock portion for locking the carrying portion at the standby position; and an insertion restricting portion for prohibiting the passing of the recording medium cartridge inserted in an orientation other than a normal orientation; wherein the lock portion releases the locking of the carrying portion by the recording medium cartridge passing through the insertion restricting portion.

With this configuration, since the lock of the carrying portion cannot be released unless the recording medium cartridge passes through the insertion restricting portion. Accordingly, in the case of insertion of the recording medium cartridge with its long-side portion directed forwardly in the insertion direction, since the recording medium cartridge cannot pass through the insertion restricting portion unless the cartridge is in a normal orientation, the improper insertion of the recording medium cartridge can be certainly prevented. In the case of insertion of the recording medium cartridge with its short-side portion directed forwardly in the insertion direction, even if the cartridge is inserted to a position deeper than a position at which the insertion restricting portion is formed while bypassing the insertion restricting portion, since the cartridge does not pass through the insertion restricting portion, the locking of the carrying portion cannot be released, with a result that the insertion of the cartridge can be certainly prevented. Further, such a structure can be simply realized only by disposing the lock portion at the position at which the locking by the lock portion is released by the recording medium cartridge passing through the insertion restricting portion.

Preferably, the carrying portion includes a turning lever turned between a first position and a second position; and the turning lever is turned from the first position to the second position by the recording medium cartridge passing through the insertion restricting portion, to release the locking of the carrying portion to the main support portion.

With this configuration, it is possible to carry the recording medium cartridge to the specific withdrawal position while certainly holding it by the carrying portion.

Preferably, the turning lever includes a first arm portion to be engaged to a bent portion of a guide groove formed in the main support portion; a second arm portion to be engaged in a hole portion formed in the main support portion; and a third arm portion provided at a position at which the third arm portion crosses the first arm portion and the second arm portion at approximately right angles; wherein when the third arm portion is turned by the contact thereof with the recording medium cartridge passing through the insertion restricting portion, the engagement of the first arm portion in the bent portion is released and the first arm portion is engaged in a sliding groove provided in such a manner as to be continuous to the bent portion and to be substantially in parallel to the movement direction of the carrying portion, and also the engagement of the second arm portion in the hole portion is released and the second arm portion is engaged with the recording medium cartridge, whereby the locking of the carrying portion at the standby position is released; and the carrying portion is allowed to carry the recording medium cartridge from the standby position to the withdrawal position.

With this configuration, since the carrying portion is not pushed by the recording medium cartridge until the carrying portion holds the recording medium cartridge, it is possible to certainly hold the recording medium cartridge on the carrying portion.

BREIF DESCRIPTION OF THE DRAWINGS

FIG. 24 is a bottom view of the cartridge holder showing a state in which the disk cartridge is inserted in the cartridge holder with the side surface of the disk cartridge erroneously directed forwardly;

DESCRIPTION OF THE INVENTION

Figure 1:
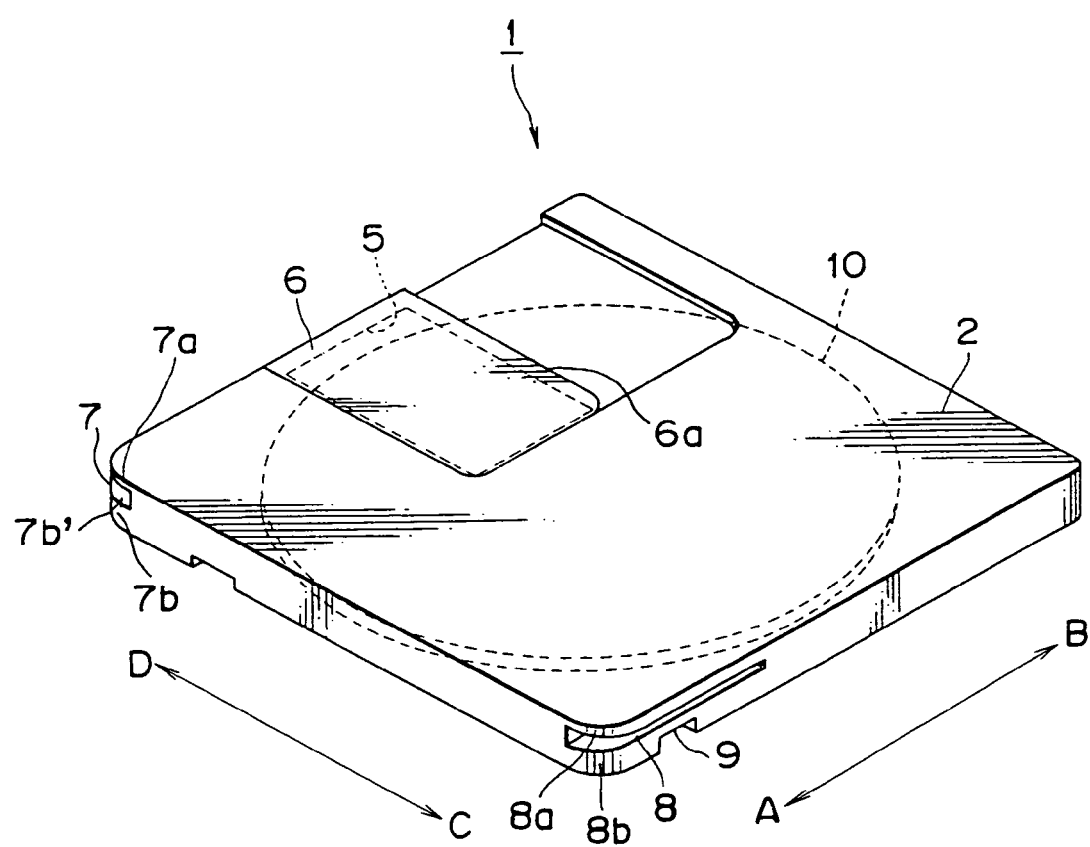
FIG. 1 is a perspective view, seen obliquely forwardly from above, of a magneto-optical disk cartridge representative of a recording medium cartridge used for a recording and/or reproducing apparatus of the present invention.

Hereinafter, embodiments of a recording medium cartridge holder and a recording and/or reproducing apparatus according to the present invention will be described with reference to the accompanying drawings.

In the embodiments shown in the figures, the present invention is applied to a mechanism of preventing improper insertion of a recording medium cartridge including a flat cartridge case and a disk-like recording medium rotatably disposed therein, and to a recording and/or reproducing apparatus using a magneto-optical disk cartridge containing a magneto-optical disk as the above recording medium.

First, a recording medium cartridge, that is, a magneto-optical disk cartridge (hereinafter, referred to as "disk cartridge") used in the embodiments will be described with reference to FIGS. 1 and 2.

A disk cartridge 1 includes a flat cartridge case 2 having a rectangular shape close to a square shape. The length of the cartridge case 2 in the longitudinal direction AB is slightly shorter than the length thereof in the lateral direction CD. An insertion port 3 is formed in a central portion of the back surface of the cartridge case 2. An access hole 4 for allowing access of laser light emitted from an optical pickup is formed in a portion, offset from the insertion port 3 in the direction D, of the back surface of the cartridge case 2. A head insertion port 5, in which a magnetic head for recording is to be inserted, is formed in the top surface at a position corresponding to the access hole 4.

Figure 2:
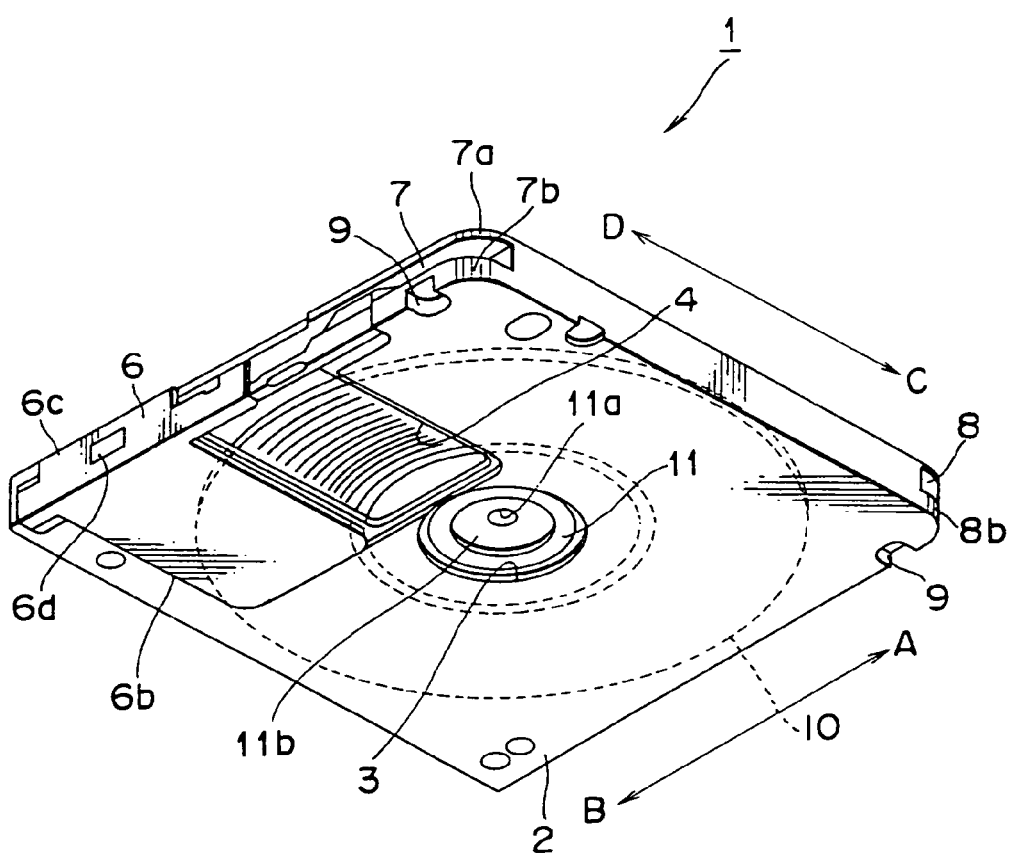
FIG. 2 is a perspective view, seen from below, of the recording and/or reproducing apparatus, showing a state in which a shutter is located at an open position.

A shutter 6 is provided in such a manner as to be movable from a close position shown in FIG. 1 and an open position shown in FIG. 2. The shutter 6 integrally has an upper covering portion 6a for covering the head insertion port 5, a lower covering portion 6b for covering the access hole 4, and an intermediate portion 6 for connecting these covering portions 6a and 6b to each other at a side edge portion of the disk cartridge. An engagement hole 6d is formed in the intermediate portion 6c. The shutter 6 is locked at the close position by locking means (not shown) in a state that the covering portions 6a and 6b cover the head insertion port 5 and the access hole 4, respectively.

A groove 7 is formed in a side edge surface in the direction D of the cartridge case 2. The groove 7 extends from the front end, that is, the end in the direction A of the cartridge case 2 to a portion slightly short of the rear end, that is, the end in the direction B of the cartridge case 2.

A groove 8 is formed in a side edge surface in the direction C of the cartridge case 2. The groove 8 extends from the front end of the cartridge case 2 to a portion slightly offset forwardly from an intermediate portion of the cartridge case 2. Each of the grooves 7 and 8 is slightly offset upwardly from the center in the vertical direction. Accordingly, at the left side portion of the front end of the cartridge 2, the thickness of a portion 7a over the groove 7 is thinner than that of a portion 7b under the groove 7, and in the right side portion of the front end of the cartridge 2, the thickness of a portion 8a over the groove 8 is thinner than that of a portion 8b under the groove 8 (see FIG. 1).

An approximately semi-circular cutout 9 opened downwardly, sideways is formed in each of both side edge portions of the back surface of the cartridge case 2 at a position near the front end.

A magneto-optical disk 10 is rotatably contained in the cartridge case 2. A disk-like core 11, formed of a magnetic body, mounted at a central portion of the magneto-optical disk 10 faces downwardly through the insertion port 3 formed at the central portion of the back surface of the cartridge case 2. A central hole 11a is formed at the central portion of the core 11. A circular fitting recess 11b is formed in the back surface of the core 11.

Figure 3:
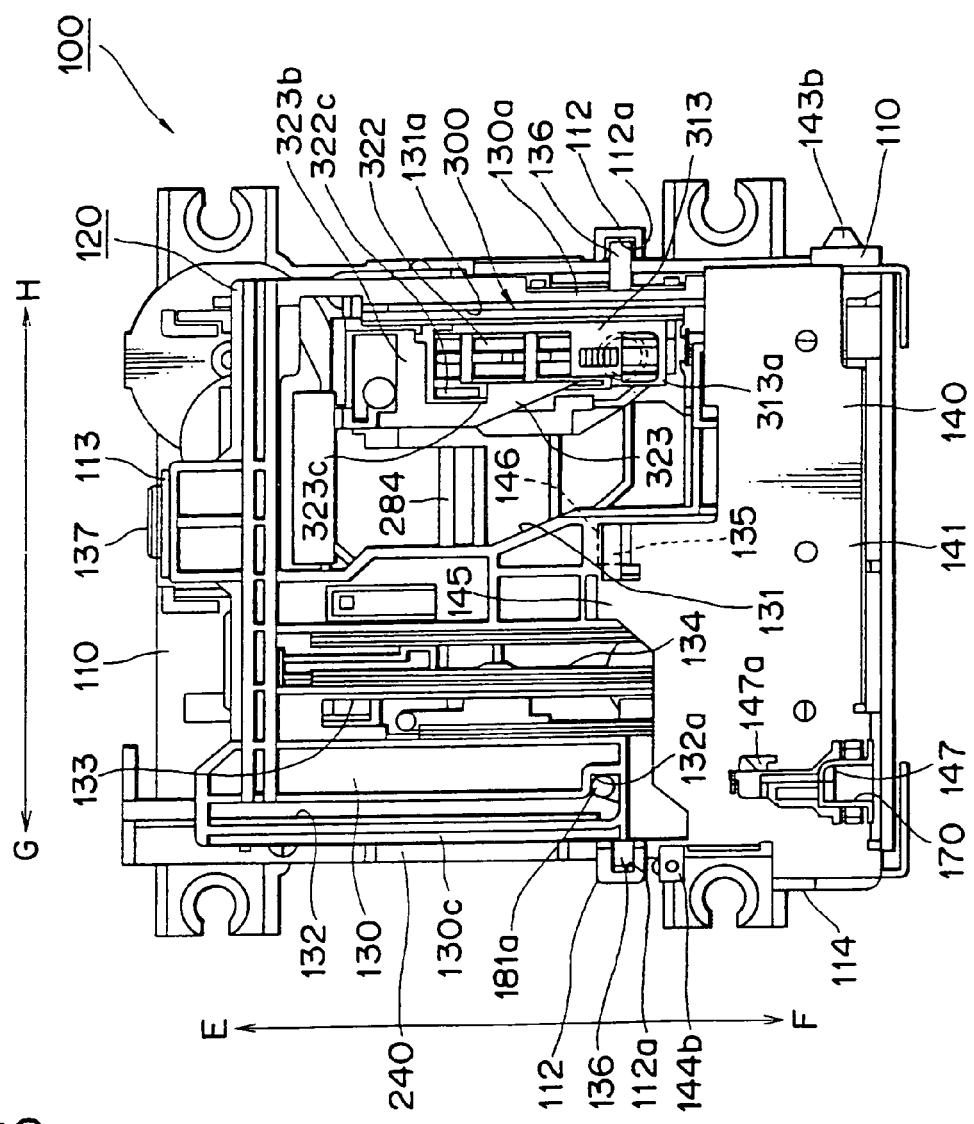
FIG. 3 is a plan view showing the entire configuration of the recording and/or reproducing apparatus.
Figure 4:
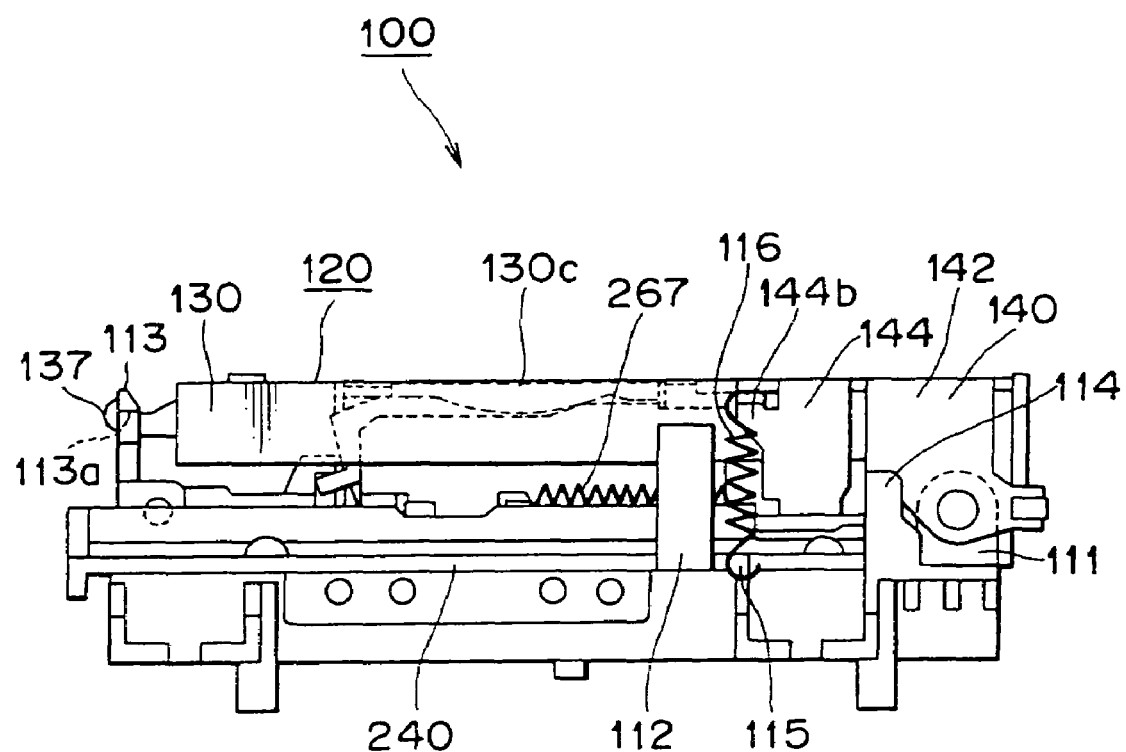
FIG. 4 is a left side view showing the entire configuration of the recording and/or reproducing apparatus.
Figure 6:
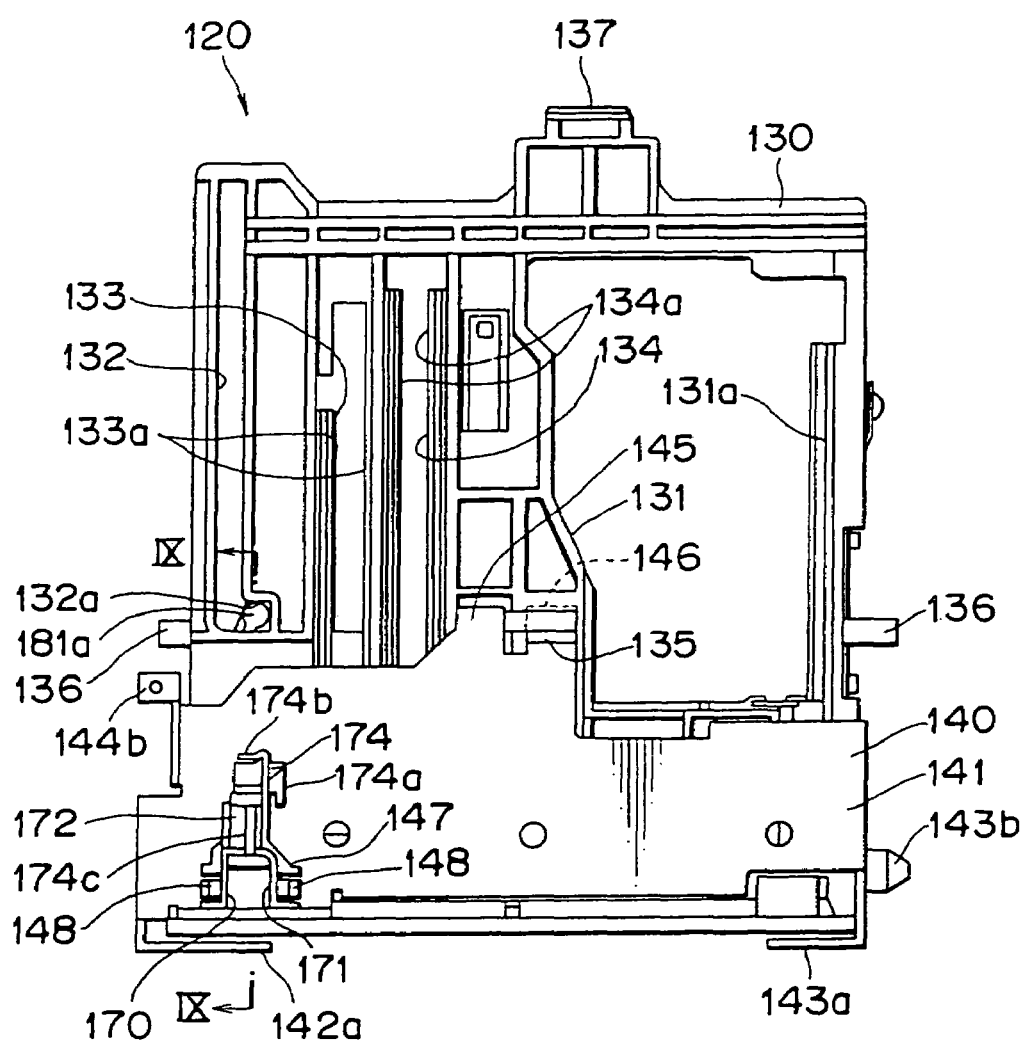
FIG. 6 is a plan view of a cartridge holder of the recording and/or reproducing apparatus.
Figure 7:
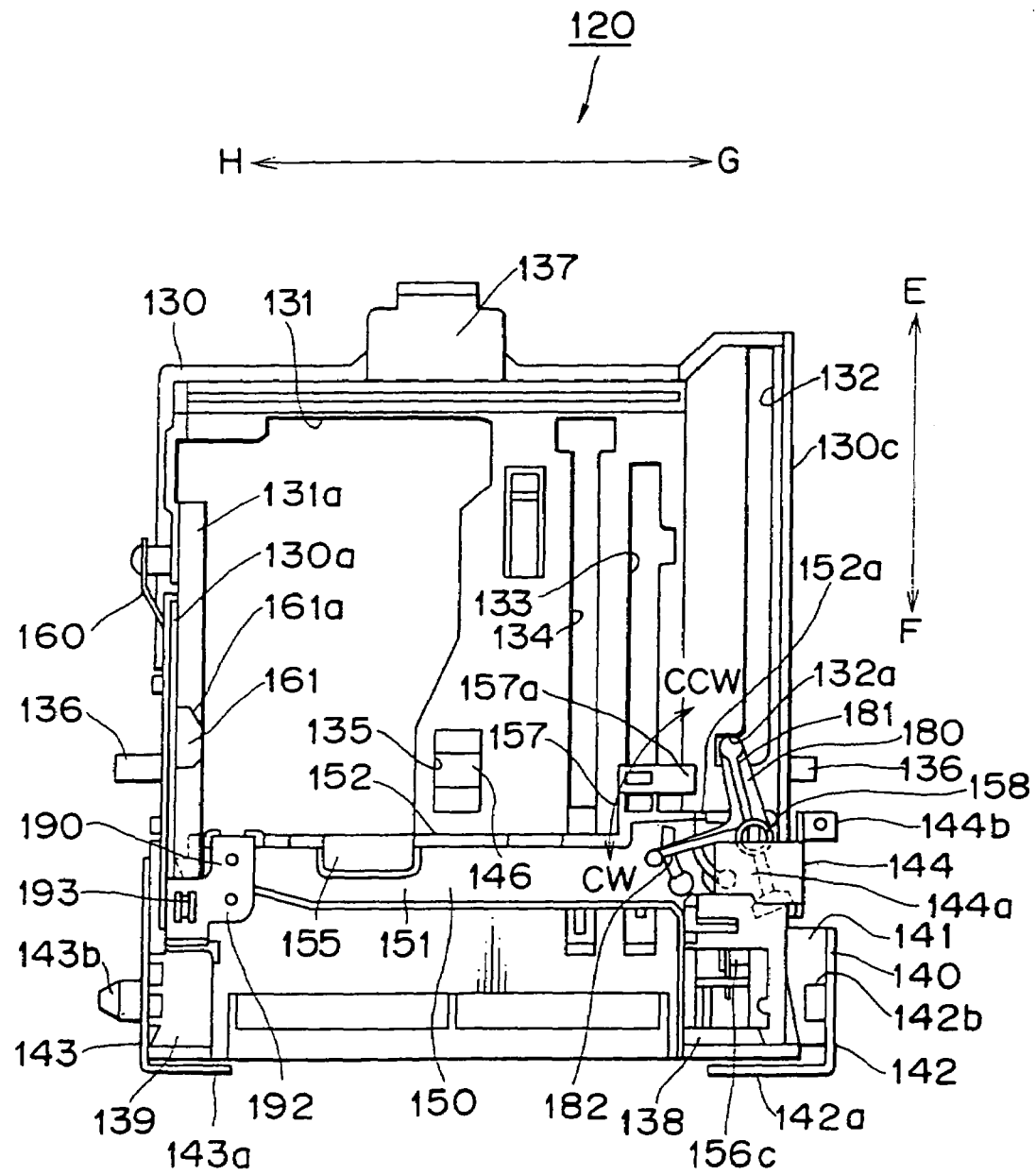
FIG. 7 is a bottom view of the cartridge holder.
Figure 8:
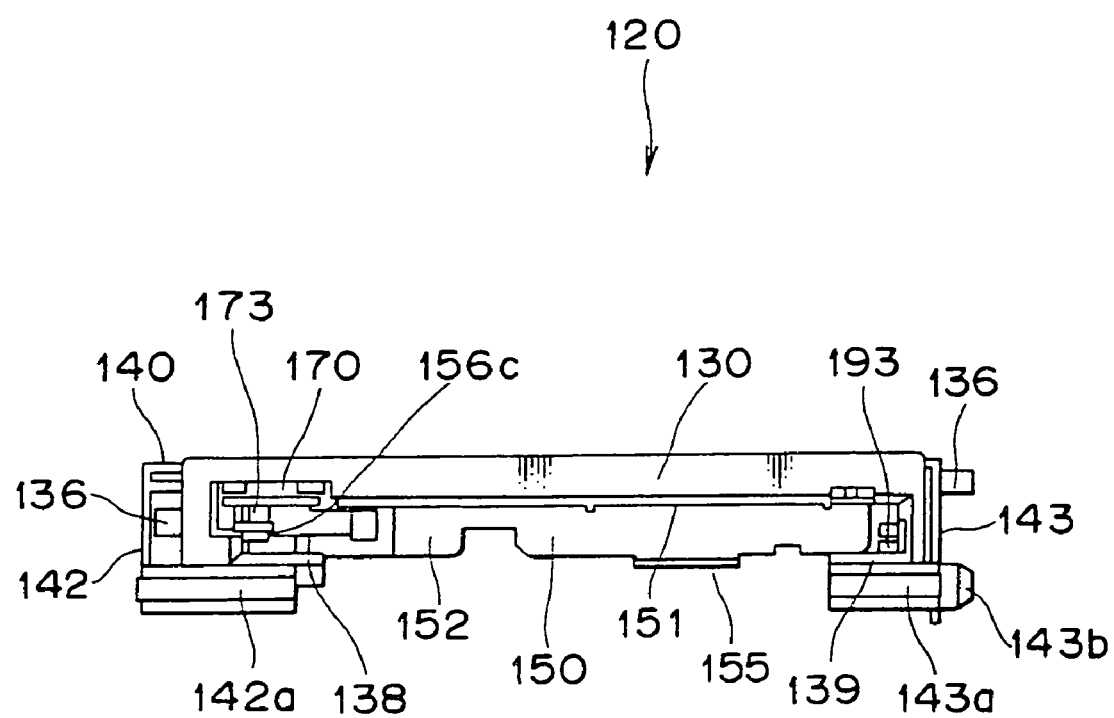
FIG. 8 is a rear view of the cartridge holder.
Figure 9:
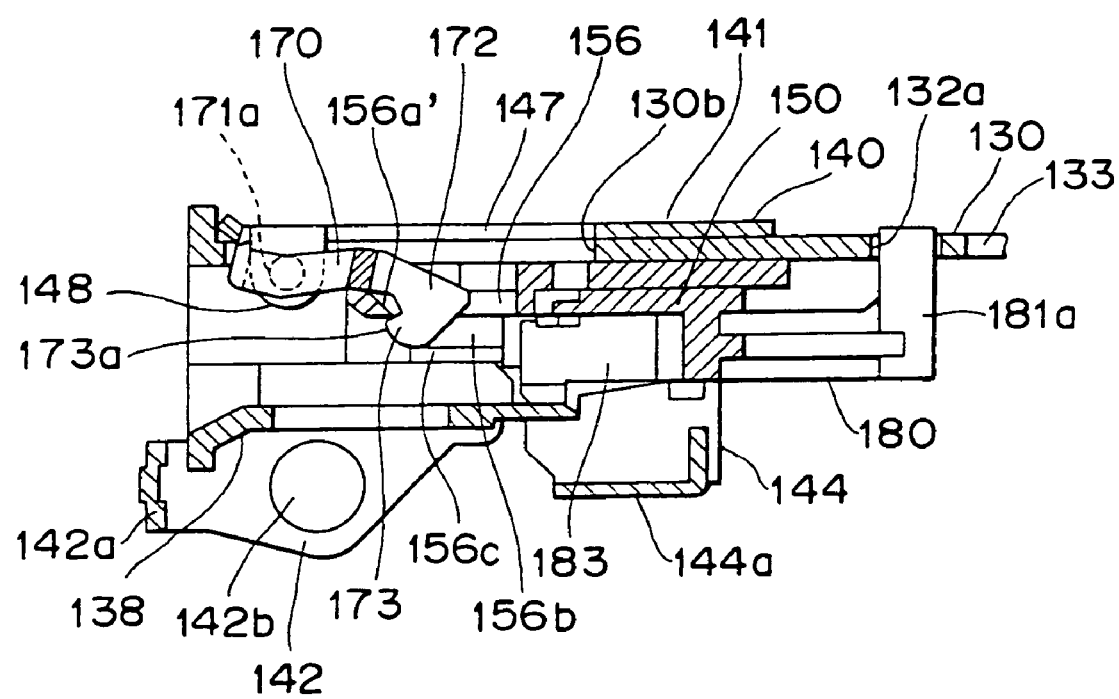
FIG. 9 is an enlarged sectional view taken on line IX—IX of FIG. 6.

A recording and/or reproducing apparatus of the present invention will be described below with reference to a plan view in FIG. 3, a left side view in FIG. 4, and a right side view in FIG. 5; a cartridge holder of the present invention will be described with reference to a plan view in FIG. 6, a bottom view in FIG. 7, a rear view in FIG. 8, and a sectional view in FIG. 9; and a main support of the cartridge holder will be described with reference to a plan view in FIG. 10 and a bottom view in FIG. 11. In addition, the left, right, front, and rear sides in the following description are based on those in the plan views.

A recording and/or reproducing apparatus 100 for recording and/or reproducing signals on/from a magneto-optical disk 9, for example, Mini Disk (trade name) by using the disk cartridge 1 includes a base chassis 110 on which components necessary for recording and/or reproducing are mounted or supported.

A cartridge holder 120 is supported on the upper surface side of the base chassis 110 in such a manner as to be movable in the vertical direction. The cartridge holder 120 mainly includes a main support 130 having a rectangular shape slightly longer in the longitudinal direction, that is, in the direction EF, a connecting member 140 mounted on the main support 130, and a carrying slider 150.

Figure 10:
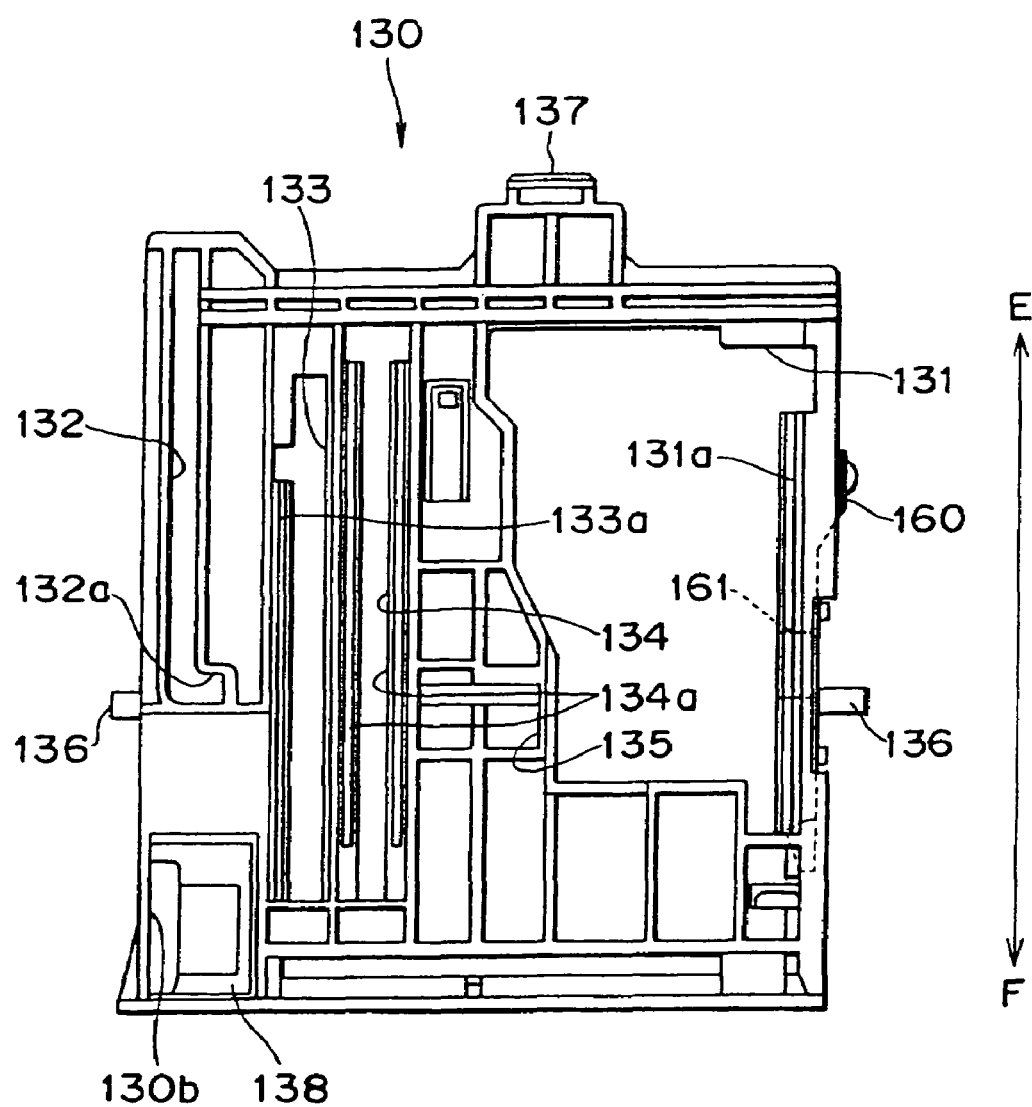
FIG. 10 is a plan view of a main support of the recording and/or reproducing apparatus.
Figure 11:
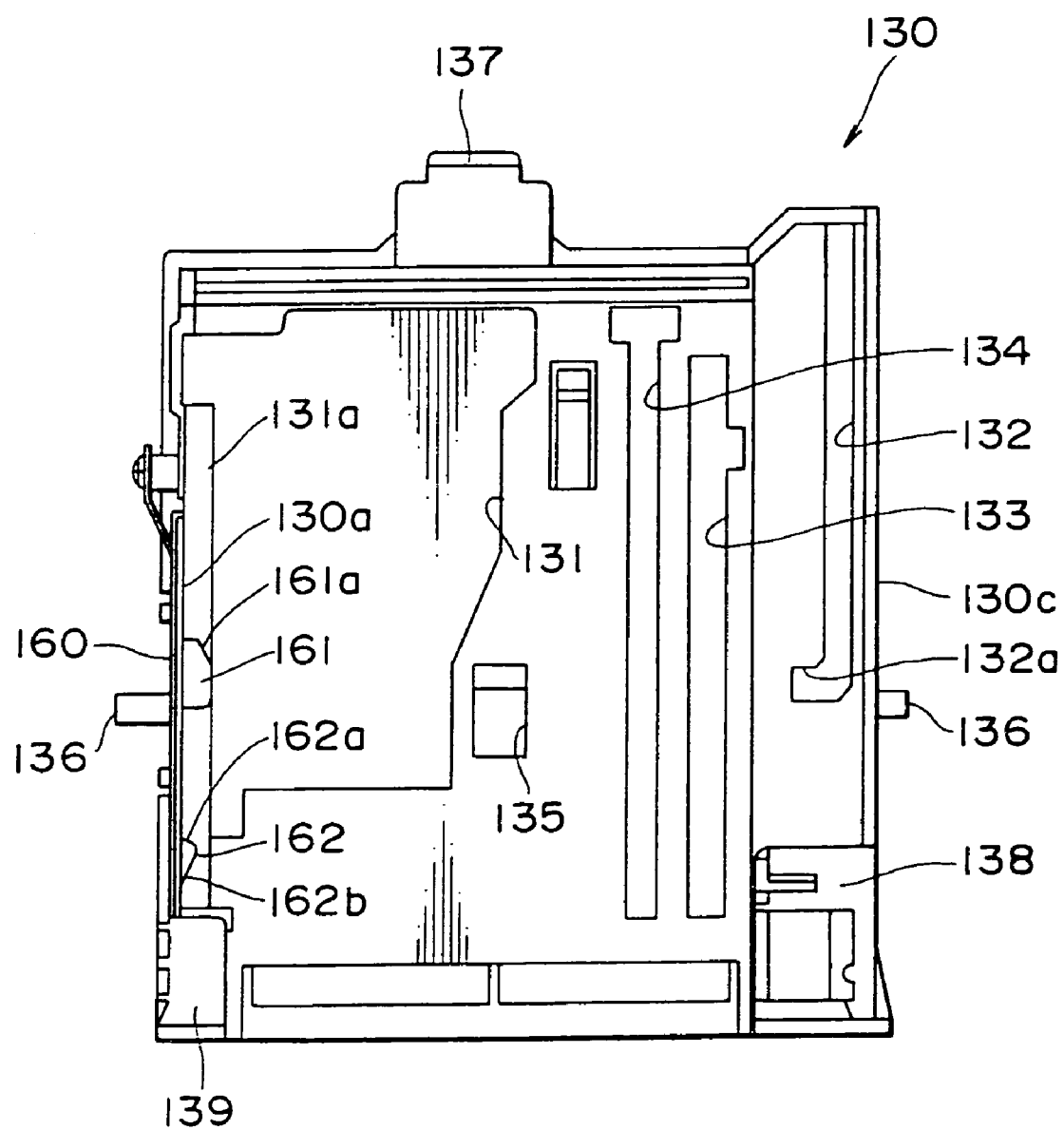
FIG. 11 is a bottom view of the main support.

The main support 130 is made from a synthetic resin, and as is apparent from FIGS. 10 and 11, a large opening portion 131 is formed in a rear end portion, that is, a portion excluding a portion on the direction F side, of an approximately right half of the main support 130. A projecting rib 131a is formed on the right side edge, that is, on the side edge on the direction H side of the opening portion 131, except for the front end portion, that is, the end portion in the direction E side. To be more specific, the projecting rib 131a projects from an approximately vertical intermediate portion of the right side edge of the opening portion 131. A sliding groove 132 is formed in the left side edge, that is, in the side edge on the direction G side of the main support 130 in such a manner as to extend from a portion offset slightly rearwardly from the center in the longitudinal direction to the front end portion. A lock portion 132a recessed slightly rightwardly is formed at the rear end portion of the sliding groove 132. Guide slits 133 and 134 are formed-in a portion, between the opening portion 131 and the sliding groove 132, of the main support 130. The guide slits 133 and 134 substantially extend from the front end portion to the rear end portion of the main support 130. A projecting rib 133a is formed along the left side edge of the guide slit 133 on the left side, and projecting ribs 134a are formed along the left and right side edges of the guide slit 134 on the right side of the guide slit 133. A rectangular arrangement hole 130b longer in the longitudinal direction is formed in a left rear end portion of the main support 130.

Figure 5:
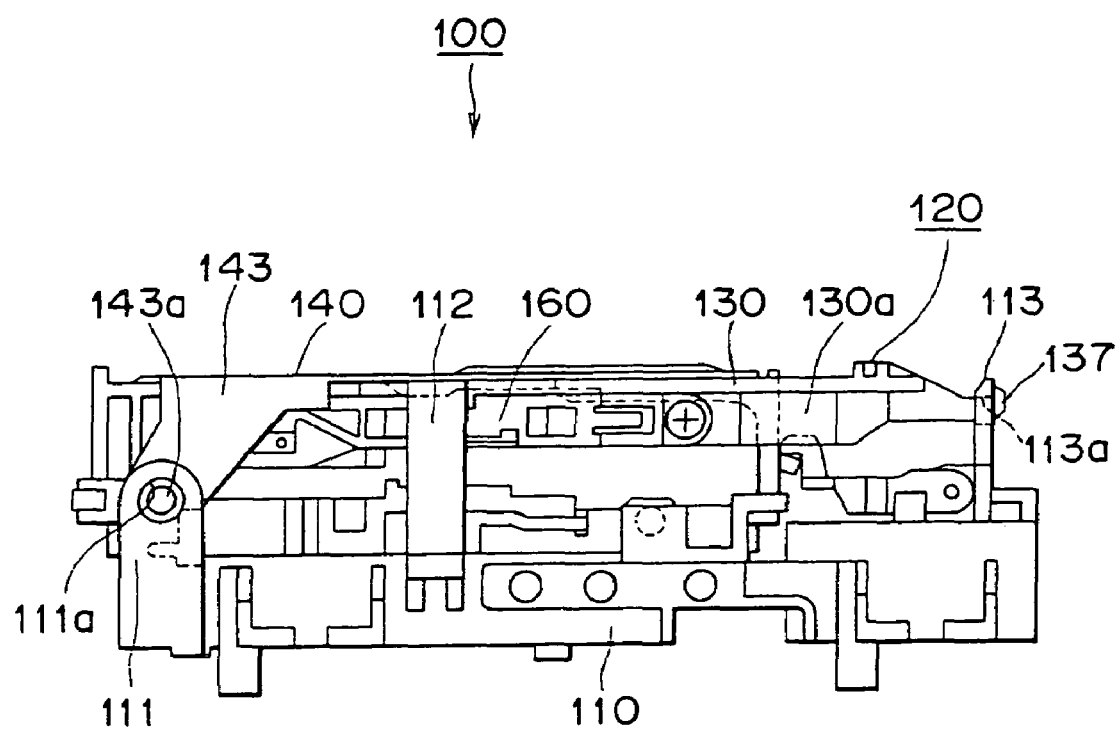
FIG. 5 is a right side view showing the entire configuration of the recording and/or reproducing apparatus.

A shutter opening/closing member 160 made from a spring material is fixed on the outer side surface of a right side wall 130a of the main support 130 of the cartridge holder 120 (see FIG. 5). The shutter opening/closing member 160, which is longer in the longitudinal direction, that is, in the direction EF, has a shutter opening piece 161 projecting leftwardly from an approximately intermediate portion of the shutter opening/closing member 160 (see FIG. 7), and a shutter closing piece 162 projecting leftwardly from the rear end portion of the shutter opening/closing member 160 (see FIG. 11). The shutter opening piece 161 is formed into a flat plate having a rectangular shape longer substantially in the longitudinal direction, and has at a front end portion of the left side edge thereof, a tilt edge 161a tilted leftwardly, forwardly. The shutter closing piece 162 has, at a front end portion of the left side edge, a front tilt edge 162a and has, at a rear end portion of the left side edge, a rear tilt edge 162b. The tilting angle of the front tilt edge 162a is larger than that of the rear tilt edge 162b. Both the shutter opening piece 161 and the shutter closing piece 162 project in the right side wall 130a of the main support 130 of the cartridge holder 120 through through-holes formed in the right side wall 130a. Two portions, positioned in front of and at the back of the shutter opening piece 161, of the shutter opening/closing member 160 are screwed in the right side wall 130a, whereby the shutter opening piece 161 is prevented from being moved rightwardly and leftwardly. On the other hand, the shutter closing piece 162 is usually kept as projecting in the right side wall 130a, and when pushed from the left side, the shutter closing piece 162 is moved rightwardly because the rear end portion of the shutter opening/closing member 160 is elastically flexed.

As shown in FIG. 10, a connecting hole 135 is formed at a position near the rear end of a portion, along the left side edge of the opening portion 131, of the main support 130. A sliding pin 136 is provided on each of the left and right side surfaces of the main support 130 at a position slightly offset rearwardly, that is, in the direction F, from an intermediate portion of the side surface in the longitudinal direction in such a manner as to project outwardly therefrom. A connecting piece 136 is provided at an approximately lateral central position on a front end portion of the main support 130 in such a manner as to project forwardly therefrom.

Supporting surface portions 138 and 139 are respectively provided at lower edges of rear end portions of the left and right side surfaces of the main support 130 of the cartridge holder 120 in such a manner as to project in the direction where they come close to each other.

Figure 12:
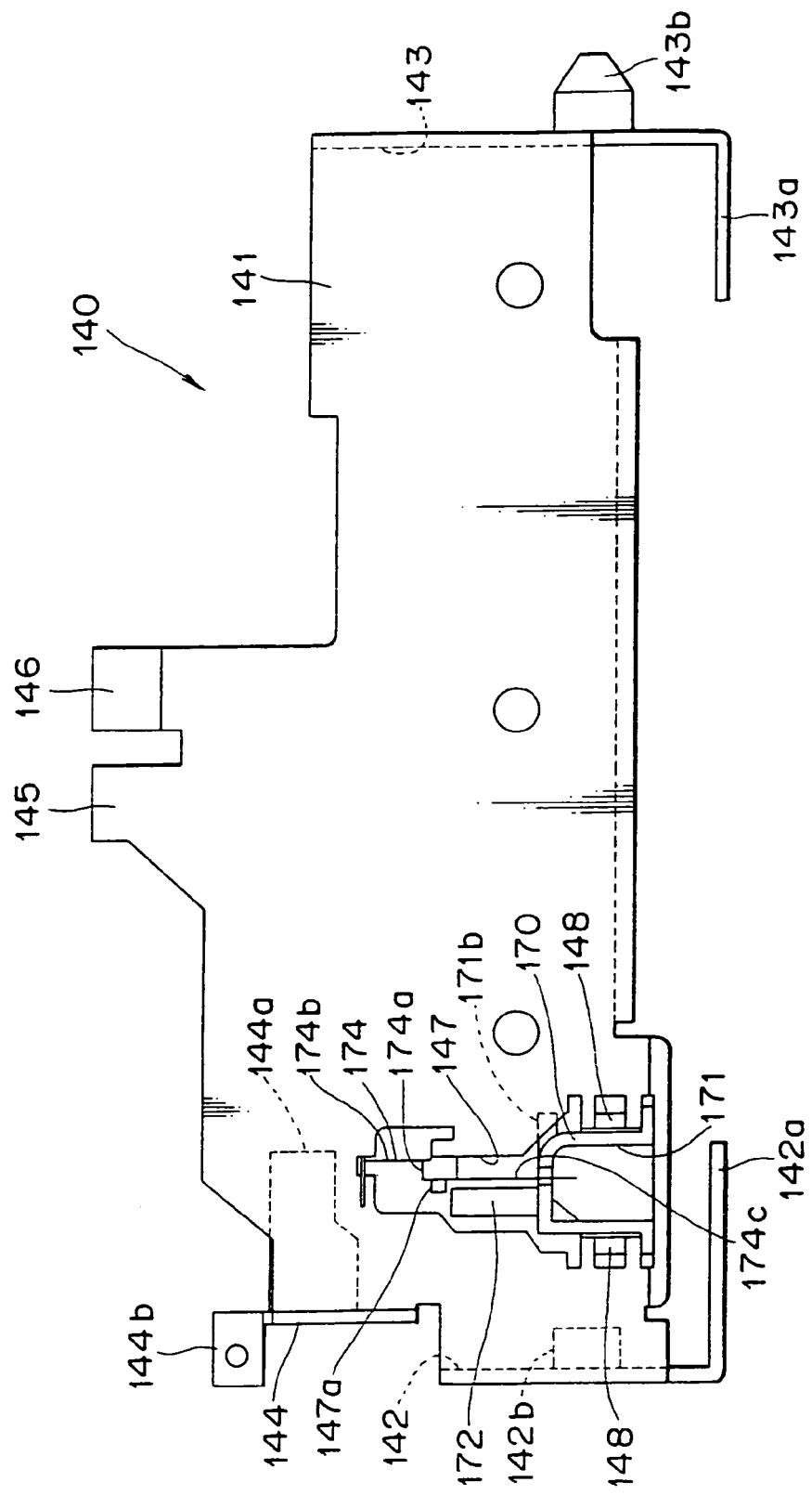
FIG. 12 is a plan view of a connecting member of the recording and/or reproducing apparatus.
Figure 13:
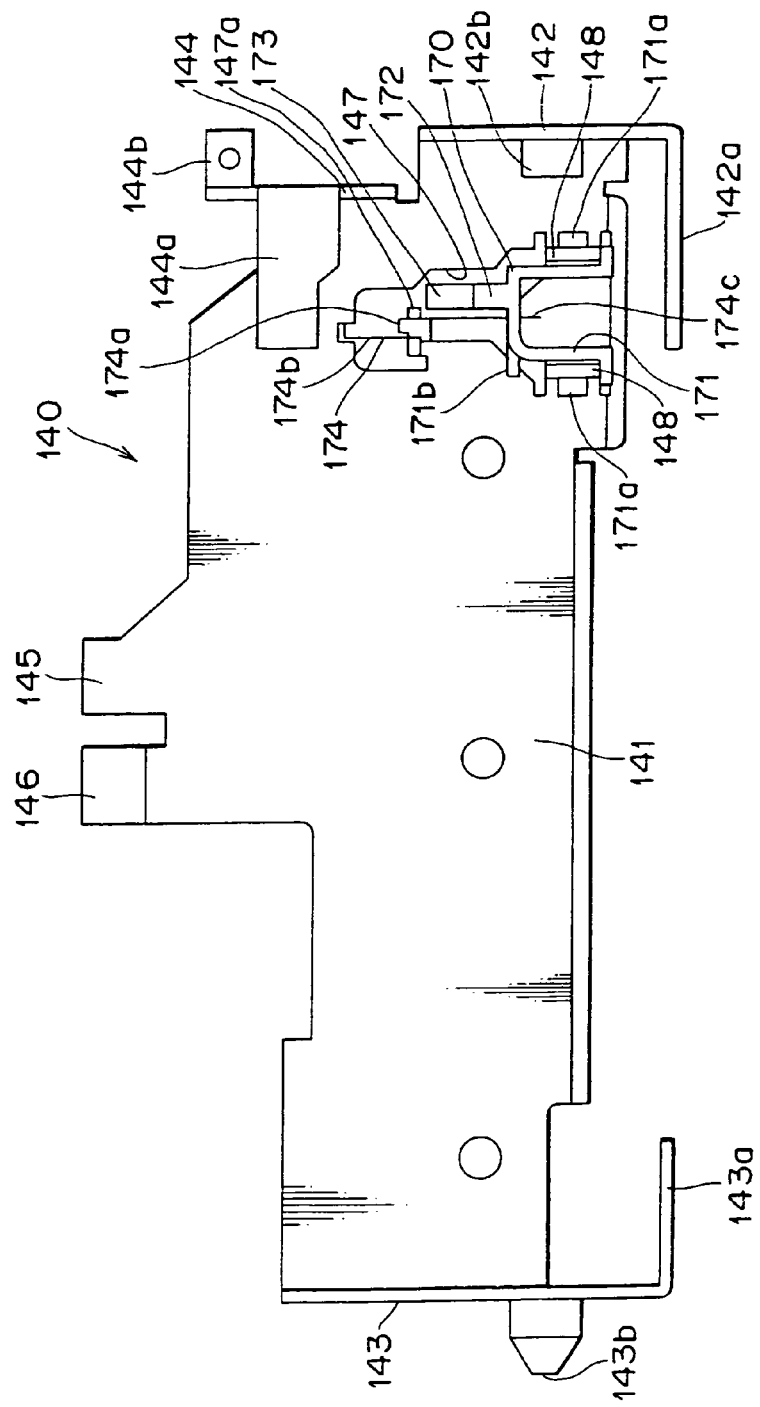
FIG. 13 is a bottom view of the connecting member.

The connecting member 140 will be described below with reference to a plan view in FIG. 12 and a bottom view in FIG. 13.

The connecting member 140 is formed by bending a plate material. As shown in FIGS. 12 and 13, the connecting member 140 integrally has a main portion 141 formed into a plate shape longer in the lateral direction, and two pieces 142 and 143 to be supported which project nearly downwardly from the left and right side edges of the main portion 141 respectively. Projecting pieces 142a and 143a are respectively provided on the rear edges of the lower end portions of the pieces 142 and 143 to be supported in such a manner as to project in the direction where they come close to each other. Pins 142b and 143b to be supported project from the right surface of a lower end portion of the left piece 142 to be supported and from the right surface of a lower end portion of the right piece 143 to be supported, respectively. A side surface portion 144 projects downwardly from a front end portion of the left side edge of the main portion 141. A restricting piece 144a projects rightwardly from the lower edge of the side surface portion 144, and a spring catch piece 144b projects leftwardly from the upper end of the side surface portion 144.

Left and right engagement pieces 145 and 146 project forwardly from an approximately lateral central portion of the front edge of the main portion 141 of the connecting member 140. The right engagement piece 146 once projects downwardly and then projects forwardly, and accordingly, it is formed into an approximately L-shape as viewed from right. These engagement pieces 145 and 146 look to be opposed to each other in the vertical direction with a gap put therebetween as viewed from right or left.

An arrangement opening 147 is formed in a left end portion of the main support 141 of the connecting member 140, and a lock member 170 is disposed in the arrangement opening 147. As shown in FIG. 9, the lock member 170 made from a synthetic resin integrally has a base portion 171 formed into a recess opened rearwardly, and a claw piece 172 projecting forwardly from a front end portion of the base portion 171. A lock claw 173 projects downwardly from the front end of the claw piece 172. A lower end surface 173a of the lock claw 173 is tilted slightly rearwardly, upwardly. A pin 171a to be supported projects from each of both side surfaces of a portion, near the rear end, of the base portion 171. Both the pins 171a to be supported are turnably engaged with supporting pieces 148 projecting downwardly from both sides of a rear end portion of the arrangement opening 147 of the main support 141 of the connecting member 140, whereby the lock member 170 is supported by the connecting member 140 in such a manner as to be turnable in the direction where the front end of the lock member 170 is moved substantially in the vertical direction. The downward turning of the lock member 170 is restricted by the contact of the rear end of the base portion 171 with the back surface of the main portion 141 of the connecting member 140, while the upward turning of the lock member 170 is restricted by the contact of a restricting pin 171b projecting rightwardly from a front end portion of the base portion 171 with the back surface of the base portion 141 of the connecting member 140.

A spring catch piece 147a is provided at a portion, offset slightly forwardly from a central portion, of the right side edge of the arrangement opening 147 of the connecting member 140. A coil portion 174a of a torsion-coil spring 174 is wound around the spring catch piece 147a. A forwardly extending arm 174b of the coil spring 174 is brought into elastic-contact with the upper surface of the main portion 141 of the connecting member 140, and a rearwardly extending arm 174c of the coil spring 174 is brought into elastic-contact with the upper surface of a front end portion of the base portion 171 of the lock member 170. The lock member 170 is thus biased downwardly.

The connecting member 140 is connected to the main support 130 as follows: namely, the restricting piece 144a formed on the left side portion of the connecting member 140 is positioned on the back side of the left side portion of the main support 130; the right engagement piece 146 of the connecting member 140 is engaged in the connecting hole 135 of the main support 130; and the left engagement piece 145 is brought, from above, into contact with the left opening edge of the connecting hole 135 of the main support 130. In this state, the lock member 170 supported by the connecting member 140 faces, from above, to the arrangement hole 130b formed in the left rear end portion of the main support 130.

Figure 14:
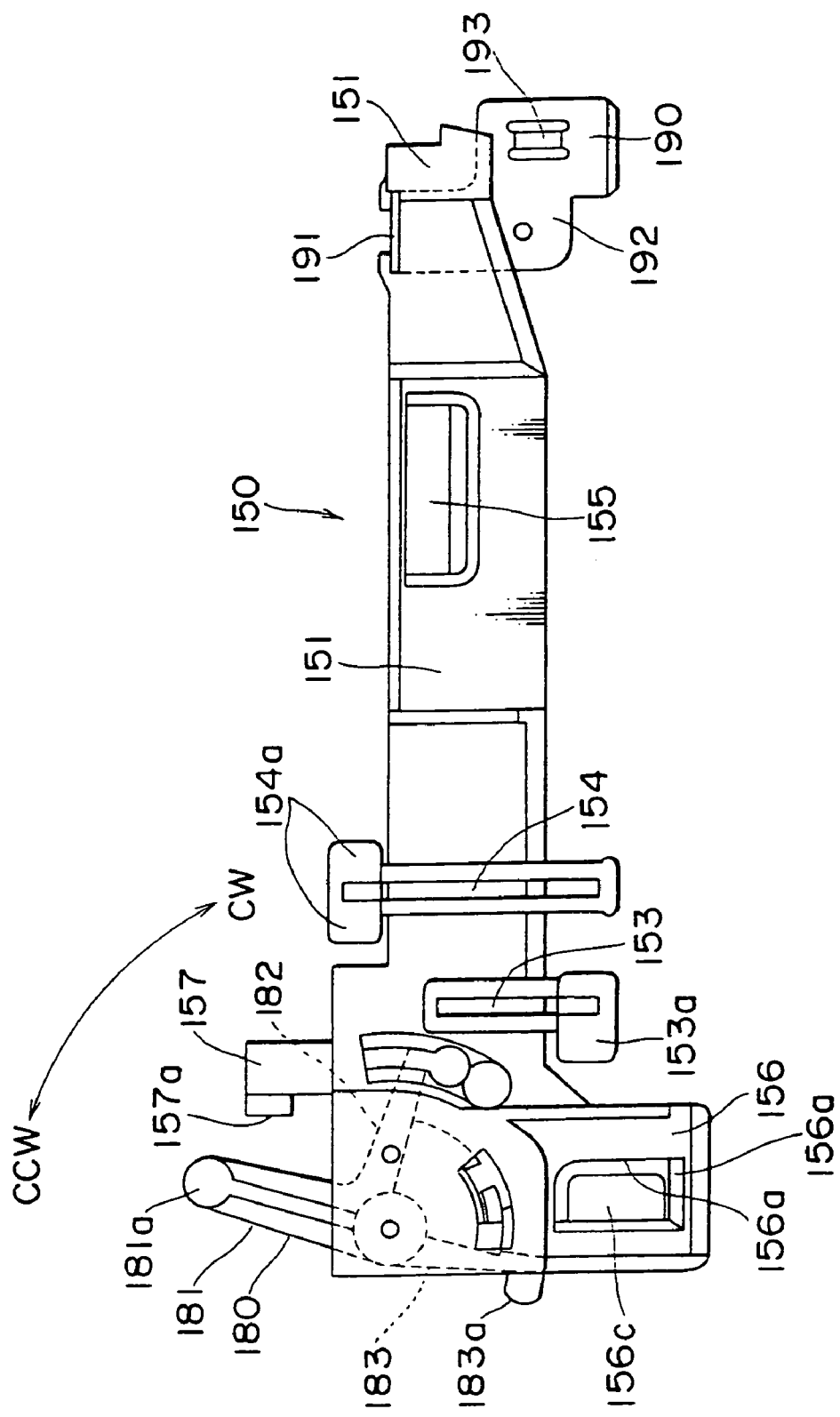
FIG. 14 is a plan view of a carrying slider of the recording and/or reproducing apparatus.
Figure 15:
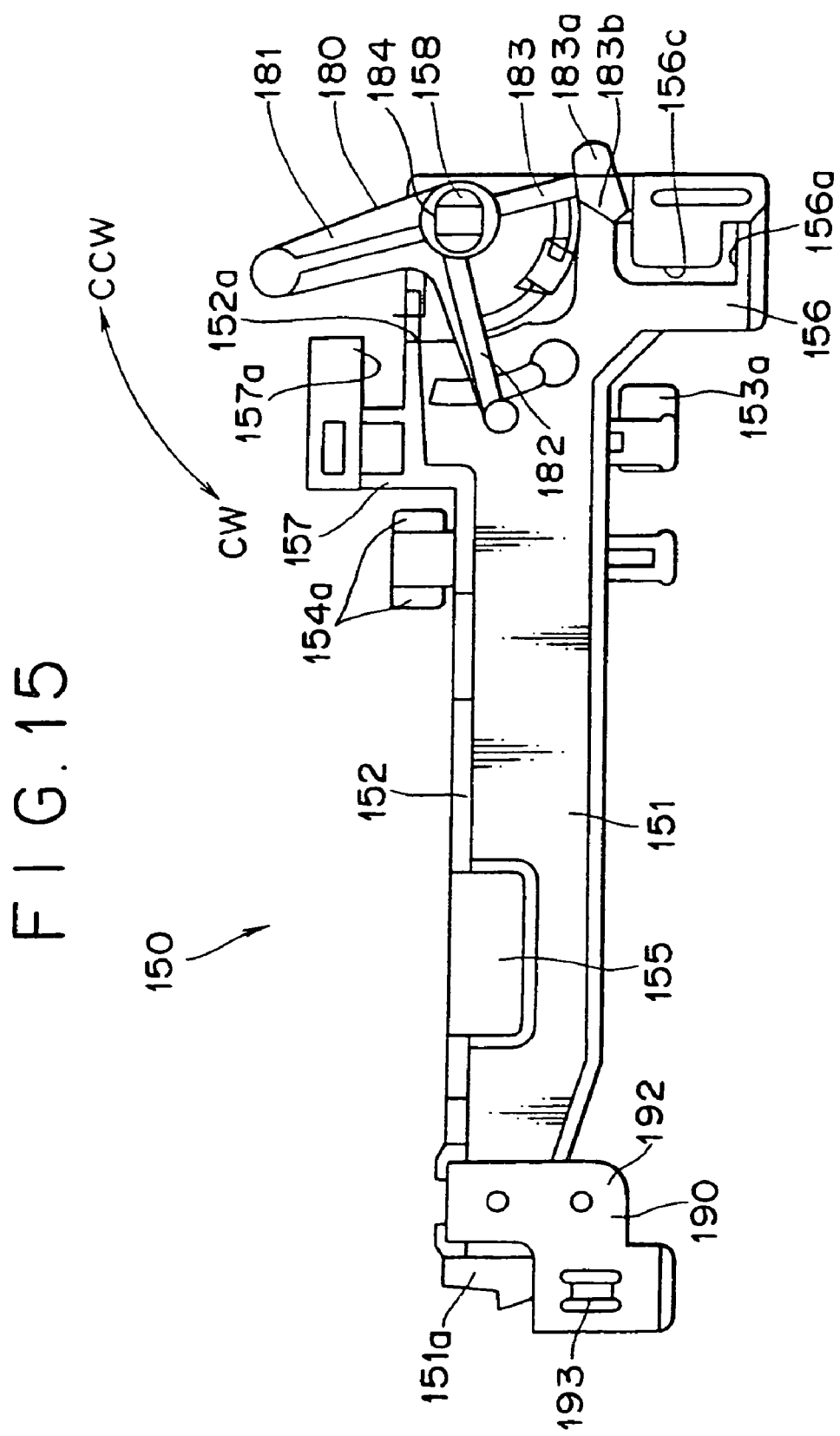
FIG. 15 is a bottom of the carrying slider.

The carrying slider 150 is supported on the main support 130 in such a manner as to be movable in the longitudinal direction. As shown in FIGS. 14 and 15, the carrying slider 150 made from a synthetic resin has an upper surface portion 151 longer in the lateral direction, that is, in the direction GH. A front surface portion 152 projects downwardly from the front edge of the upper surface portion 151. Left and right projecting ribs 153 and 154 extending in the longitudinal direction are formed on the upper surface of a left portion of the upper surface portion 151. An engagement sliding piece 153a projecting leftwardly is formed on the upper surface of a rear end portion of the left projecting rib 153, and engagement sliding pieces 154a projecting leftwardly and rightwardly are formed on the upper surface of a rear end portion of the right projecting rib 154. The projecting rib 153 is slidably engaged in the guide slit 133 formed in the main support 130 with the engagement sliding piece 153a slidably engaged on the upper surface of the projecting rib 133a formed on the left side surface of the sliding slit 133. The projecting rib 154 is slidably engaged in the guide slit 134 formed in the main support 130 with the engagement sliding pieces 154a slidably engaged on the upper surfaces of the projecting ribs 134a formed on the left and right side surfaces of the guide slit 134. An engagement sliding piece 151a projects rightwardly from the upper surface of a right end portion of the upper surface portion 151. The engagement sliding piece 151a is slidably engaged on the upper surface of the projecting rib 131a formed on the right side surface of the opening portion 131 of the main support 130. The carrying slider 150 is thus supported on the back surface of the main support 130 in such a manner as to be movable in the longitudinal direction, that is, the direction EF.

A rearwardly extending supporting piece 155 is formed on a portion, offset rightwardly from an intermediate portion, of the lower edge of the front surface portion 152 of the carrying slider 150. A projecting piece 156, which projects rearwardly, is formed on a left end portion of the upper surface portion 151. A hole 156a to be locked is formed in a central portion of the projecting piece 156, and a rear edge 156a' of the hole 156a to be locked is tilted forwardly, upwardly. A supporting piece 156b projects downwardly from the left side edge of the projecting piece 156, and an insertion restricting piece 156c projects rightwardly from the lower end of the supporting piece 156b (see FIG. 9). The insertion restricting piece 156c is formed into a small plate shape extending in the horizontal direction, and is opposed to the lock hole 156a. To be more specific, the insertion restricting piece 156c is located at a height corresponding to the height of the left groove 8 of the disk cartridge 1 inserted in the cartridge holder 120 in a normal orientation.

A left end portion of the front surface portion 152 of the carrying slider 150 is cutout, to form a cutout portion 152a. A connecting piece 157 projects forwardly from a lower end portion, close to the cutout portion 152a, of the front surface portion 152, and an engagement projection 157a projects leftwardly from a front end portion of the connecting piece 157.

A lock lever 180 is turnably supported on the back surface of a left end portion of the upper surface portion 151 of the carrying slider 150. The lock lever 180 has three arm pieces 181, 182, and 183 extending in the directions perpendicular to each other. A hole 184 to be supported, extending in the vertical direction, is formed in an intermediate portion at which bases of the three arm pieces 181, 182 and 183 are connected to each other. The first arm piece 181 extending substantially forwardly from the intermediate portion has a lock pin 181a projecting upwardly from a tip portion of the first arm piece 181. The second arm piece 182 extending substantially rightwardly from the intermediate portion is taken as a piece to be operated. The third arm piece 183 extending substantially rearwardly from the intermediate portion has, at its tip portion, a lock projection 183a projecting leftwardly from the upper end of the tip portion and an engagement projection 183b projecting rightwardly from the lower end of the tip portion. A supporting shaft 158 projecting downwardly from the front end of a left end portion of the upper surface portion 151 of the carrying slider 150 is inserted in the hole 184 to be supported, whereby the lock lever 180 is turnably supported by the carrying slider 150. The lock lever 180 is biased clockwise, that is, in the direction CW as viewed from above by a spring (not shown).

A click member 190 made from a plate spring material is fixed to a right end portion of the front surface portion 152 of the carrying slider 150. The click member 190 has a piece 191 to be supported by the front surface portion 152, and a lower surface portion 192 projecting rearwardly from the lower edge of the piece 191 to be supported. A rear end portion of the lower surface portion 192 projects rightwardly. Accordingly, the lower surface portion 192 has an approximately L-shape. An engagement projection 193, swelled to project upwardly, is formed on a rightwardly projecting portion of the lower surface portion 192. To be more specific, the engagement projection 193 is obtained by forming left and right slits extending in the longitudinal direction in a rear surface portion 192, thereby upwardly swelling a portion between the two slits.

Figure 18:
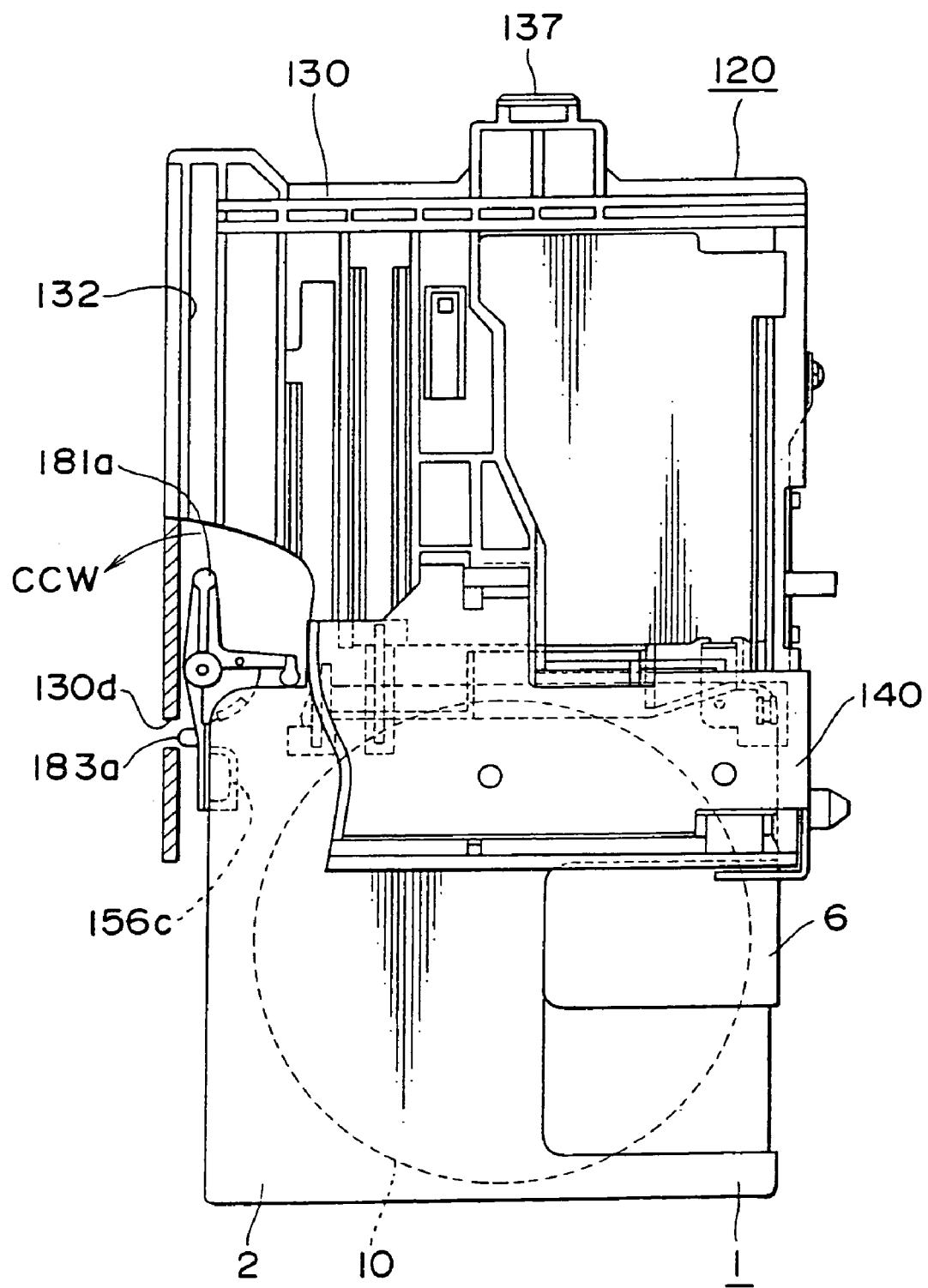
FIG. 18 is a plan view, with parts partially cutaway, of the cartridge holder showing a state in which the disk cartridge is inserted in the normal orientation and the locking by a lock lever is released.

In a state in which the carrying slider 150 is located at the rear end of the movement range, that is, the standby position, the lock claw 173 of the lock member 170 supported by the connecting member 140 is engaged in the hole 156a to be locked of the carrying slider 150; the lock projection 183a of the lock lever 180 is engaged in an engagement hole 130d formed in a rear end portion of the left side wall 130c of the main support 130 of the cartridge holder 120 (see FIG. 18); and the lock pin 181a of the lock lever 180 is engaged in the lock portion 132a formed at the rear end of the sliding groove 132 of the main support 130 of the cartridge holder 120. That is to say, with the above-described engagement of the lock members, the carrying slider 150 is locked at the rear end of the movement range, that is, at the standby position.

A procedure of inserting the disk cartridge 1 in the cartridge holder 120 will be described below.

The insertion of the disk cartridge 1 in the cartridge holder 120 in a normal orientation will be first described. In the normal orientation, the upper surface of the cartridge case 2 is directed upwardly, and the front end, that is, the end in the direction A, of the cartridge case 2 is directed forwardly, that is, in the direction E, of the apparatus.

Figure 16:
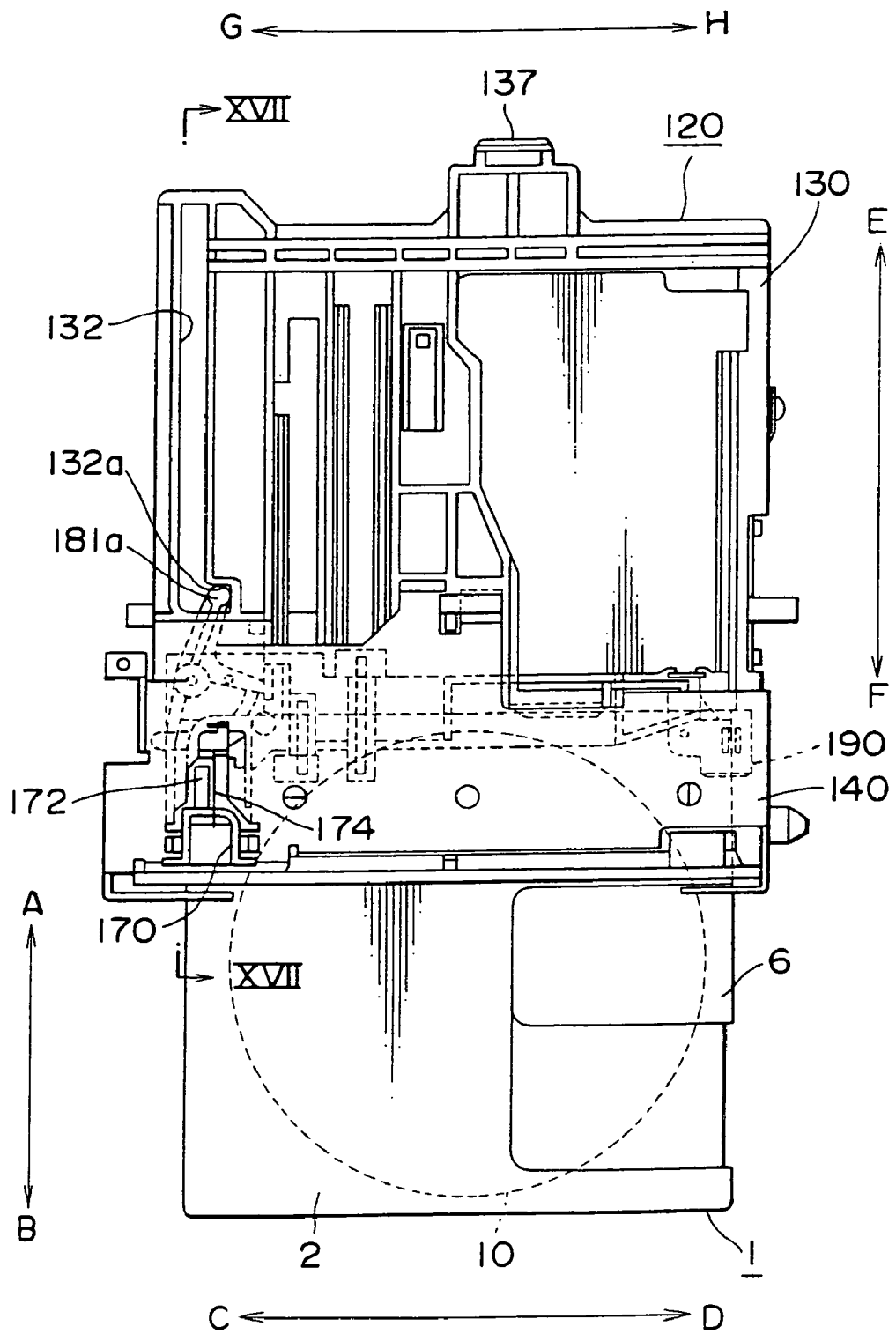
FIG. 16 is a plan view of the cartridge holder showing a state in which the disk cartridge is inserted in a normal orientation and the locking by a lock member is released.
Figure 17:
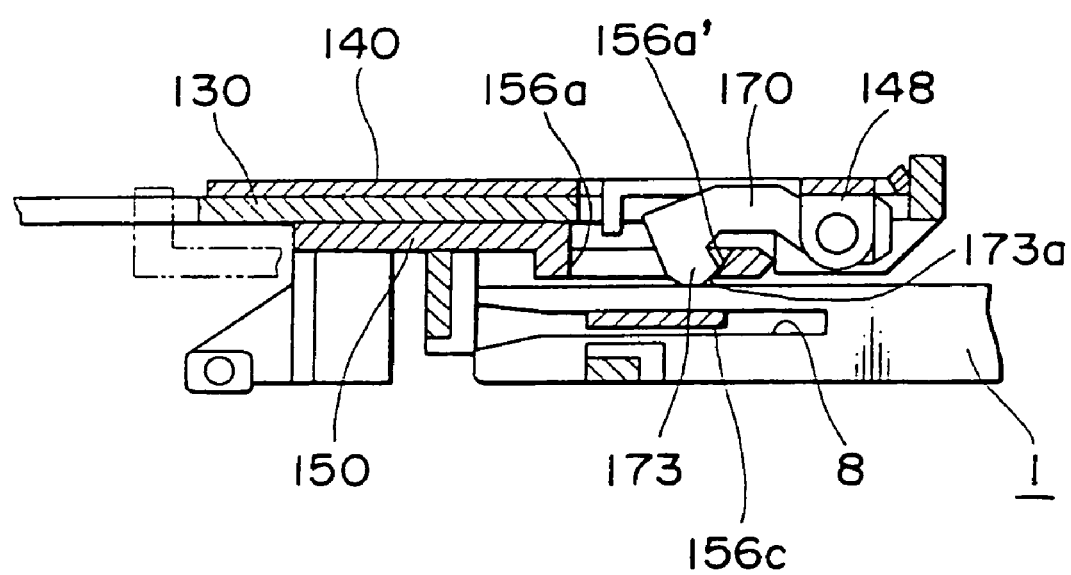
FIG. 17 is an enlarged sectional view taken on line XVII—XVII of FIG. 16.

As the disk cartridge 1 is inserted in the cartridge holder 120 in the normal orientation while being slid on the supporting surface portions 138 and 139, the insertion restricting piece 156c of the carrying slider 150 is relatively inserted in the left groove 8 in the disk cartridge 1, whereby the disk cartridge 1 is inserted toward the carrying slider 150. When the disk cartridge 1 is further inserted in the cartridge holder 120, the lower end surface (tilt surface) 173a of the lock claw 173 of the lock member 170 is pushed by a front end portion of the disk cartridge 1. As a result, the lock member 170 is turned upwardly against the biasing force of the torsion-coil spring 174, so that the tilt surface 173a of the lock claw 173 comes to be opposed to the tilt surface 156a' at the rear end of the hole 156a to be locked of the carrying slider 150 (see FIGS. 16 and 17). Accordingly, as the carrying slider 150 is moved forwardly from this state, the tilt surface 173a of the lock claw 173 is relatively slid upwardly on the tilt surface 156a' of the hole 156a to be locked. That is to say, the locking of the carrying slider 150 by the lock claw 173 is released in the step shown in FIGS. 16 and 17. When the disk cartridge 1 is still further inserted in the cartridge holder 120, the tip of the second arm piece 182 of the lock lever 180 is pushed by the front end surface of the disk cartridge 1. As a result, the lock lever 180 is turned counterclockwise, that is, in the direction CCW, as seen from above, against the biasing force of the spring (not shown), so that the lock pin 181a provided on the first arm piece 181 is removed leftwardly from the lock portion 132a formed at the rear end of the sliding groove 132 of the main support 130, and the lock projection 183a provided at the tip of the third arm piece 183 is removed rightwardly from the engagement hole 130d formed in the left side surface portion 130c of the main support 130. In this way, the locking of the carrying slider 150 at the standby position is entirely removed (see FIG. 18). Further, the engagement projection 183b formed at the tip portion of the third arm piece 183 is engaged in the cutout 9 formed in the lower portion of the left side edge of the disk cartridge 1, and simultaneously the lower surface portion 192 of the clock member 190 flexed downwardly by the front end portion of the disk cartridge 1 is returned upwardly and the engagement projection 193 is engaged in the cutout 9 formed in the lower portion of the right side edge of the disk cartridge 1. In this way, the disk cartridge 1 is held by the carrying slider 150.

Figure 19:
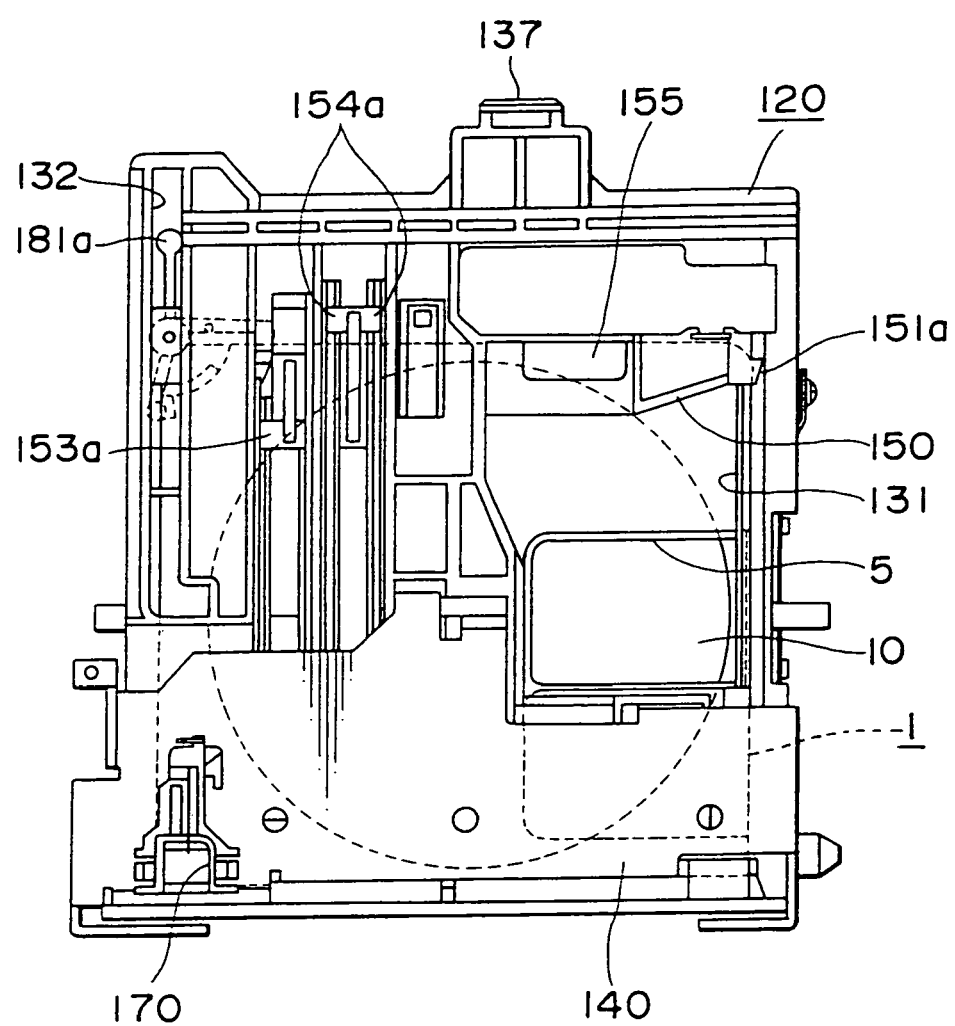
FIG. 19 is a plan view of the cartridge holder showing a state in which the disk cartridge is inserted in the normal orientation and is perfectly withdrawn in the cartridge holder.

When the disk cartridge 1, which has been held by the carrying slider 150, is further inserted in the cartridge holder 120, the carrying slider 150 is moved forwardly together with the disk cartridge 1. When the carrying slider 150 is slightly moved forwardly, the movement thereof is detected by a sensor (not shown), and a mode formation mechanism (which will be described later) is driven on the basis of the detection result of the sensor, to move the carrying slider 150 up to a specific forward withdrawal position. As a result, the disk cartridge 1 is carried to a specific withdrawal position by the carrying slider 150 (see FIG. 19). This will be described in detail later.

The insertion of the disk cartridge 1 in the cartridge holder 120 in an erroneous orientation will be described below. The insertion of the disk cartridge 1 in an erroneous orientation includes the insertion of the disk cartridge in a state in which the rear side of the cartridge in the normal orientation is directed forwardly, the insertion of the disk cartridge in a state in which the upper side of the cartridge in the normal orientation is directed downwardly, and the insertion of the disk cartridge in a state in which the shorter side of the cartridge is directed forwardly.

Figure 20:
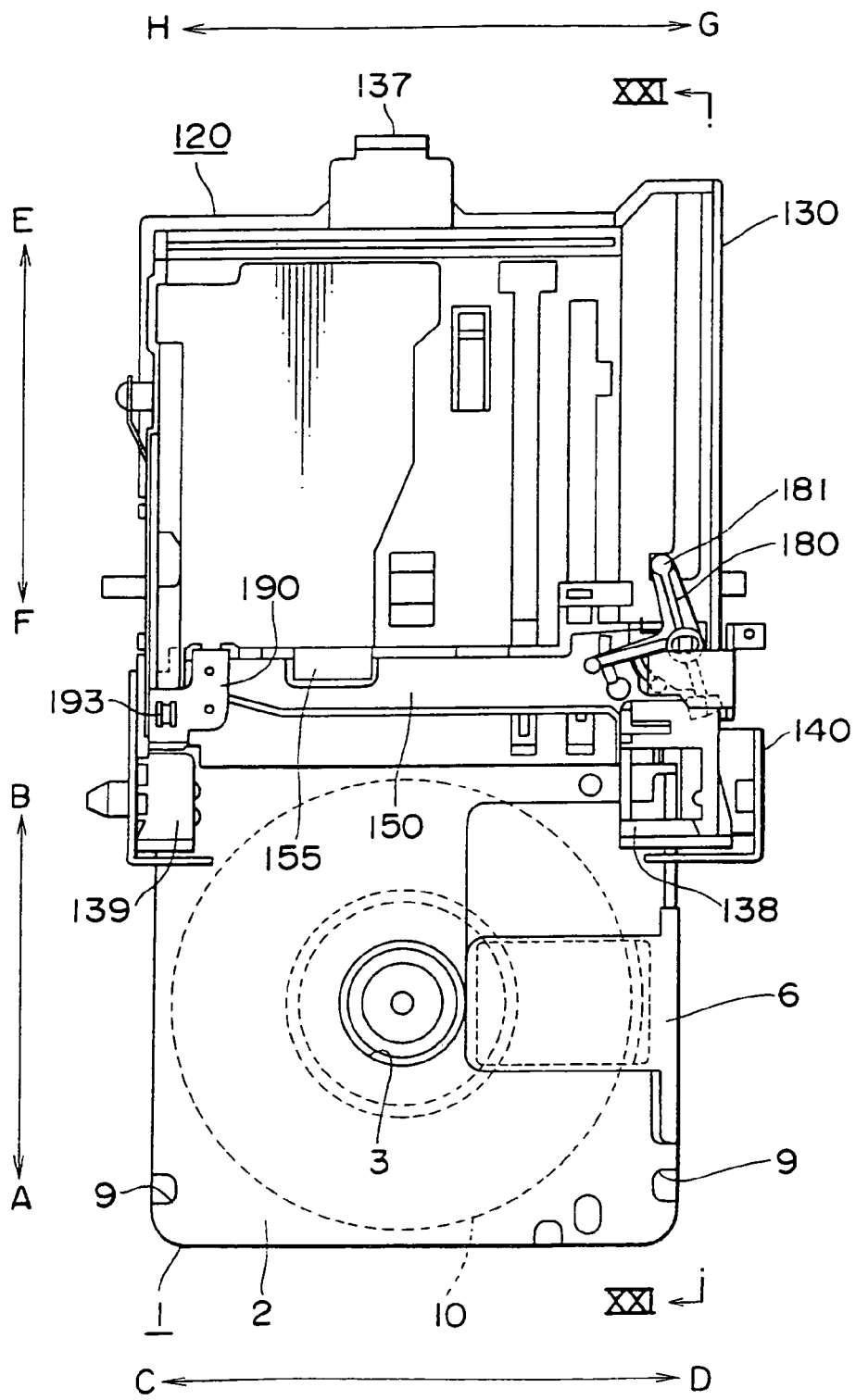
FIG. 20 is a bottom view of the cartridge holder showing a state in which the disk cartridge is inserted in the cartridge holder with the rear side of the disk cartridge is erroneously directed forwardly.
Figure 21:
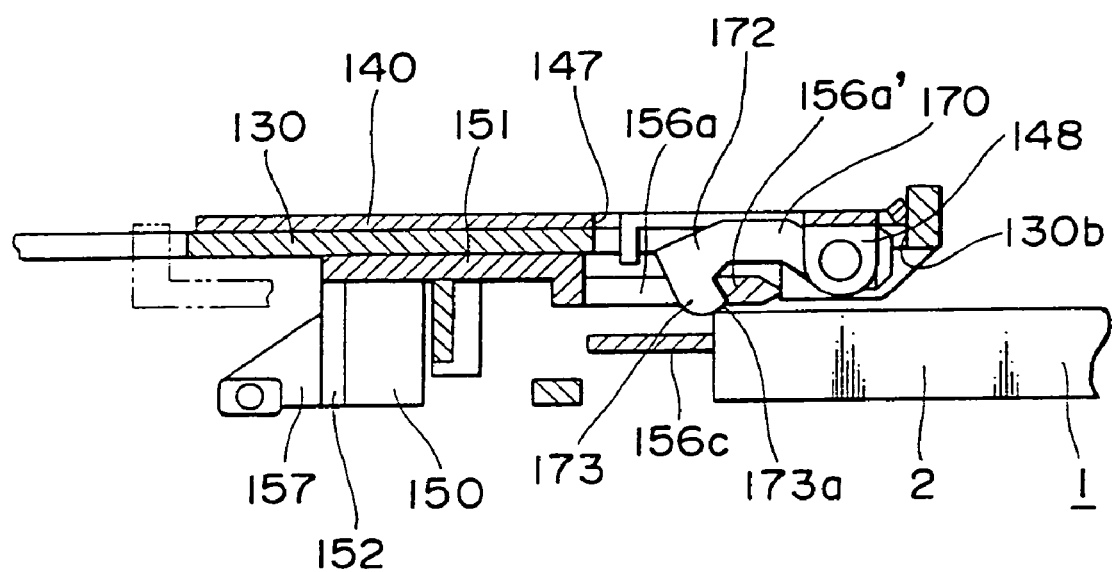
FIG. 21 is an enlarged sectional view taken on line XXI—XXI of FIG. 20.

When the disk cartridge 1 is inserted in the state in which the rear side of the disk cartridge 1 in the normal orientation is directed forwardly, since each of the grooves 7 and 8 does not reach the rear end of the disk cartridge 1, the rear end surface of the disk cartridge 1 is brought into contact with the insertion restricting piece 156c of the cartridge holder 120, with a result that the disk cartridge 1 can no longer enter in the cartridge holder 120 (see FIGS. 20 and 21).

Figure 22:
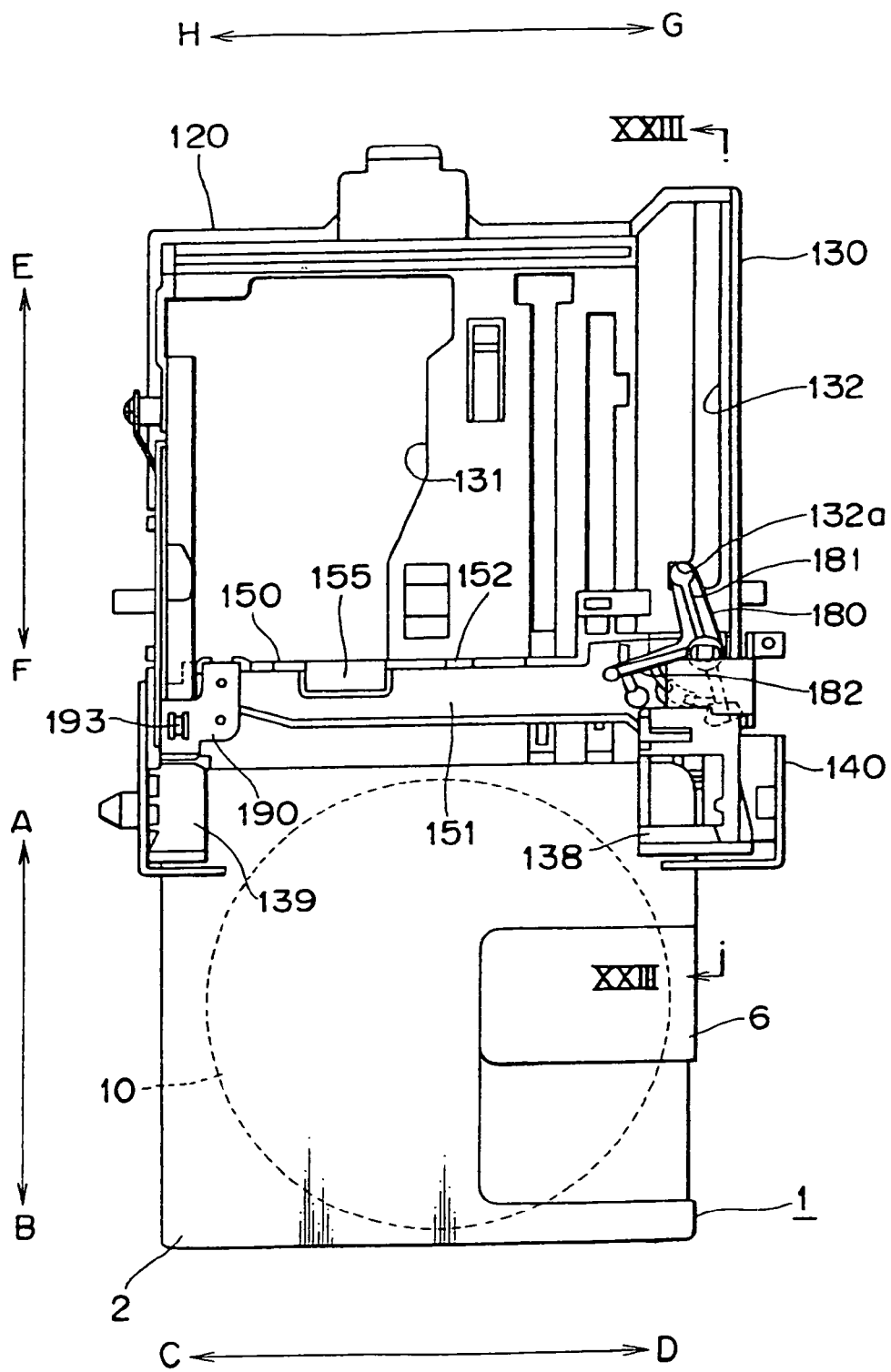
FIG. 22 is a bottom view of the cartridge holder showing a state in which the disk cartridge is inserted in the cartridge holder with the back side of the disk cartridge erroneously directed upwardly.
Figure 23:
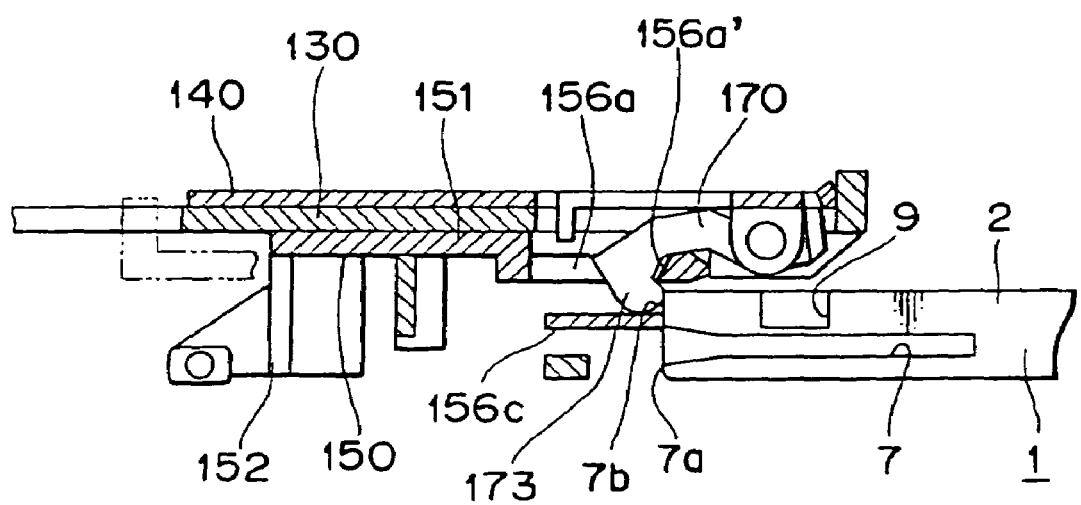
FIG. 23 is an enlarged sectional view taken on line XXIII—XXIII of FIG. 22.
Figure 25:
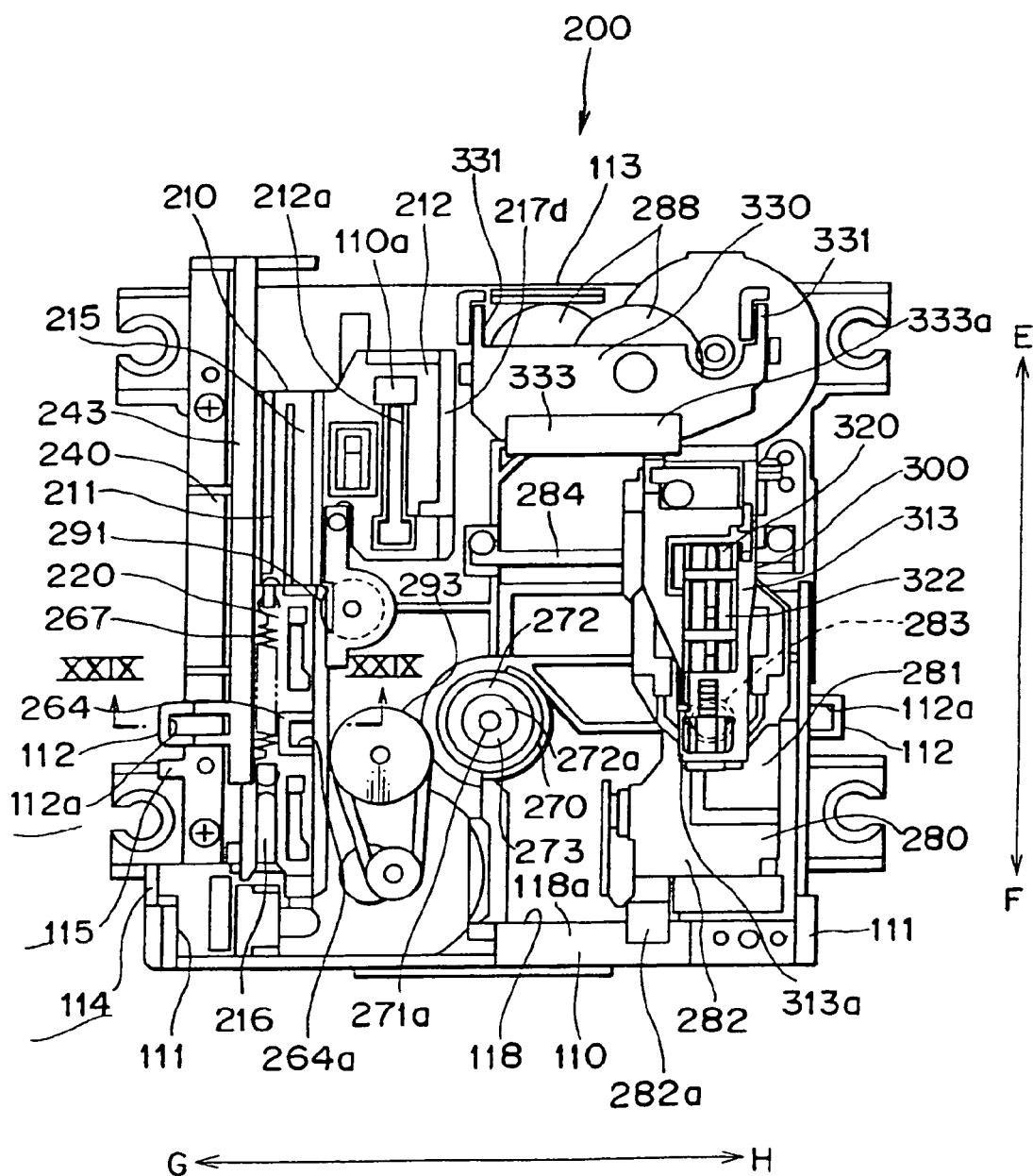
FIG. 25 is a plan view of a main body of the recording and/or reproducing apparatus.
Figure 26:
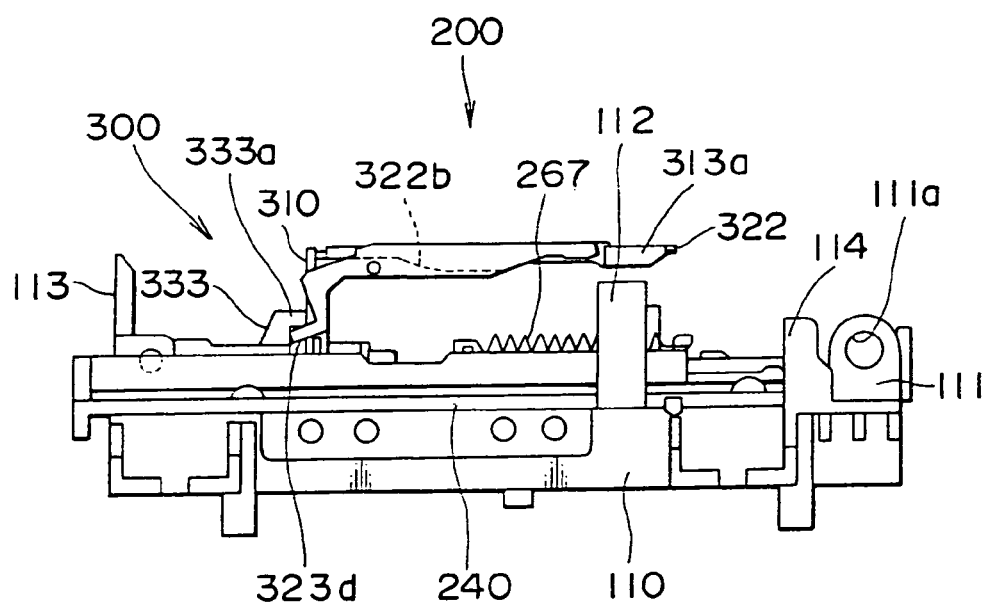
FIG. 26 is a left side view of the main body of the recording and/or reproducing apparatus.
Figure 27:
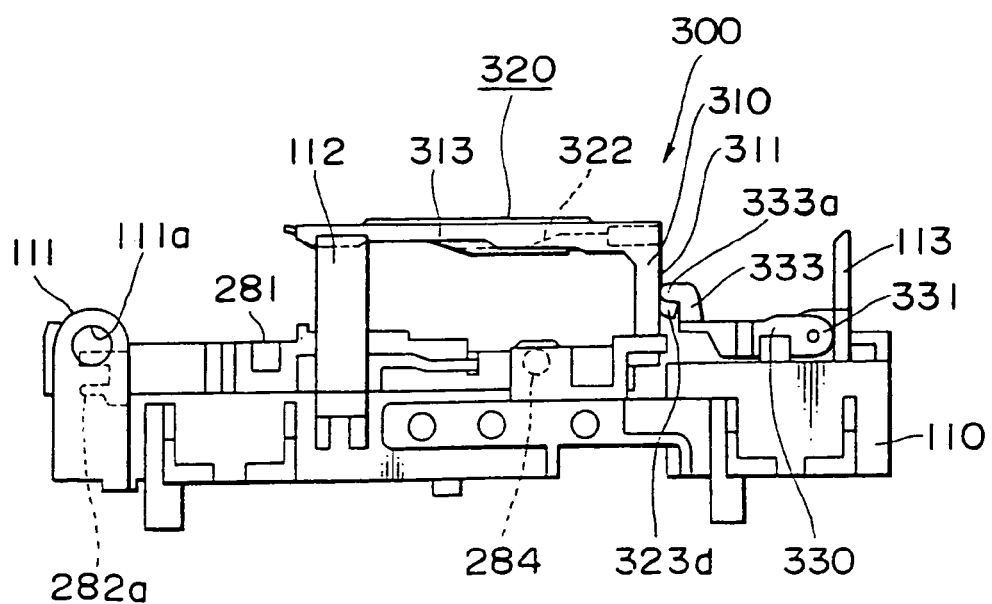
FIG. 27 is a right side view of the main body of the recording and/or reproducing apparatus.

When the disk cartridge 1 is inserted in the state in which the upper side of the disk cartridge 1 in the normal orientation is directed downwardly, since the vertical position of the groove 7, provided at the end portion in the direction D, of the disk cartridge 1 is different from the height position of the insertion restricting piece 156c of the cartridge holder 120, the insertion restricting piece 156c is brought into contact with the portion 7b, higher than the groove 7, of the end portion in the direction D of the front end surface of the disk cartridge 1, more specifically, with a taper portion 7b' continuous to the portion 7b higher than the groove 7, with a result that the disk cartridge 1 can no longer enter in the cartridge holder 120 (see FIGS. 22 and 23).

When the disk cartridge 1 is inserted in the state in which the shorter side of the disk cartridge 1 is directed forwardly and further it is inserted without interfering with the insertion restricting piece 156c, since the disk cartridge 1 enters deeper than the position at which the insertion restricting piece 156c is provided, the second arm piece 182 of the lock lever 180 is pushed rearwardly by the front end surface of the disk cartridge 1, whereby the lock lever 180 is turned counterclockwise, that is, in the direction CCW as viewed from above, so that the lock pin 181a provided on the first arm piece 181 is removed leftwardly from the lock portion 132a of the sliding groove 132 (see FIG. 24). However, since the disk cartridge 1 does not pass through the portion at which the insertion restricting piece 156c is positioned, that is, the portion at which the lock claw 173 of the lock member 170 is positioned, the engagement between the lock claw 173 of the lock member 170 and the hole 156a to be locked of the carrying slider 150 is not released, with a result that the carrying slider 150 cannot be moved forwardly.

As described above, the disk cartridge 1 cannot be inserted in the cartridge holder 120 unless it is inserted in the normal orientation. Such limitation is realized by providing the insertion restricting piece 156c on the carrying slider 150, and providing the lock means (lock member 170) for locking the carrying slider 150 at the standby position, at the position opposed to the insertion restricting piece 156c in the vertical direction, wherein the locking by the lock means is released by the disk cartridge 1 which has overcome the limitation by the insertion restricting piece 156c and passes through the insertion restricting piece 156c. As a result, it is possible to certainly, simply prevent improper insertion of the disk cartridge 1.

A main body of the recording and/or reproducing apparatus will be described below in detail with reference to FIGS. 25 to 29.

The above-described cartridge holder 120 is supported on the vase chassis 110 in such a manner as to be movable in the vertical direction.

The base chassis 110, made from a synthetic resin, is provided with two supporting pieces 111, two guide columns 112, an engagement piece 113, and a slip-off preventive piece 114. The supporting pieces 111 projecting upwardly are provided on left and right ends of a rear end portion of the base chassis 110. Supporting holes 111a are formed in the supporting pieces 111. The guide columns 112 projecting upwardly are provided at positions, slightly offset rearwardly from intermediate portions in the longitudinal direction, of the left and right edges of the base chassis 110. Guide grooves 112a extending in the vertical direction are formed in opposed surfaces of the guide columns 112. The engagement piece 113 projecting upwardly is provided at a position, slightly offset from an intermediate portion in the lateral direction, of a front end portion of the base chassis 110. An engagement sliding hole 113a longer in the vertical direction is formed in the engagement sliding piece 113 (see FIG. 4). The slip-off preventing piece 114 is erected on the left side of the left supporting piece 111 in such a manner as to be slightly spaced therefrom.

The cartridge holder 120 in a tilt posture with the front end portion positioned slightly upwardly is held above the base chassis 110. Then, the pins 142b and 143b to be supported of the connecting member 140 are inserted, from the left side, in the supporting holes 111a of the supporting-pieces 111 of the base chassis 110, and the cartridge holder 120 is turned in the direction in which the front end portion thereof is moved downwardly. With this turning, the sliding pins 136 of the cartridge holder 120 are vertically slidably engaged in the guide grooves 112a formed in the guide columns 112 of the base chassis 110, and a connecting piece 137 formed on the front end portion of the cartridge holder 120 is vertically slidably engaged in the engagement sliding hole 113a of the engagement piece 113 formed on the front end portion of the base chassis 110. A tensile coil spring 116 (see FIG. 4) is stretched between the spring catch piece 144b of the connecting member 140 of the cartridge holder 120 and a spring catch piece 115 projecting from the left side surface of a rear end portion of the base chassis 110, whereby the connecting member 140 is biased in the direction in which the front end portion thereof is moved downwardly.

As described above, the cartridge holder 120 is supported on the base chassis 110 in such a manner as to be movable in the vertical direction. In the state in which the cartridge holder 120 is thus supported on the base chassis 110, the left piece 142 to be supported of the connecting member 140 of the cartridge holder 120 is positioned between the left supporting piece 111 and the slip-off preventive piece 114 of the base chassis 110, and accordingly, the leftward movement of the connecting member 140 is limited. As a result, it is possible to prevent the pins 142b and 143b to be supported from being slipped off leftwardly from the supporting holes 111a of the supporting pieces 111 of the base chassis 110.

A mode formation mechanism, a disk rotation drive mechanism, an optical pickup mechanism, an overwriting head mechanism, and the like are mounted on the above-described base chassis 110, to constitute a main body 200 of the recording and/or reproducing apparatus 100.

The mode formation mechanism includes two sliders, that is, a mode slider 210 and a loading slider 220.

Figure 30:
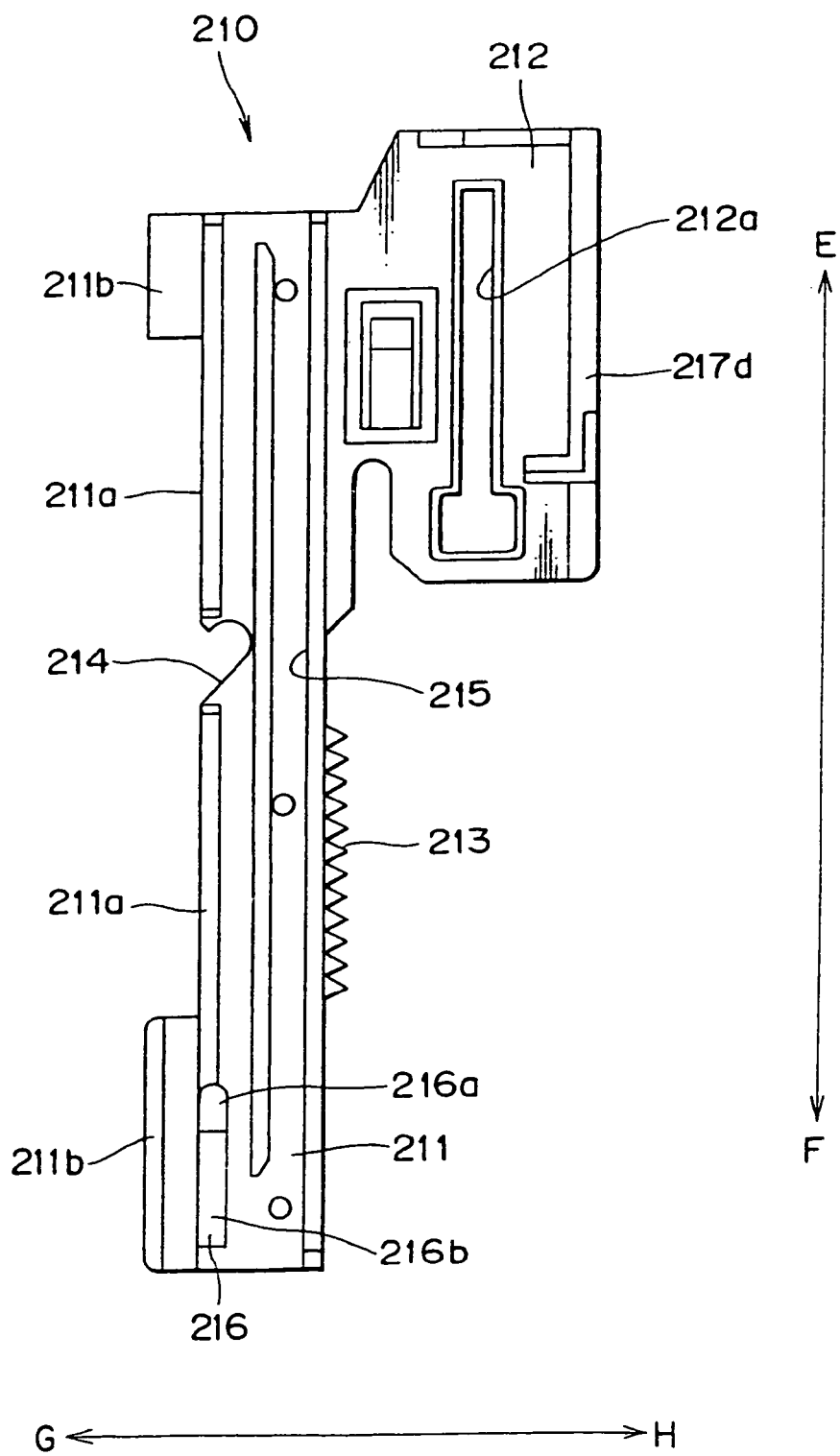
FIG. 30 is a plan view showing a mode slider.
Figure 31:
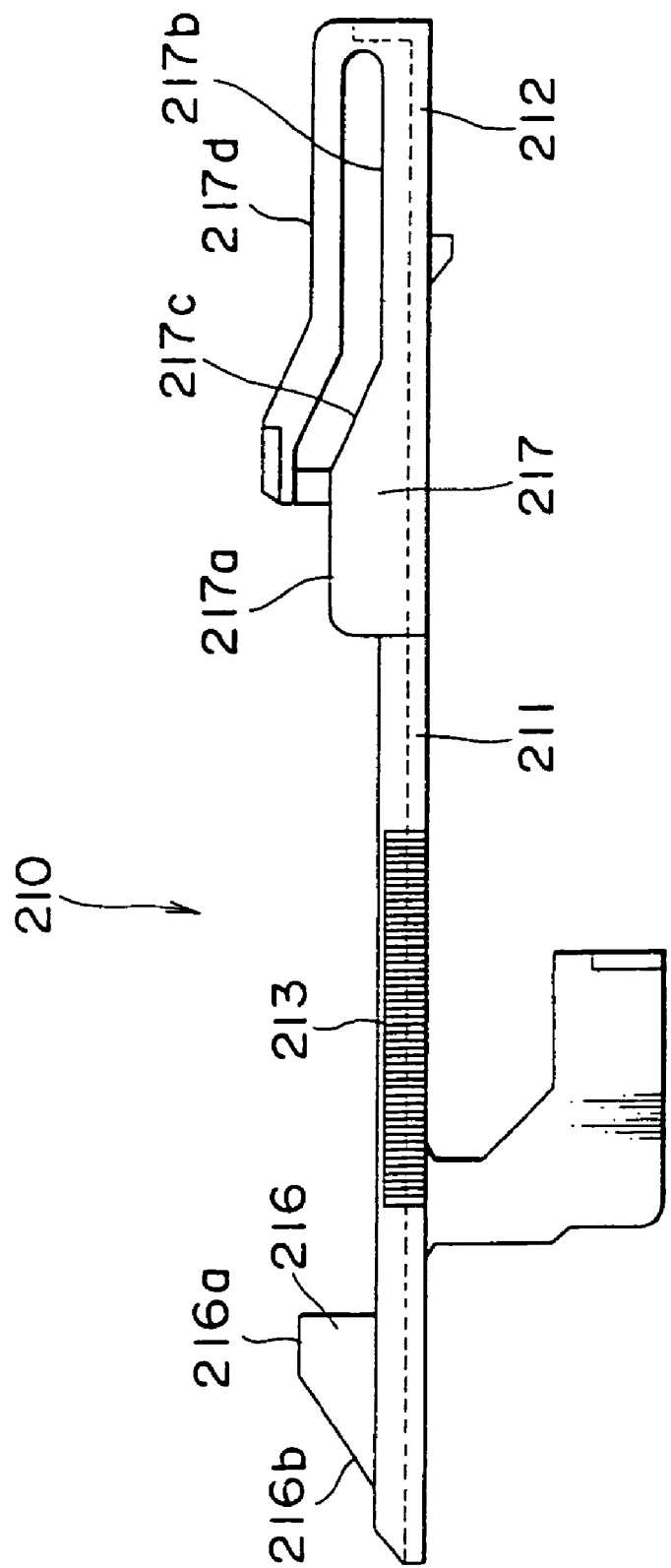
FIG. 31 is a right side view of the mode slider.
Figure 32:
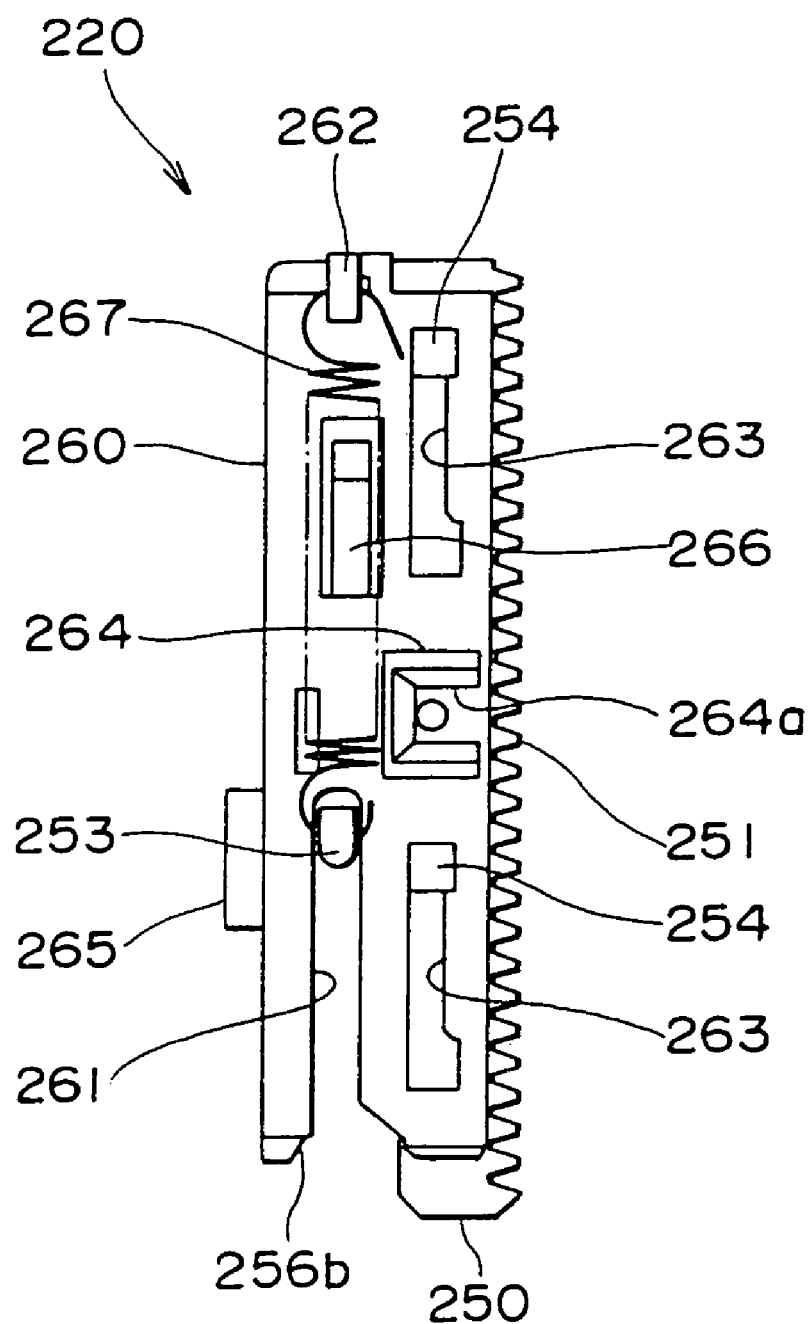
FIG. 32 is a plan view of a loading slider.
Figure 33:
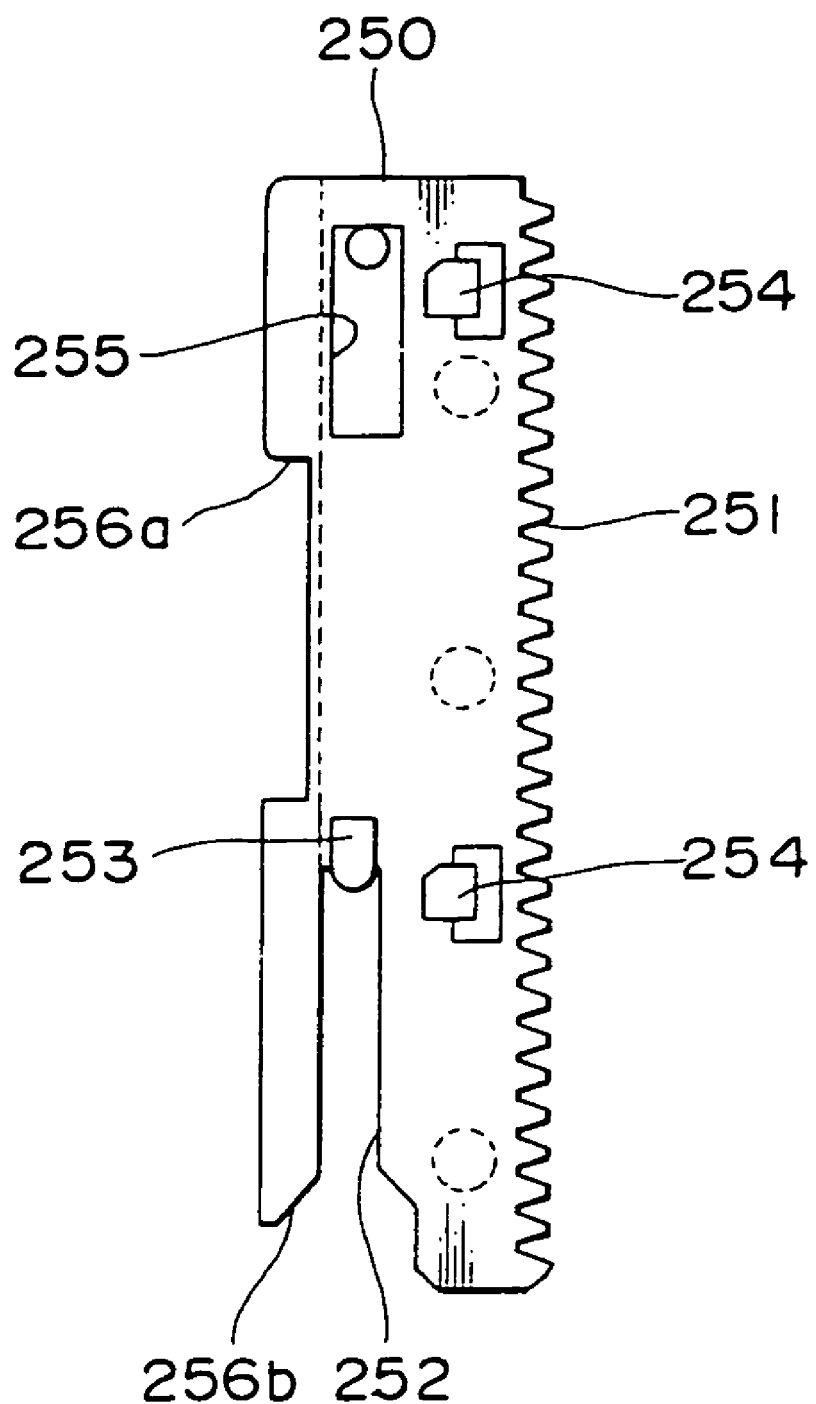
FIG. 33 is a plan view showing a rack formation portion of the loading slider.
Figure 34:
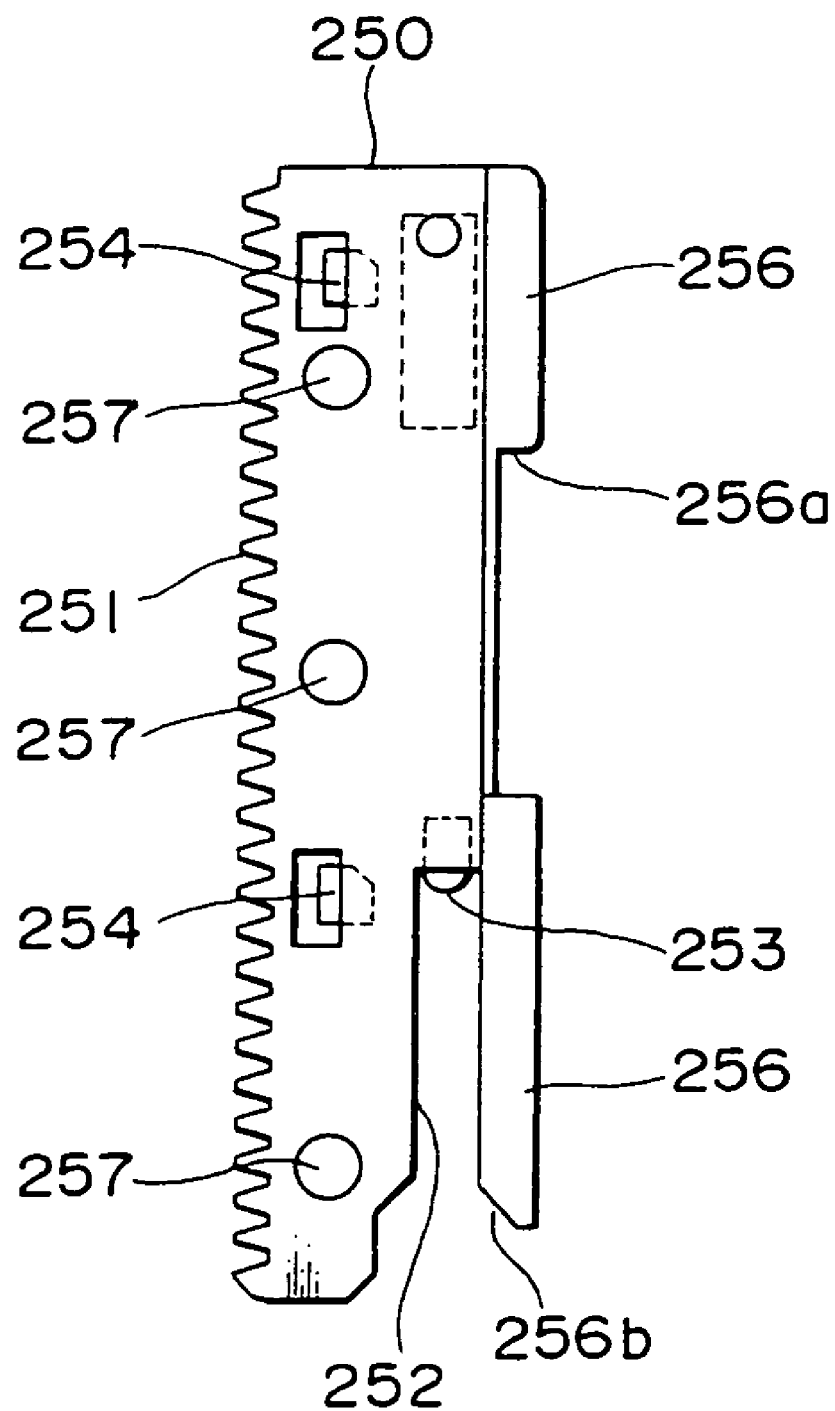
FIG. 34 is a bottom view showing the rack formation portion of the loading slider.
Figure 35:
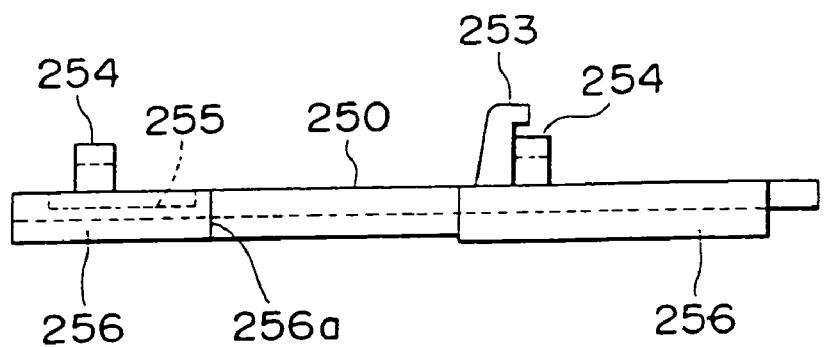
FIG. 35 is a left side view showing the rack formation portion of the loading slider.

The mode slider 210, which is made from a synthetic resin, is supported on the upper surface of the base chassis 110 in such a manner as to be movable in the longitudinal direction, that is, in the direction EF (see FIG. 25) As shown in FIGS. 30 and 31, the mode slider 210 has a rack formation portion 211 formed into a plate shape longer substantially in the longitudinal direction, and a head drive portion 212 projecting rightwardly, that is, in the direction H from a front end portion of the rack formation portion 211. Rack teeth 213 are formed on the right side edge of the rack formation portion 211 in a range from an intermediate portion in the longitudinal direction to a portion near the front end. An engagement cutout 214 extending rightwardly, forwardly is formed in a portion, slightly offset from an intermediate portion in the longitudinal direction, of the left side edge of the rack formation portion 211. A low side wall 211a is erected on a portion, excluding the engagement cutout 214, of the left side edge of the rack formation portion 211. A piece 211b to be pushed, which projects leftwardly, is provided on each of the front and rear end portions of the rack formation 211 at a position outside the side wall 211a. A guide groove 215 extending in the longitudinal direction is formed in the upper surface of the rack formation portion 211 in such a manner as to extend along the right side edge. A cam portion 216 is formed on a front end portion of the side wall 211a of the rack formation portion 211. The upper edge of the cam portion 216 has a rear end portion 216a extending in the horizontal direction at the highest position and a tilt portion 216b tilted forwardly, downwardly from the rear end portion 216a.

A cam portion 217 is formed on the head drive portion 212 of the mode slider 210 in such a manner as to extend in the longitudinal direction along the right side edge. The upper edge of the cam portion 217 has a high level portion 217a disposed at the rear end in such a manner as to extend in the horizontal direction at the highest position, a low level portion 217b disposed at the front end in such a manner as to extend in the horizontal direction at a low,position, and a tilt portion 217c which connects the high level portion 217a to the low level portion 217b and which is tilted forwardly, downwardly. An auxiliary piece 217d is formed on the head drive portion 212 in such a manner as to be disposed over the portions 217a, 217b and 217c of the upper edge of the cam portion 217 with a slight gap put therebetween, whereby a cam groove following the shape of the upper edge of the cam portion 217 is formed. A slit 212a to be guided, which extends in the longitudinal direction, is formed in the head drive portion 212.

Figure 28:
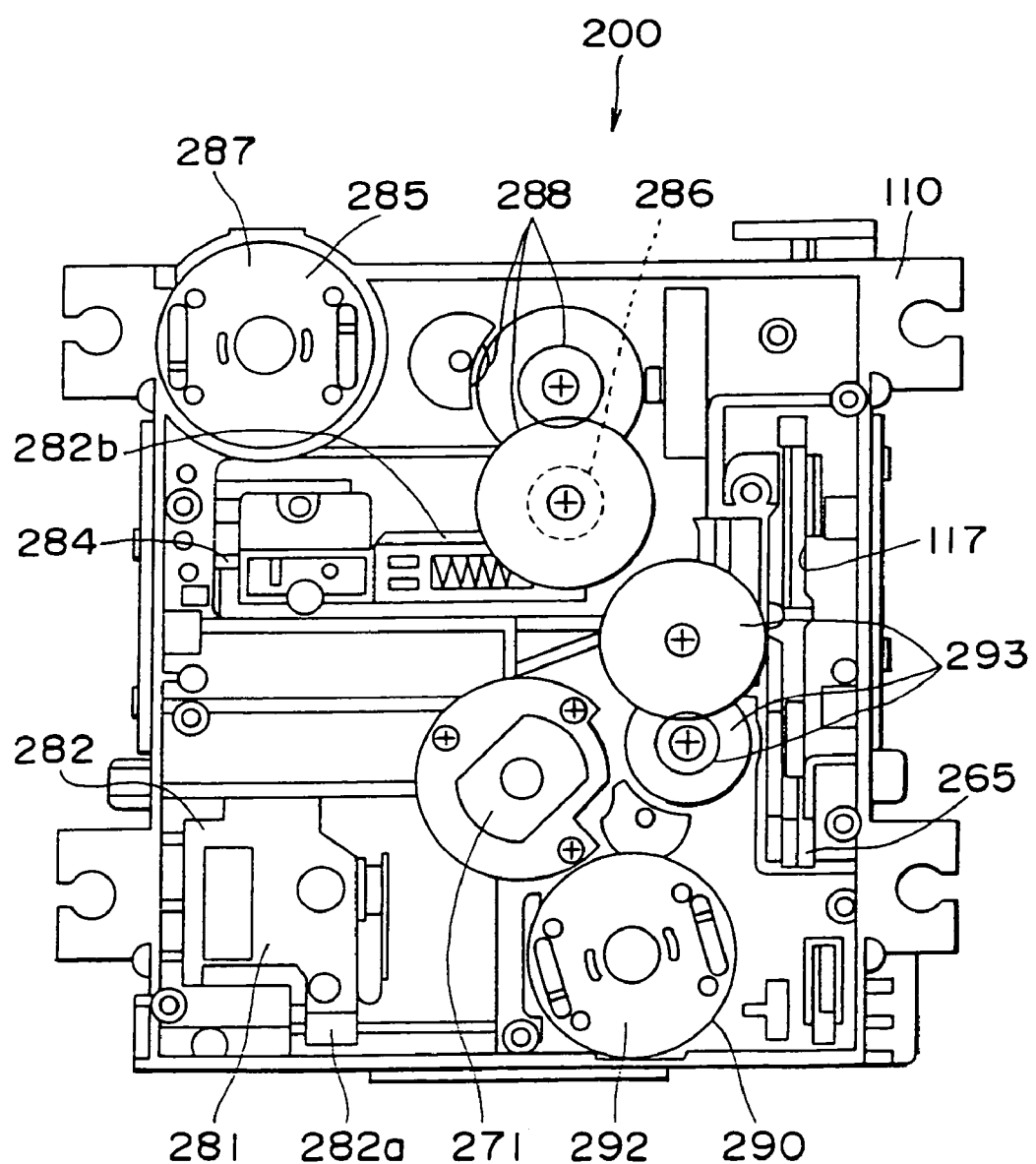
FIG. 28 is a bottom view of the main body of the recording and/or reproducing apparatus.
Figure 29:
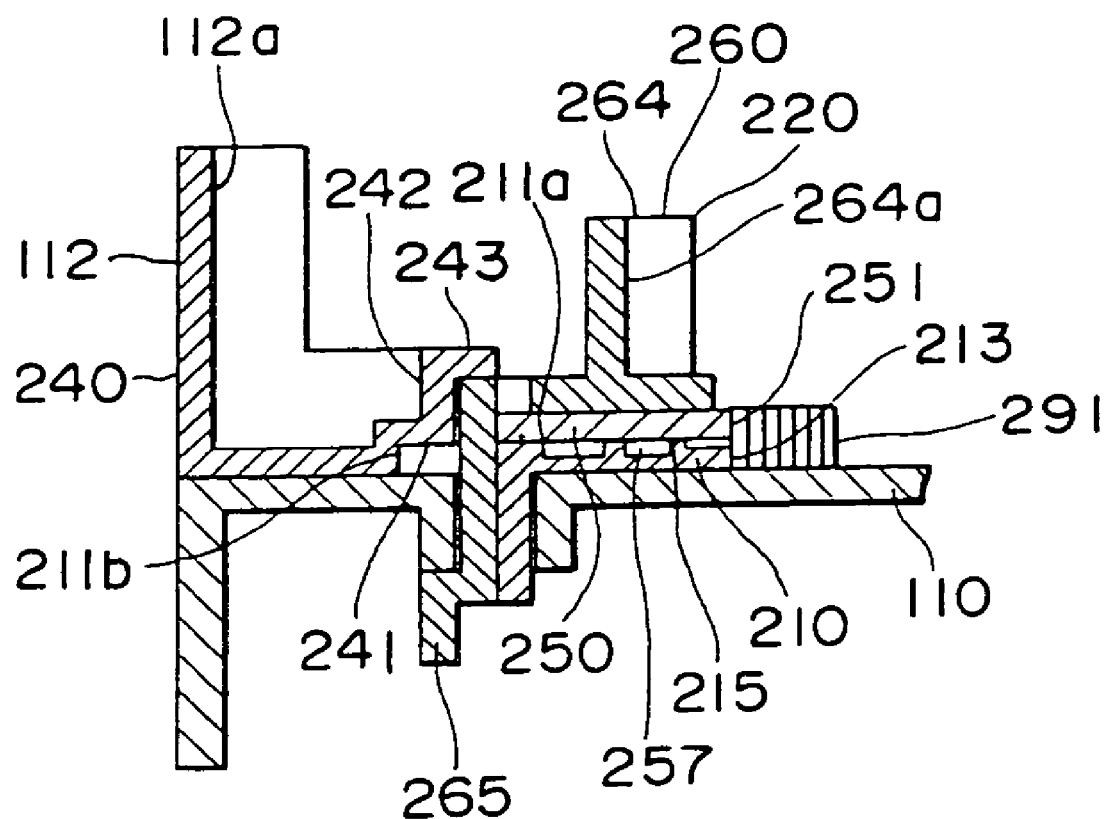
FIG. 29 is a sectional view taken on line XXIX—XXIX of FIG. 25.

A slit 117 extending in the longitudinal direction is formed in a portion along the left side edge of the base chassis 110 (see FIG. 28). A front end portion of a lock piece 230 is turnably supported by the right side edge near the front end of the slit 117, and a lock pin 231 projects from a rear end portion of the lock piece 230 (see FIGS. 44 and 45).

The mode slider 210 is supported on the upper surface of the base chassis 110 in such a manner as to be slidable in the longitudinal direction. In addition, a guide projection 110a erected on the base chassis 110 is slidably engaged in the slit 212a to be guided of the mode slider 210. An auxiliary member 240 is fixed on the left side edge of the base chassis 110, and a step 241 is formed on the lower end of the right side surface of the auxiliary member 240. The pieces 211b to be pushed of the mode slider 210 are slidably engaged between the step 241 and the upper surface of the base chassis 110 (see FIG. 29). In addition, the above-described left guide column 112 and the spring catch piece 115 are formed on the auxiliary member 240.

The loading slider 220 has a rack formation portion 250 and a limiter portion 260.

The rack formation portion 250 made from a synthetic resin having a good sliding characteristic is, as shown in FIGS. 32 to 35, formed into a plate shape longer substantially in the longitudinal direction. Rack teeth 251 are formed over the right side edge of the rack formation portion 250. A slit 252 opened rearwardly is formed in a portion, near the left side edge, of the rack formation portion 250 in such a manner as to extend from the rear end to an approximately intermediate portion in the longitudinal direction. A spring catch piece 253 projects from the deepest end of the slit 252. Two guide projections 254 are formed on a portion, near the right side edge, of the rack formation portion 250 in such a manner as to be spaced from each other in the longitudinal direction. A shallow groove 255 extending in the longitudinal direction is formed in a front end portion of the rack formation portion 250 at positions offset-leftwardly from these guide projections 254. A projecting rib 256 projecting downwardly is formed on the left side edge of the rack formation portion 250. A cutout 256a is formed in the projecting rib 256 in such a manner as to extend from an intermediate position in the longitudinal direction to a position near the rear end. A tilt surface 256b tilted leftwardly, rearwardly is formed on a rear end portion of the projecting rib 256. Three sliding projections 257 are provided on a portion, near the right side edge, of the back surface of the rack formation portion 250 in such a manner as to be spaced from each other in the longitudinal direction.

Figure 36:
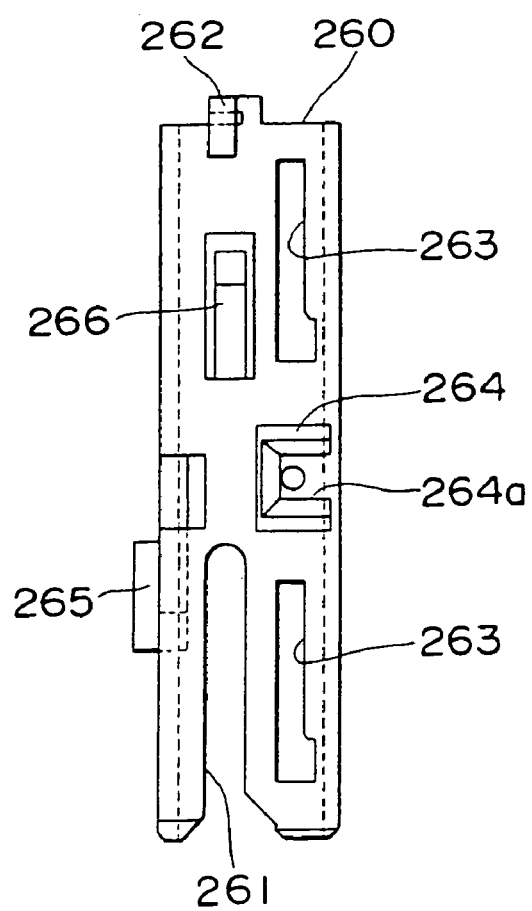
FIG. 36 is a plan view showing a limiter portion of the loading slider.
Figure 37:
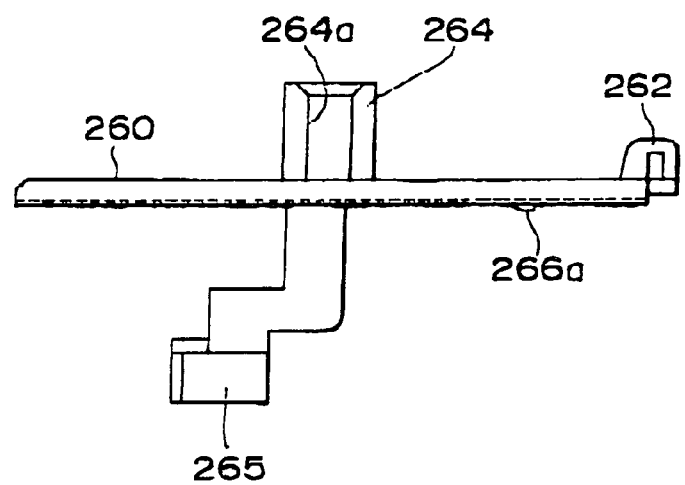
FIG. 37 is a right side view showing the limiter portion of the loading slider.

The limiter portion 260 made from a synthetic resin is, as shown in FIGS. 36 and 37, formed into a plate shape longer substantially in the longitudinal direction. The length of the limiter portion 260 is slightly shorter than that of the rack formation portion 250. The width of the limiter portion 260 is narrower than that of the rack formation portion 250 by a projecting width of rack teeth 25. A slit 261 opened rearwardly is formed in a portion, near the left side edge, of the limiter portion 260 in such a manner as to extend from an approximately intermediate portion in the longitudinal direction to the rear end. A spring catch piece 262 projects from a portion, which crosses the extension of the slit 261, of a front end portion of the limiter portion 260. Two slits 263 to be guided, which extend in the longitudinal direction, project from a portion, near the right side edge, of the limiter portion 260 in such a manner as to be spaced from each other in the longitudinal direction. A connecting column 264 is erected on a longitudinal intermediate portion along the right side edge of the limiter portion 261. A connecting groove 264a opened upwardly is formed in a right side surface of the connecting column 264 in such a manner as to extend in the vertical direction. A projection piece 265 projects downwardly from an approximately intermediate position in the longitudinal direction of a left side edge portion of the limiter portion 260. An elastic piece 266 extending in the longitudinal direction is formed between the deepest end of the slit 261 of the limiter portion 260 and the spring catch piece 262. The elastic piece 266 is obtained by forming a U-shaped slit opened forwardly and extending longer in the longitudinal direction, thereby swelling a portion surrounded by the U-shaped slit. A projection 266a is formed on the back surface of a front end portion of the elastic piece 266 in such a manner as to slightly project downwardly from the back surface of the limiter portion 260.

The limiter portion 260 is overlapped to the rack formation portion 250. The guide projections 254 of the rack formation portion 250 are slidably engaged in the slits 263 to be guided of the limiter portion 260 in such a manner as to be prevented from being slipped-off from the slits 263 to be guided. The spring catch piece 253 of the rack formation portion 250 is slidably engaged in the slit 261 of the limiter portion 260. The projection 266a formed on the back surface of the front end portion of the elastic piece 266 of the limiter portion 260 is slidably engaged in the shallow groove 255 formed in the upper surface of the rack formation portion 250. The projection piece 265 of the limiter portion 260 is positioned in the cutout 256a formed in the left side edge of the rack formation portion 250 in such a manner as to be movable in the longitudinal direction. A limiter spring (tensile coil spring) is stretched between the spring catch piece 253 of the rack formation portion 250 and the spring catch piece 262 of the limiter portion 260. The limiter portion 260 is thus connected to the rack formation portion 250. As viewed from above, the rack teeth 251 of the rack formation portion 250 project leftwardly from the left side edge of the limiter portion 260.

The limiter portion 260 is biased to the rack formation portion 250 by the limiter spring 267 and is kept as still by the contact of the spring catch piece 253 of the rack formation portion 250 with the deepest end of the slit 261 of the limiter portion 260. When a force against the biasing force of the limiter spring 267 is applied to the limiter portion 260, that is, a forward force is applied to the limiter portion 260, the limiter portion 260 is moved forwardly, that is, in the direction E (see FIG. 25) relative to the rack formation portion 250. The movement of the limiter portion 260 is stopped when the projection 266a of the elastic piece 266 of the limiter portion 260 comes in contact with the front end of the shallow groove 255 of the rack formation portion 250. The assembly of the rack formation portion 250 and the limiter portion 260 thus acts as the loading slider 220.

The loading slider 220 configured as described above is overlapped on the mode slider 210 in such a manner as to be movable in the longitudinal direction. To be more specific, the sliding projections 257 formed on the back surface of the rack formation portion 250 of the loading slider 220 are slidably engaged in the guide groove 215 formed in the upper surface of the mode slider 210. A hood piece 243, which projects leftwardly from the upper edge of a side wall 242 projecting upwardly from the left side edge of the auxiliary member 240, covers from above the upper surface of a left side edge portion of the limiter portion 260 of the loading slider 220 (see FIG. 29), thereby preventing the loading slider 220 from being slipped-off from the mode slider 210.

In the state in which the mode slider 210 and the loading slider 220 are overlapped to each other as described above, the rack teeth 213 of the mode slider 210 and the rack teeth 251 of the loading slider 220 are disposed in such a manner as to be moved along the same locus as viewed from above; and the projecting rib 256 formed on the rack formation portion 250 of the loading slider 220 is positioned along the left side of the left side edge of the rack formation portion 211 of the mode slider 210, and the cam portion 216 formed on the mode slider 210 is positioned on the movement locus of the slits 252 and 261 of the loading slider 220.

Figure 43:
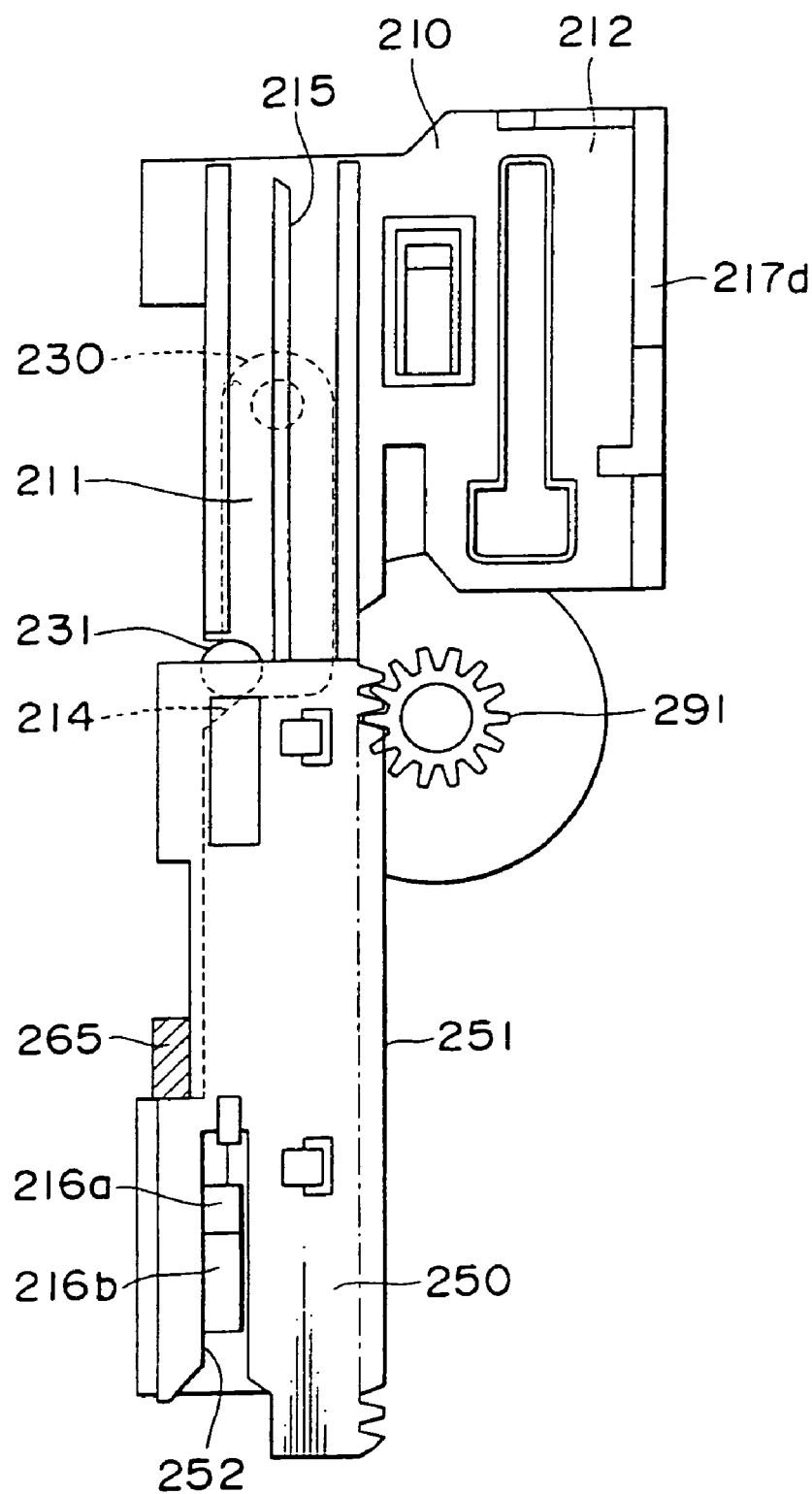
FIG. 43 is a plan view of two sliders located at the initial positions.

In the state in which the mode slider 210 and the loading slider 220 are located at the rear ends of the movement ranges, that is, at the initial positions (see FIGS. 40 to 43), the rack teeth 251 of the loading slider 220, which are positioned on the upper side, are substantially overlapped to the rack teeth 213 of the mode slider 210, which are positioned on the lower side. At this time, since the rack teeth 251 of the loading slider 220 are longer than the rack teeth 213 of the mode slider 210, the front end portions of the rack teeth 251 of the loading slider 220 project forwardly from the front ends of the rack teeth 213 of the mode slider 210 (see FIG. 43). Also, the cam portion 216 of the mode slider 210 is positioned in the slits 252 and 261 of the loading slider 220, and the lock pin 231 of the lock piece 230 is engaged in the engagement cutout 214 of the mode slider 210 to lock the mode slider 210 at the initial position. Further, the projecting rib 256 of the loading slider 220 is positioned on the left side of the opening of the engagement cutout 214 for preventing the slip-off of the lock pin 231 from the engagement cutout 214.

Further, the restricting piece 144a formed on the connecting member 140 of the cartridge holder 120 is placed on the front end portion 216a of the cam portion 216 of the mode slider 210 disposed at the initial position, whereby the cartridge holder 120 is positioned at the rear end of the movement range of the mode slider 210. At this time, the engagement projection 157a provided on the connecting piece 157 of the carrying slider 150 of the cartridge holder 120 is engaged in the connecting groove 264a formed in the connecting column 264 of the loading slider 220.

A disk rotation drive mechanism 270 is disposed at an approximately central portion of the base chassis 110. The disk rotation drive mechanism 270 includes a spindle motor 271 fixed on the base chassis 110, and a turn table 272 fixed on an upper end portion of a spindle shaft 271a of the spindle motor 271. A circular base portion 272a, which is to be fitted in the circular fitting recess 11b formed in the back surface of the core 11 of the magneto-optical disk 10, is formed on the upper surface of the turn table 272. An annular chucking magnet 273 is fixedly buried in the upper surface of the base portion 272a.

The main body of the recording and/or reproducing apparatus will be described in detail with reference to FIGS. 25 to 28.

An optical pickup mechanism 280 is disposed on the base chassis 110 at a position offset rightwardly from the disk rotation drive mechanism 270. The optical pickup mechanism 280 has an optical pickup apparatus 281 and a thread mechanism 285 for moving the optical pickup apparatus in the lateral direction, that is, in the direction GH.

The optical pickup apparatus 281 includes an objective lens 283 and other optical components disposed on a slide base 282. A guide shaft 284 extending in the lateral direction is disposed on a portion, slightly offset forwardly from an approximately intermediate portion in the longitudinal direction, of an approximately right half of the upper surface of the base chassis 110. A front end portion of the slide base 282 is slidably supported by the guide shaft 284. Upper and lower sliding pieces 282a project rearwardly from a rear end portion of the slide base 282. The sliding pieces 282a are disposed in a state in which they hold, from above and below, a rear side opening edge 118a of an opening portion 118 formed in a rear end portion of the right half of the base chassis 110 in such a manner as to be slidable in the lateral direction. A rack portion 282b is formed on a front end portion of the slide base 282.

The tread mechanism 285 includes a pinion 286 meshed with the rack portion 282b, a thread motor 287, and a transmission gear row 288 for transmission the rotation of the thread motor 287.

A loading drive portion 290 for moving the mode slider 210 and the loading slider 220 is provided on the base chassis 110. The loading drive mechanism 290 includes a pinion 291 for moving the mode slider 210 and the loading slider 220, a drive motor 292, and a transmission gear row 293 for transmitting the rotation of the drive motor 292 to the pinion 291.

The pinion 291 has a width which allows the pinion 291 to be meshed with the rack teeth 213 of the mode slider 210 and the rack teeth 251 of the loading slider 220. The pinion 291 is located at a position at which the pinion 291 is slightly in front of the front ends of the rack teeth 213 of the mode slider 210 at the initial position and is meshed with the front end portions of the rack teeth 251 of the loading slider 220 at the initial position.

As described above, when the disk cartridge 1 is inserted in the cartridge holder 120 in the normal orientation, the locking of the carrying slider 150 to the cartridge holder 120 at the standby position is released, and when the disk cartridge 1 is further inserted in the cartridge holder 120, the carrying slider 150 is pushed by the disk cartridge 1 to be moved forwardly. When the carrying slider 150 is slightly moved forwardly from the standby position, such movement is detected by the sensor (not shown), and the drive motor 292 of the loading drive portion 290 is driven in the loading direction on the basis of the detection result of the sensor. As a result, the pinion 291 is rotated clockwise as viewed from above via the transmission gear row 293. In addition, when the carrying slider 150 is pushed by the disk cartridge 1 to be moved forwardly, a forward movement force is applied to the loading slider 220 because the loading slider 220 is connected to the carrying slider 150 via the connecting piece 157 of the carrying slider 150 and the connecting column 264 of the loading slider 220. In this case, the loading slider 220 is of a double structure in which the limiter portion 260 is overlapped to the rack formation portion 250 and is connected thereto via the limiter spring 267, and accordingly, when the carrying slider 150 is moved forwardly, the limiter spring 267 is extended and thereby only the limiter portion 260 is moved forwardly, with a result that forcible rotation of the pinion 291 via the rack teeth 251, meshed with the pinion 291, of the rack formation portion 250 can be prevented.

When the pinion 291 is rotated clockwise, the loading slider 220 having the rack teeth 251 meshed with the pinion 291 is moved forwardly, that is, in the direction E. When the loading slider 220 is moved forwardly, the carrying slider 150 connected to the loading slider 220 is moved forwardly. When the carrying slider 150 is moved forwardly, the engagement projections 183b and 193 provided on the carrying slider 150 are engaged in the left and right cutouts 9 of the disk cartridge 1, whereby the disk cartridge 1 whose left and right sides are held by the carrying slider 150 is carried forwardly, that is, toward the depth of the cartridge holder 120. During a period in which the disk cartridge 1 is carried toward the depth of the cartridge holder 120, the shutter opening piece 161 of the shutter opening/closing member 160 enters in the groove 7 of the disk cartridge 1 to release the locking of the shutter 6 at the close position, and the rear tilt edge of the shutter closing piece 162 rides on the right side of the intermediate portion 6c of the shutter 6 to be engaged in the engagement hole 6d formed in the intermediate portion 6c of the shutter 6. When the disk cartridge 1 is further carried toward the depth of the cartridge holder 120, since the front end of the intermediate portion 6c of the shutter 6 is pushed relatively, rearwardly by the shutter opening piece 161, the shutter 6 is moved toward the open position.

Figure 44:
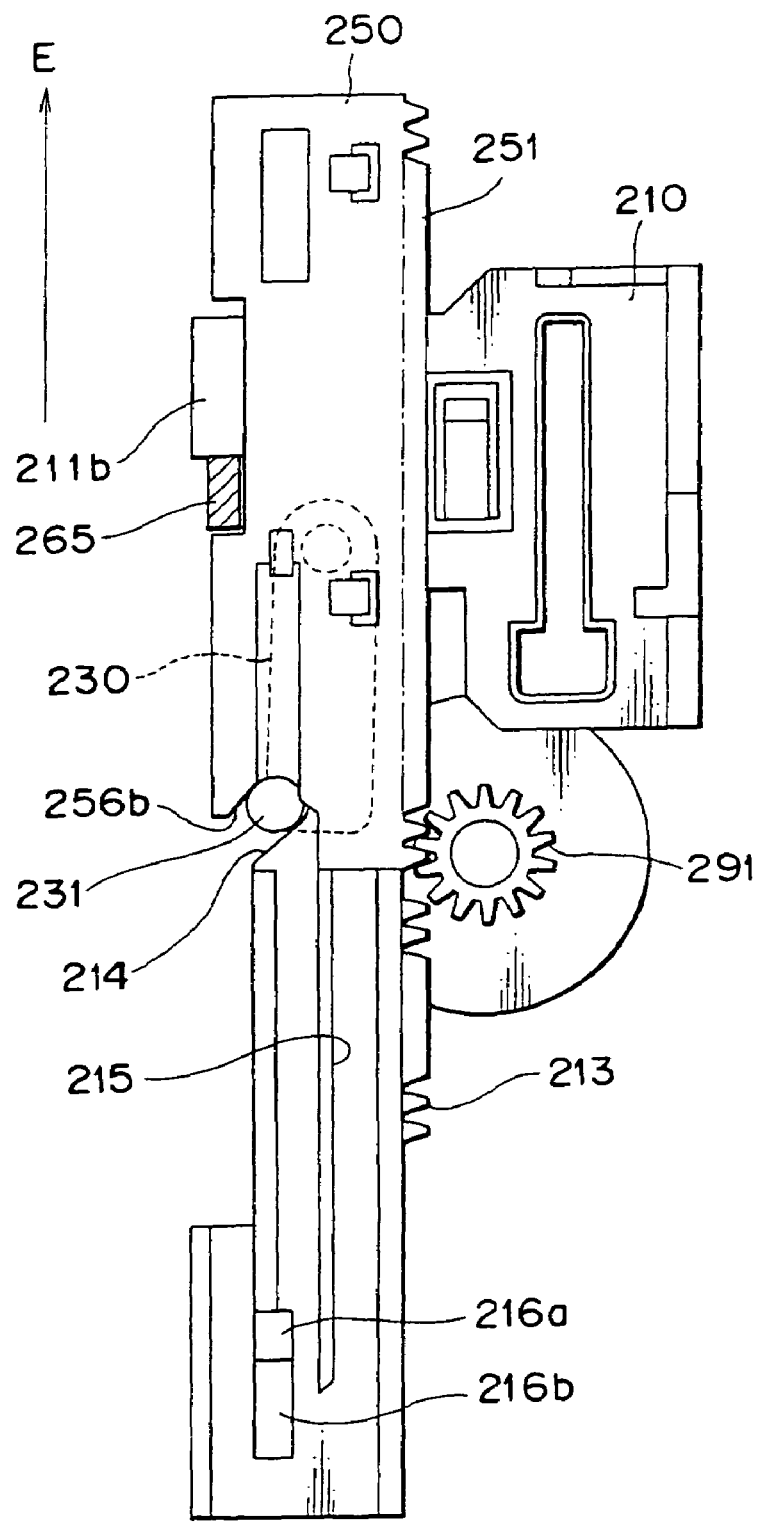
FIG. 44 is a plan view of the two sliders in the course of movement from the initial positions to loading ended positions.
Figure 45:
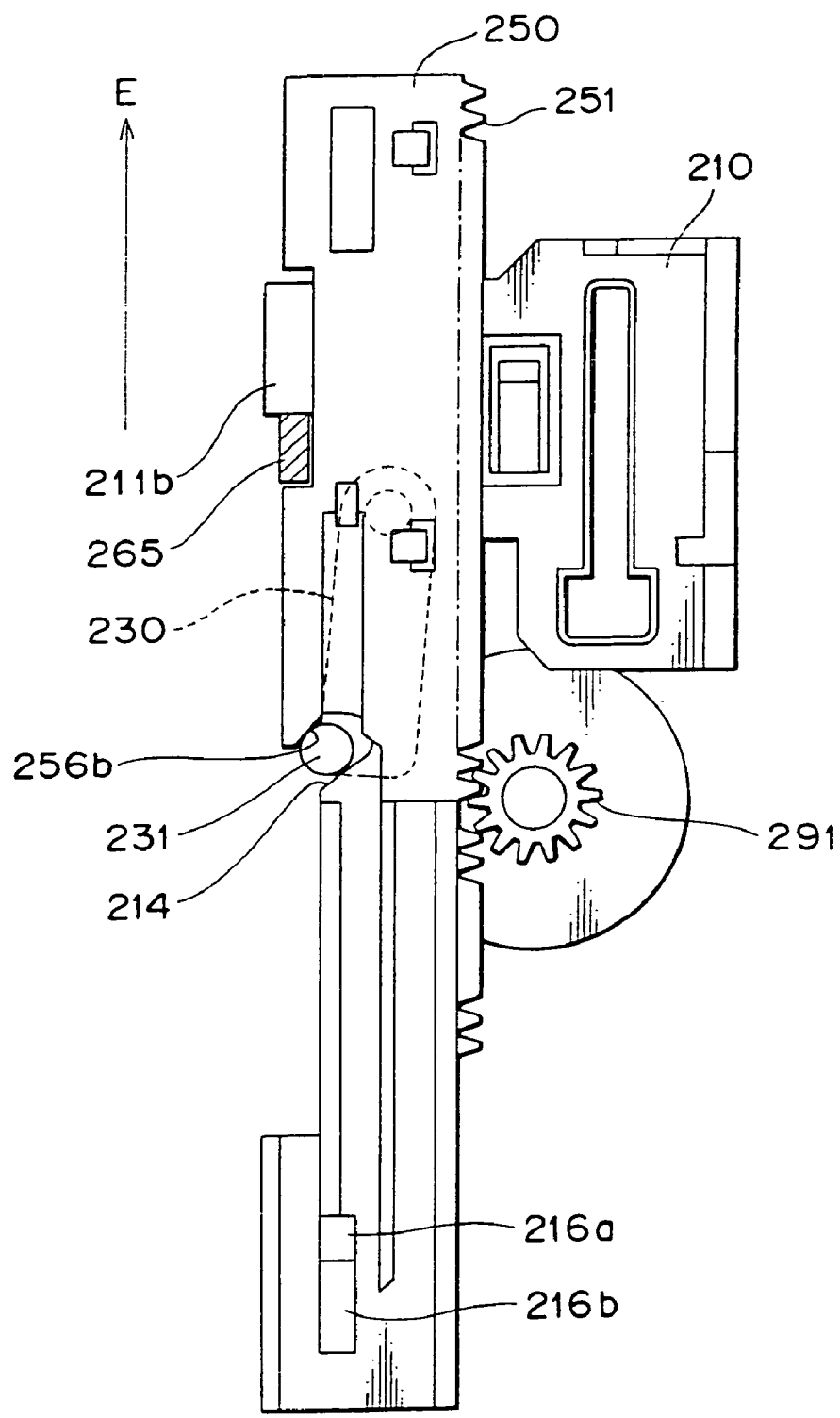
FIG. 45 is a plan view of the two sliders in a state being closer to the loading ended positions than those in the state shown in FIG. 44 in the course of movement from the initial positions to the loading ended positions.
Figure 46:
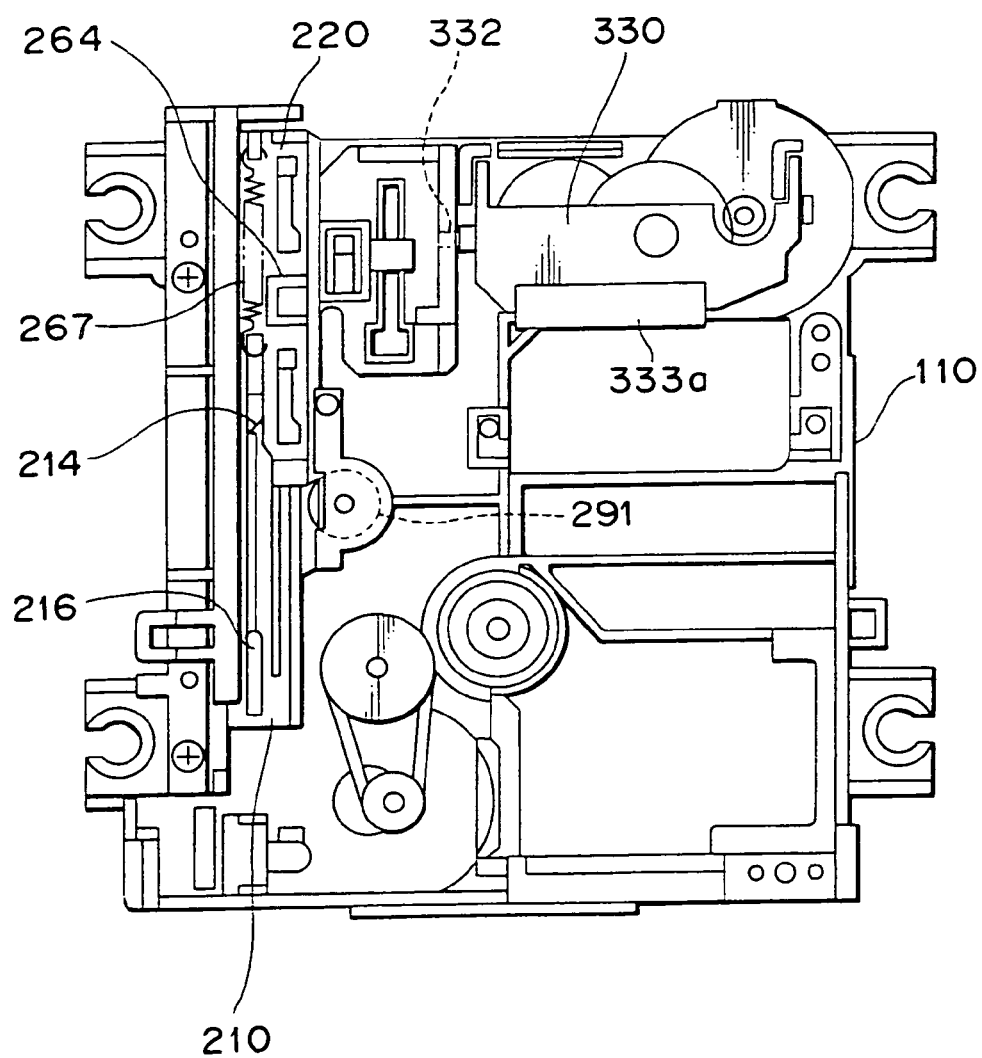
FIG. 46 is a plan view showing an essential portion of the mode formation portion at the loading ended position.

Immediately before the carrying slider 15 reaches the deepest withdrawal position, the projecting piece 265 of the loading slider 220 is brought into contact with the rear end of the front side piece 211b to be pushed of the mode slider 210, and the projecting rib 256 of the loading slider 220 is moved forwardly from the position at which it blocks the engagement cutout 214 of the mode slider 210 (see FIGS. 44 and 45). Accordingly, during a period in which the carrying slider 150 is further moved up to the withdrawal position, the mode slider 210 is pulled forwardly by the loading slider 220 via the projecting rib 265 of the loading slider 220 and the front side piece 211b to be pushed of the mode slider 210, to be moved forwardly while the lock pin 231 of the lock piece 230 is removed outwardly from the engagement cutout 214. The mode slider 210 thus becomes a state immediately before the rack teeth 213 are meshed with the pinion 291 of the loading drive portion 290 (see FIG. 45). On the other hand, when the carrying slider 150 reaches the withdrawal position (see FIG. 19), the rack teeth 251 of the loading slider 220 are moved forwardly from the pinion 291, that is, the meshing of the rack teeth 251 with the pinion 291 is released, so that the forward movement of the loading slider 220 is stopped.

Figure 47:
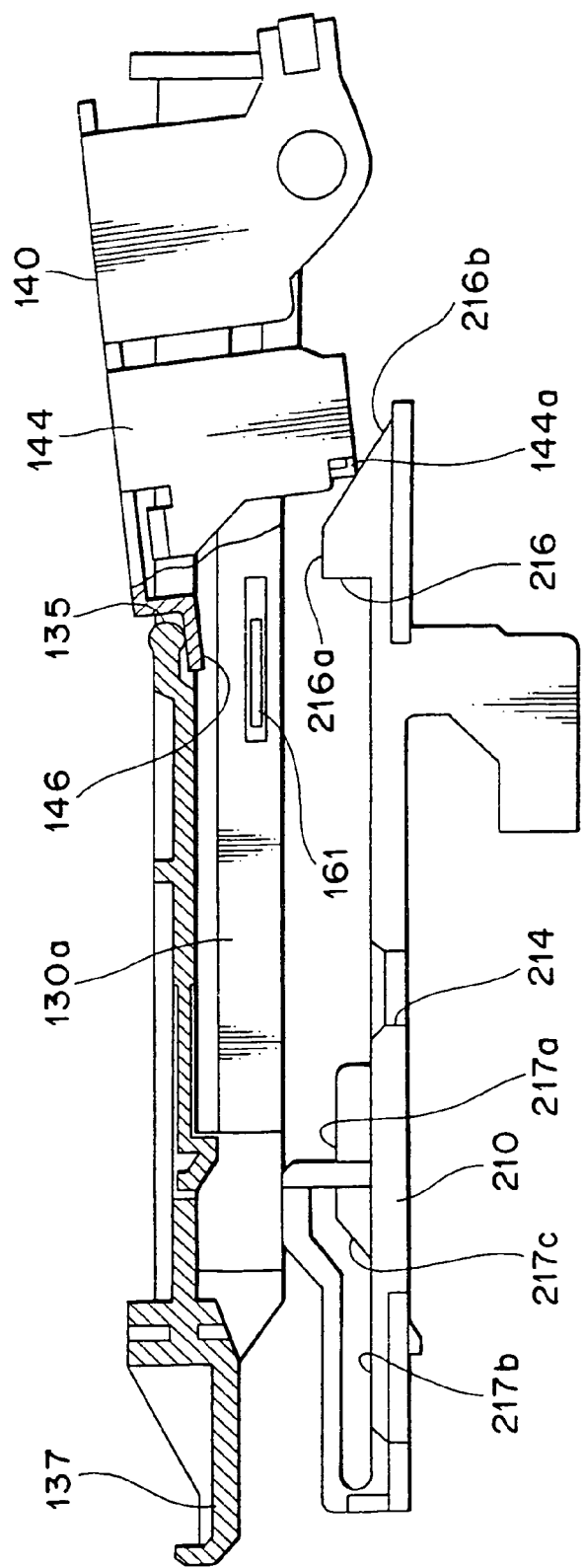
FIG. 47 is a left side view showing an essential portion of the mode formation portion at the loading ended position.
Figure 48:
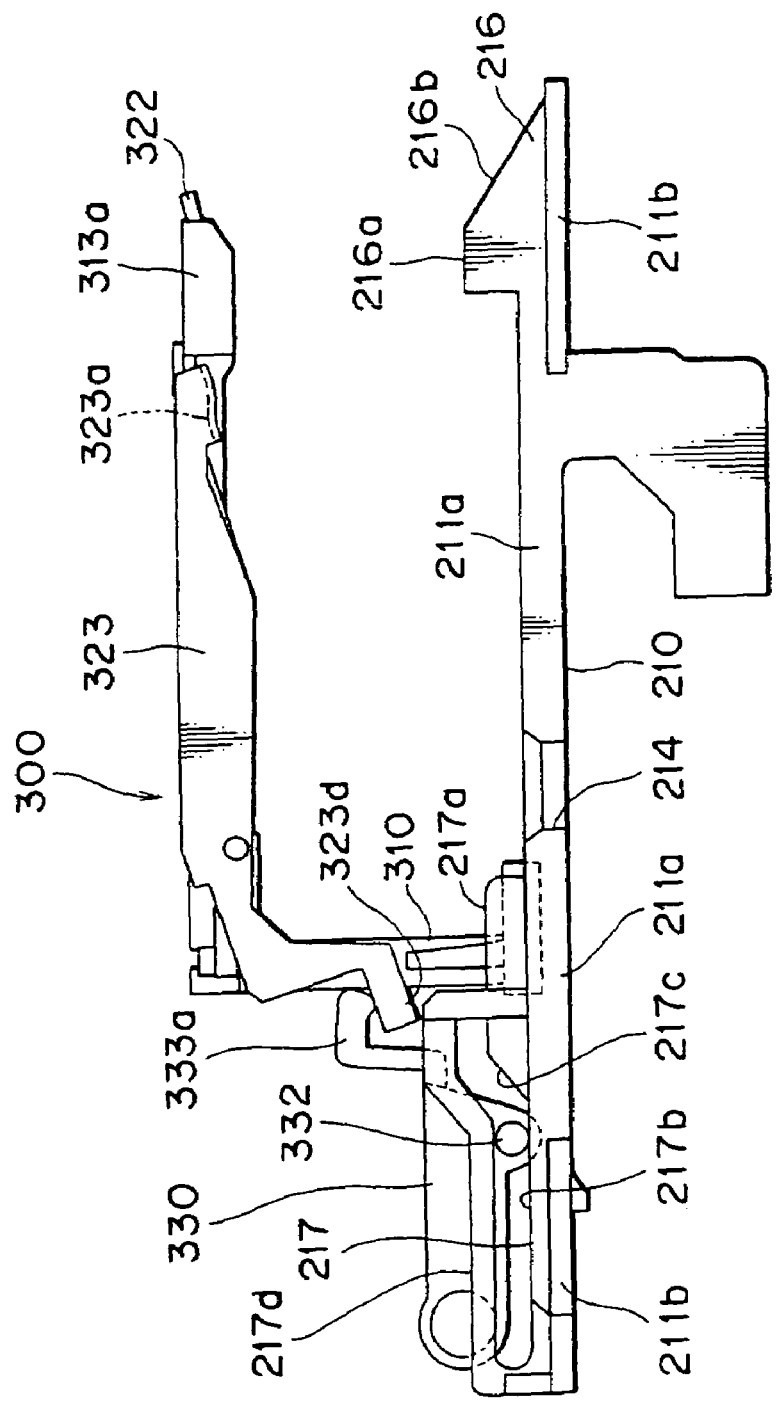
FIG. 48 is a left side view showing another essential portion of the mode formation portion at the loading ended position.
Figure 49:
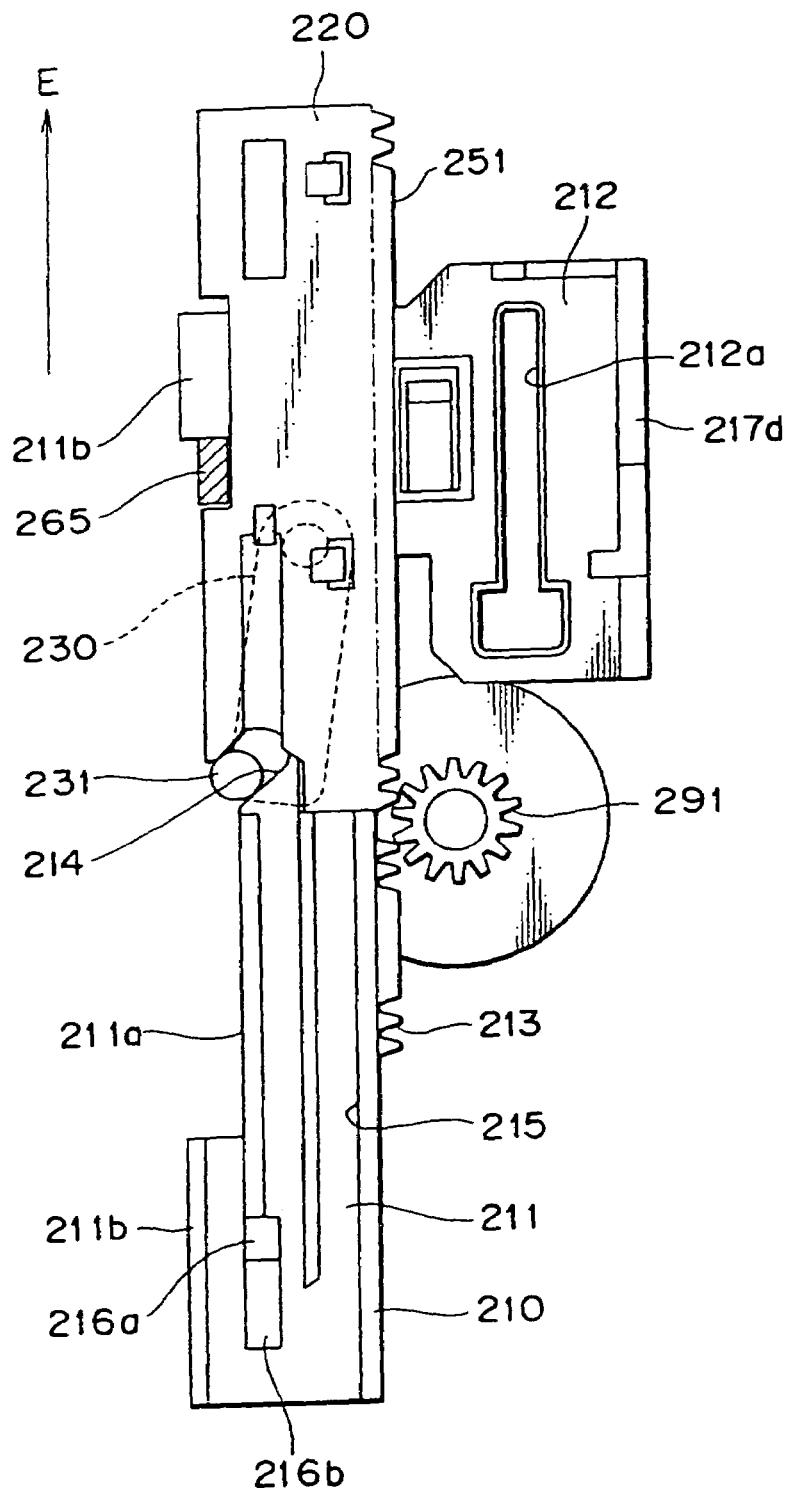
FIG. 49 is a plan view of the two sliders located at the loading ended positions.
Figure 50:
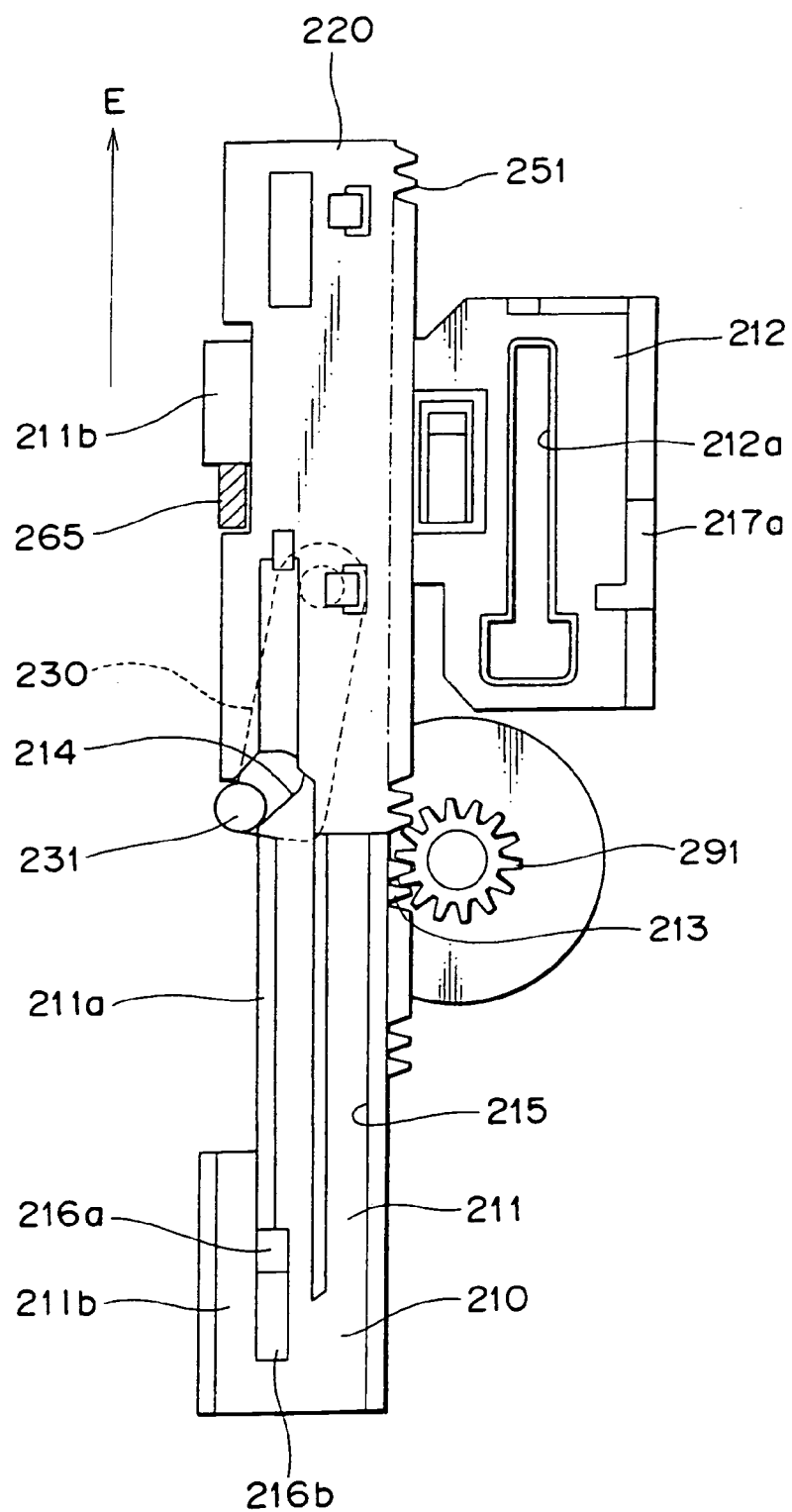
FIG. 50 is a plan view of the two sliders in the course of movement from the loading ended positions to recording positions.
Figure 51:
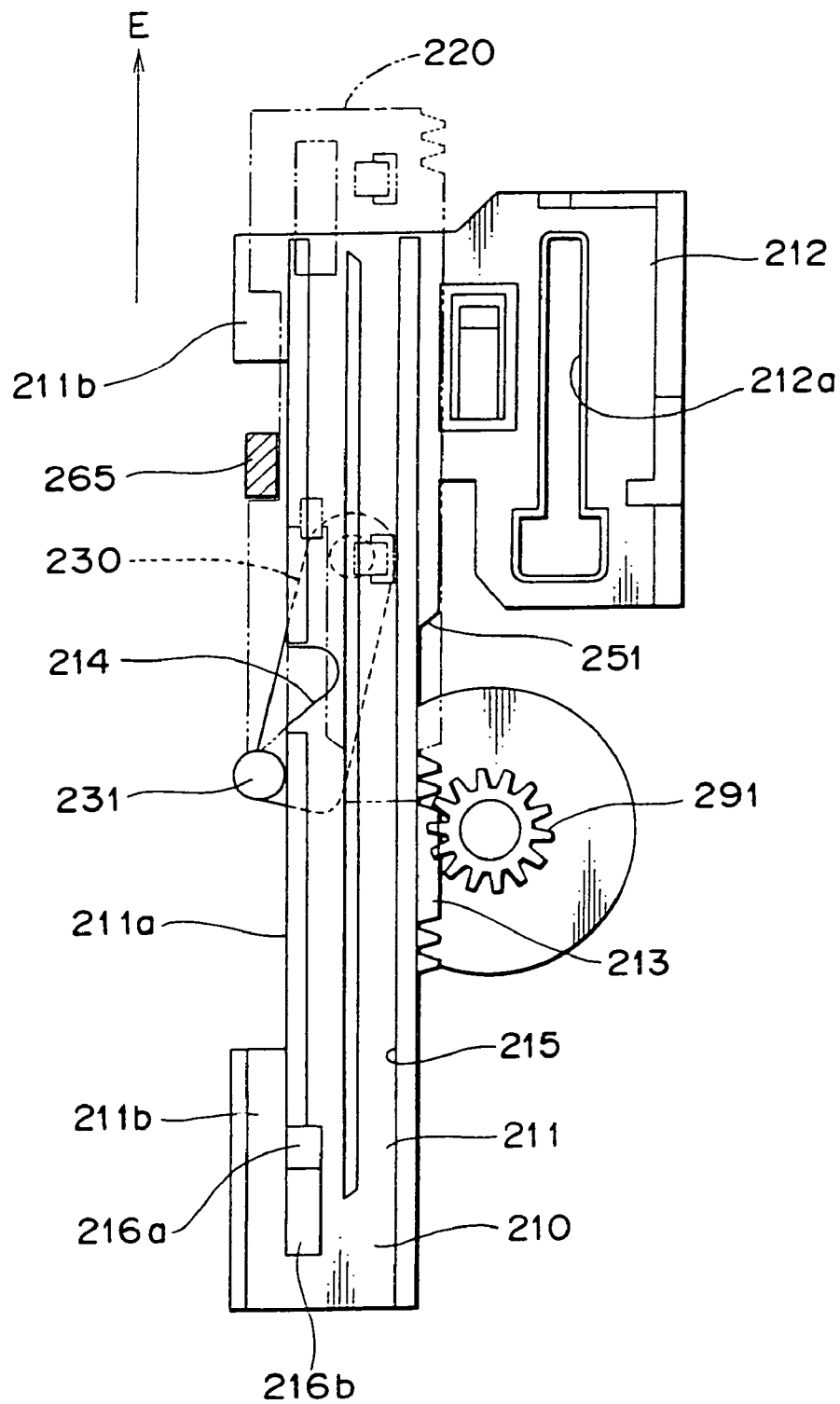
FIG. 51 is a plan view of the two sliders in a state being closer to the recording positions than those in the state shown in FIG. 50 in the course of movement from the loading ended positions to the recording positions.
Figure 52:
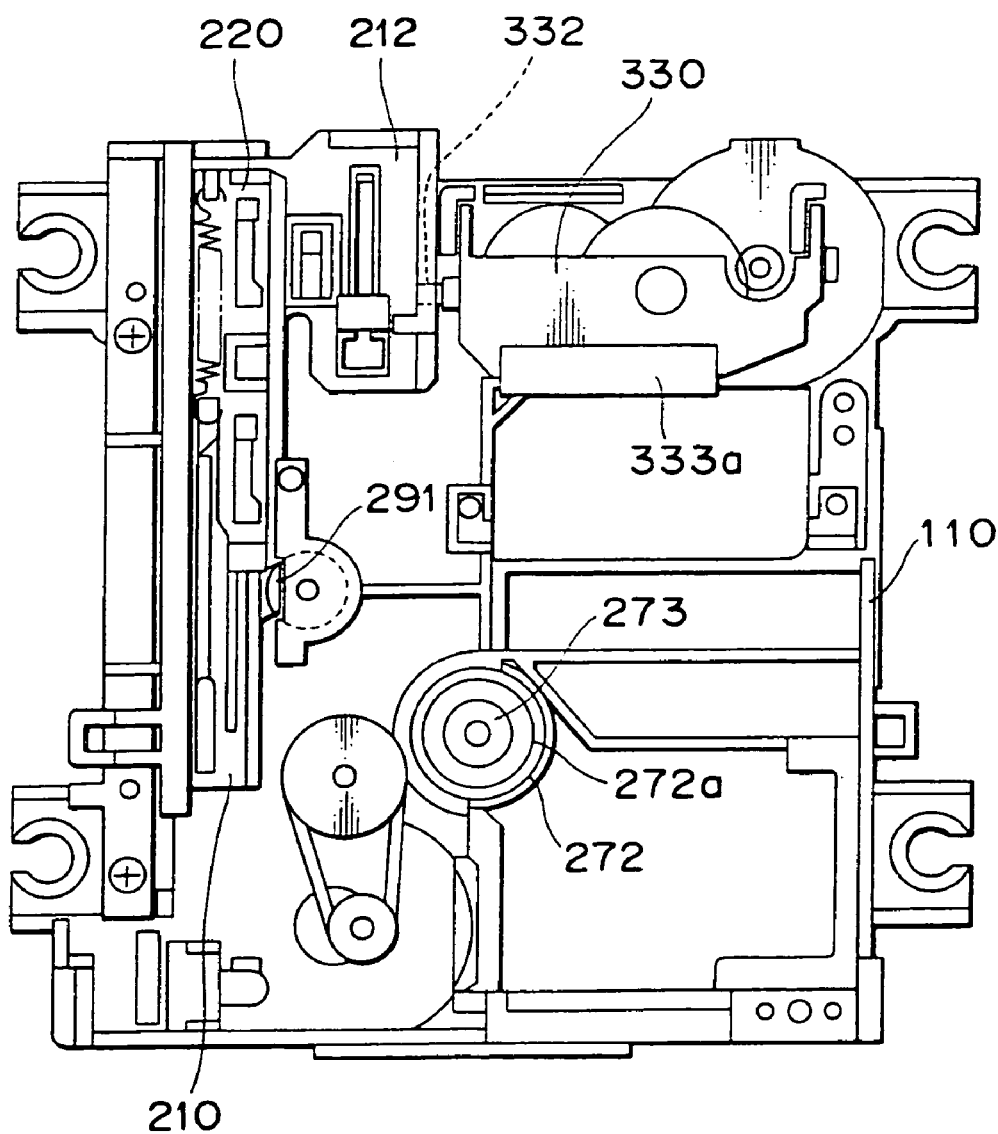
FIG. 52 is a plan view showing an essential portion of the mode formation mechanism located at the recording positions.
Figure 53:
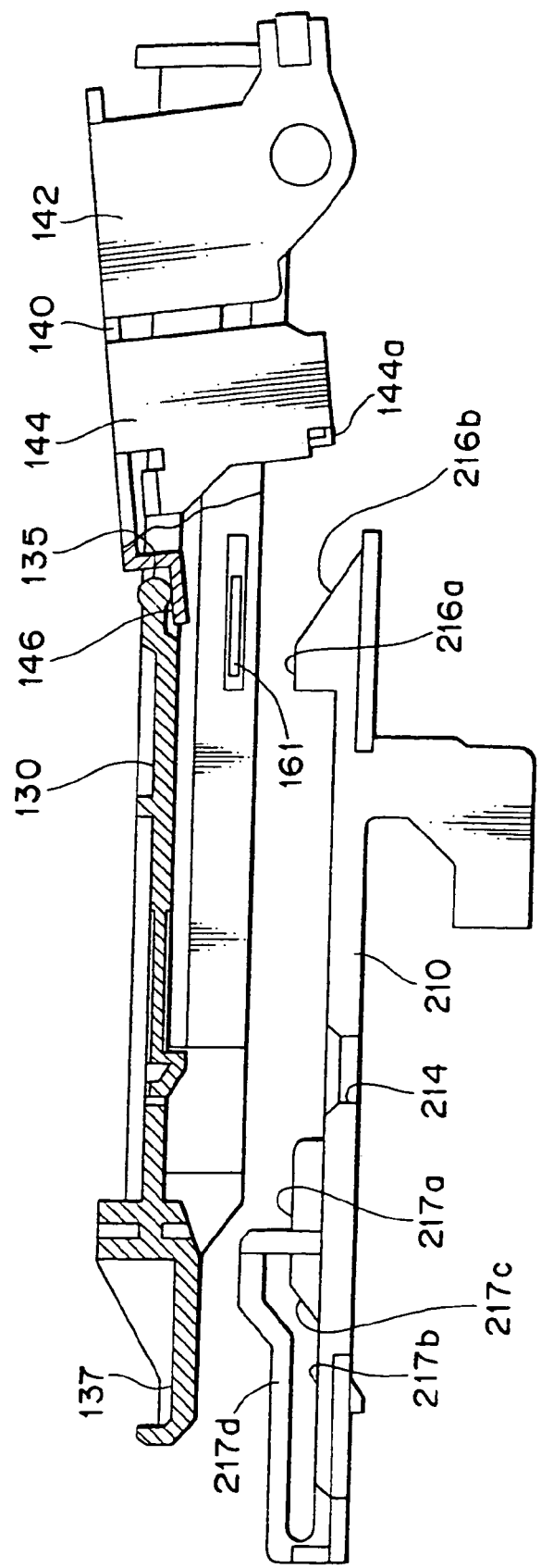
FIG. 53 is a left side view showing an essential portion of the mode formation mechanism located at the recording positions.
Figure 54:
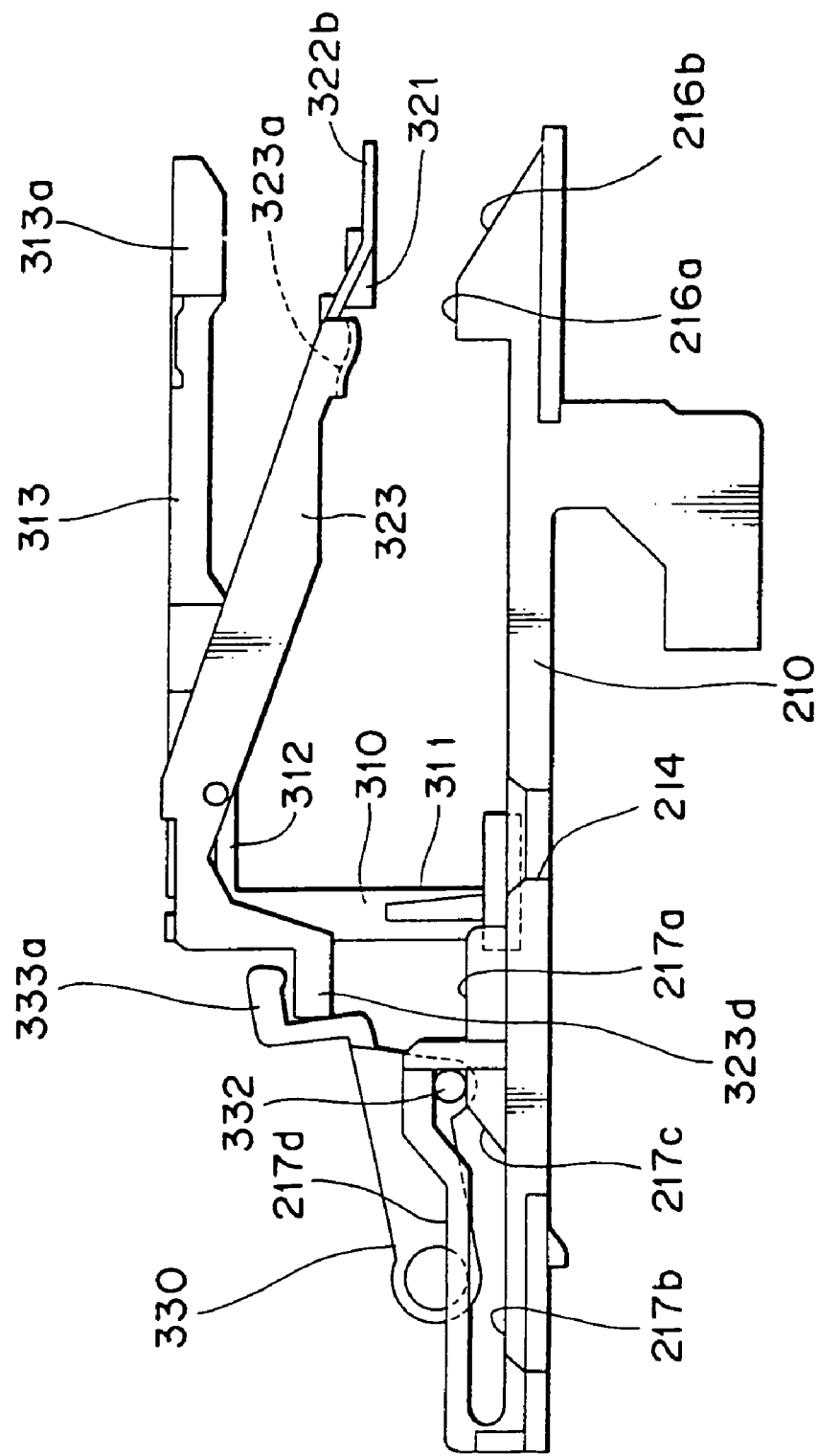
FIG. 54 is a left side view showing another essential portion of the mode formation mechanism located at the recording position.
Figure 55:
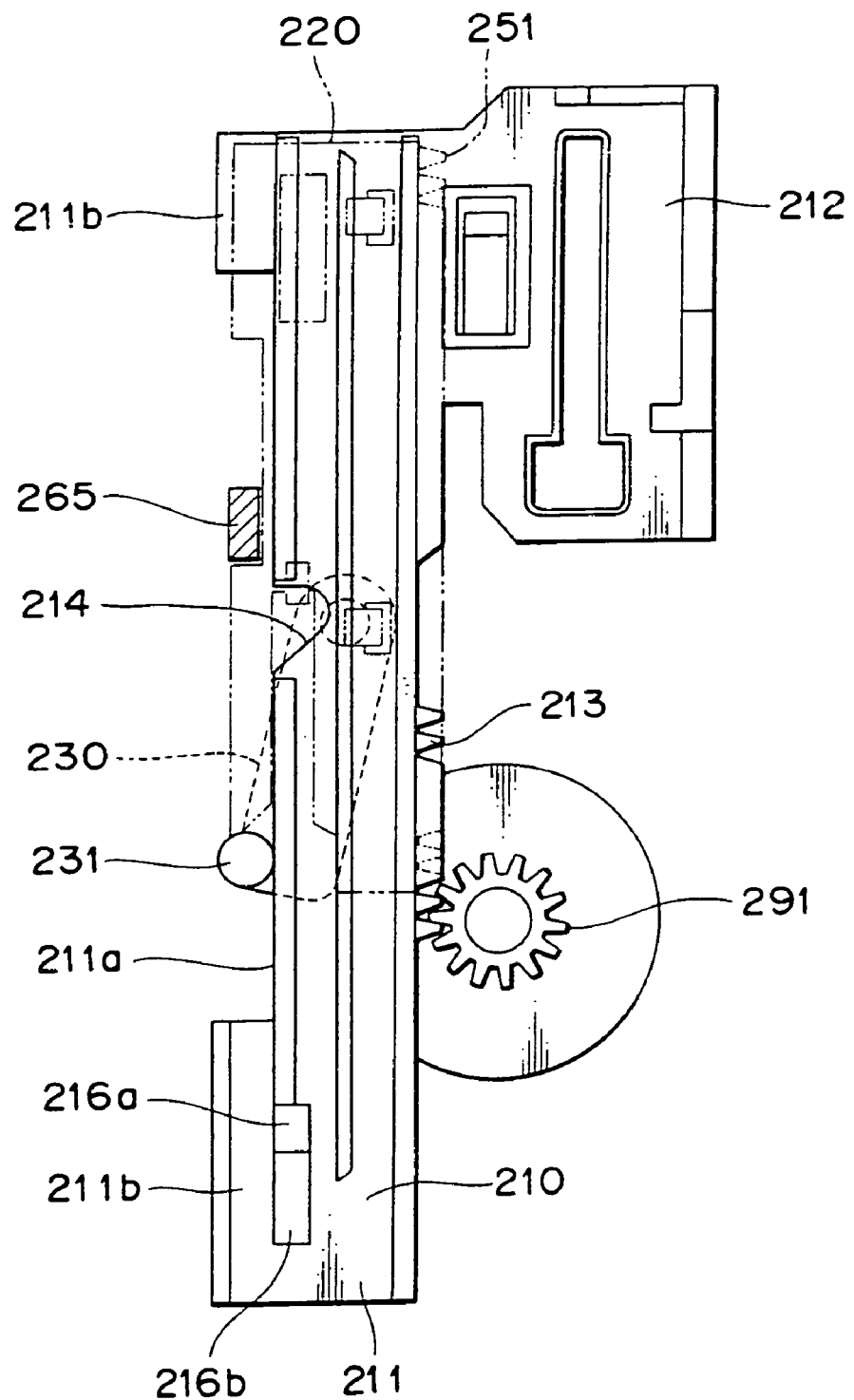
FIG. 55 is a plan view of the two sliders located at the recording positions.

The loading of the disk cartridge 1 in the main body of the recording and/or reproducing apparatus is performed by forward movement of only the mode slider 210. Such loading of the disk cartridge 1 will be described with reference to FIGS. 46 to 49. As the mode slider 210 is moved forwardly, the cam portion 216 integrally formed on the mode slider 210 is also moved forwardly, so that the restricting piece 144a formed on the connecting member 140 of the cartridge holder 120 is moved on the cam portion 216 from the rear end portion 216a to an approximately central portion of the tilt portion 216b (see FIG. 47). As a result, the connecting member 140 is turned, by the biasing force of the tensile coil spring 116, around the pins 142b and 143b supported by the supporting pieces 111 of the base chassis 110 in such a manner that the front end of the connecting member 140 is moved downwardly. The upper surface of the main support 130 of the cartridge holder 120 is pushed downwardly by the front end of the main portion 141 of the connecting member 140 turned downwardly. The main support 130 is thus moved downwardly with the left and right sliding pins 136 being guided in the guide grooves 112a of the guide columns 112 of the base chassis 110 and with the connecting piece 137 at the front end being guided in the engagement sliding hole 113a of the engagement piece 113 formed on the front end portion of the base chassis 110. Accordingly, the disk cartridge 1 supported by the cartridge holder 120 is moved downwardly together with the main support 130 (see FIG. 47). In this way, the turn table 272 of the disk rotation drive mechanism 270 relatively enters in the cartridge case 2 via the insertion port 3 of the disk cartridge 1 moved downwardly; the base portion 272a of the turn table 272 is fitted in the fitting recess 11b of the core 11 mounted at the central portion of the magneto-optical disk 10; and the core 11 is attracted by the chucking magnet 273 buried in the upper surface of the base portion 272a, whereby the magneto-optical disk 10 is mounted on the turn table 272.

The loading of the disk cartridge 1 including the withdrawal of the disk cartridge 1 in the main body of the recording and/or reproducing apparatus and the mounting of the magneto-optical disk 10 in the disk rotation drive mechanism 270 is thus ended.

The positions of the mode slider 210 and the loading slider 220 in the loading ended state are referred to as "loading ended positions".

In the case of reproducing signals from the magneto-optical disk 10, immediately after the loading of the disk cartridge 1 is ended as described, the spindle motor 271 is driven, to rotate the magneto-optical disk 10, and the optical pickup apparatus 281 is operated while being moved in the lateral direction, to irradiate a signal recording plane of the magneto-optical disk 10 with laser light and detect the light returned from the signal recording plane, whereby signals are reproduced from the magneto-optical disk 10.

The action of the recording and/or reproducing apparatus from the loading ended position to a recording position will be described with reference to FIGS. 38 and 39, and FIGS. 50 to 55.

In the case of recording signals on the magneto-optical disk 10, the mode slider 210 is further moved forwardly, and an overwriting magnetic head enters in the cartridge case 2 via a head insertion port 5, to be in contact with or in proximity to the back side (upper surface) of a portion, opposed to the objective lens 283, of the magneto-optical disk 10.

Figure 38:
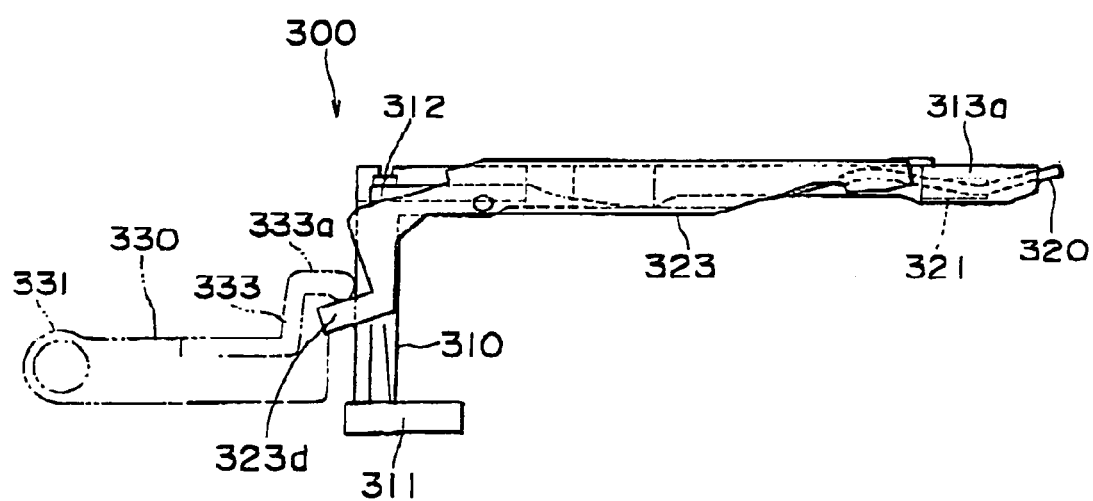
FIG. 38 is a left side view showing an overwriting head mechanism located at a standby position.
Figure 39:
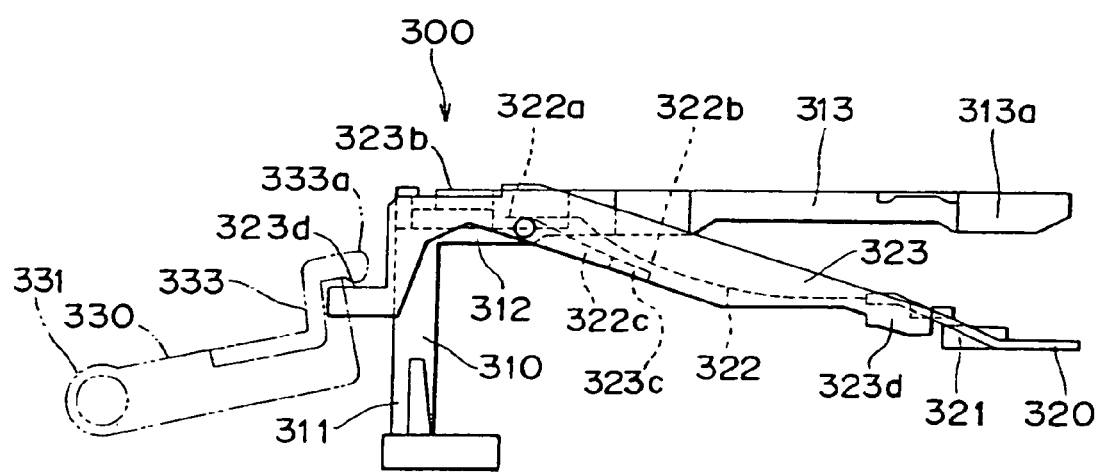
FIG. 39 is a left side view showing an overwriting head mechanism located at a recording position.
Figure 40:
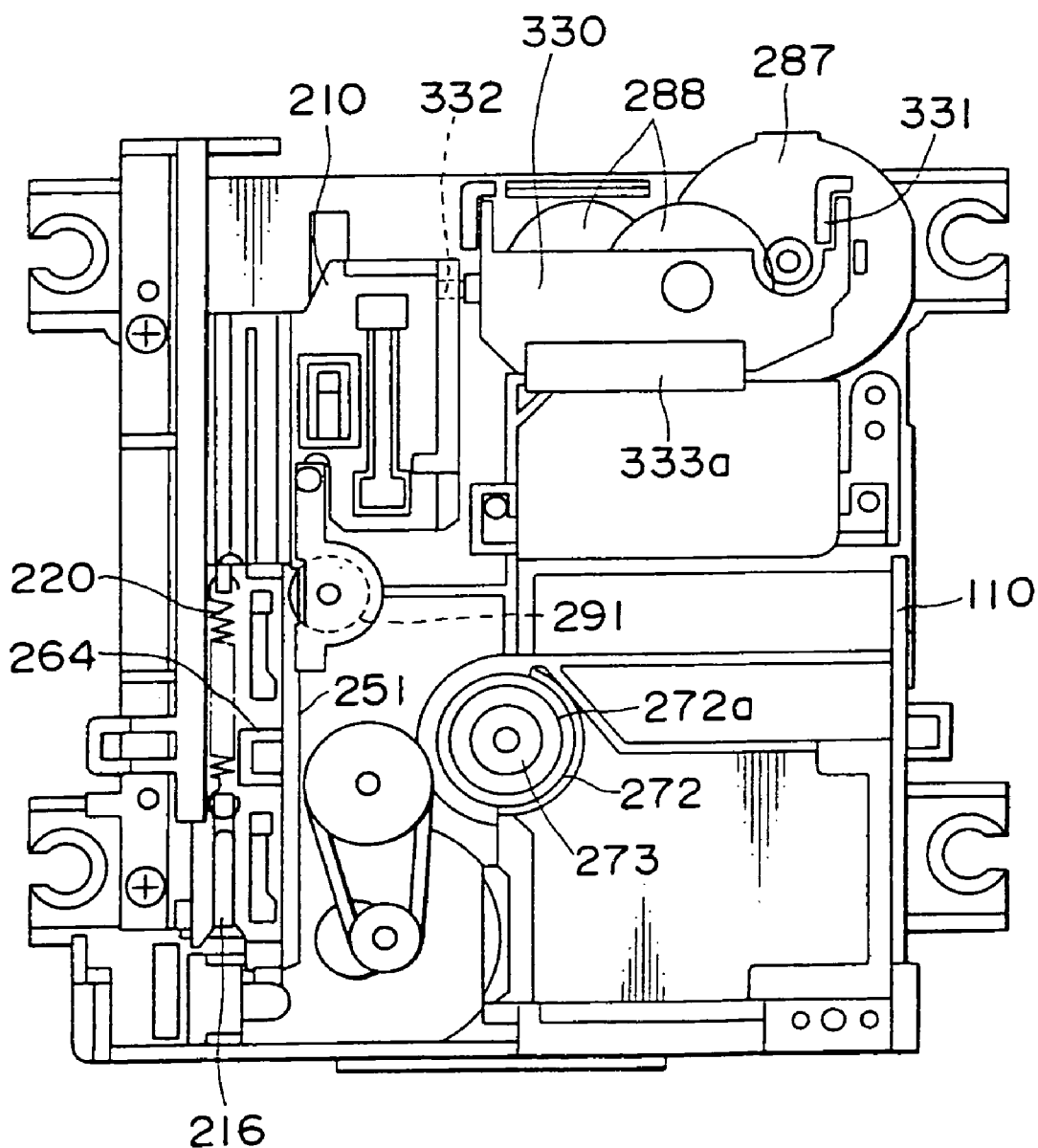
FIG. 40 is a plan view showing an essential portion of a mode formation mechanism located at an initial position.
Figure 41:
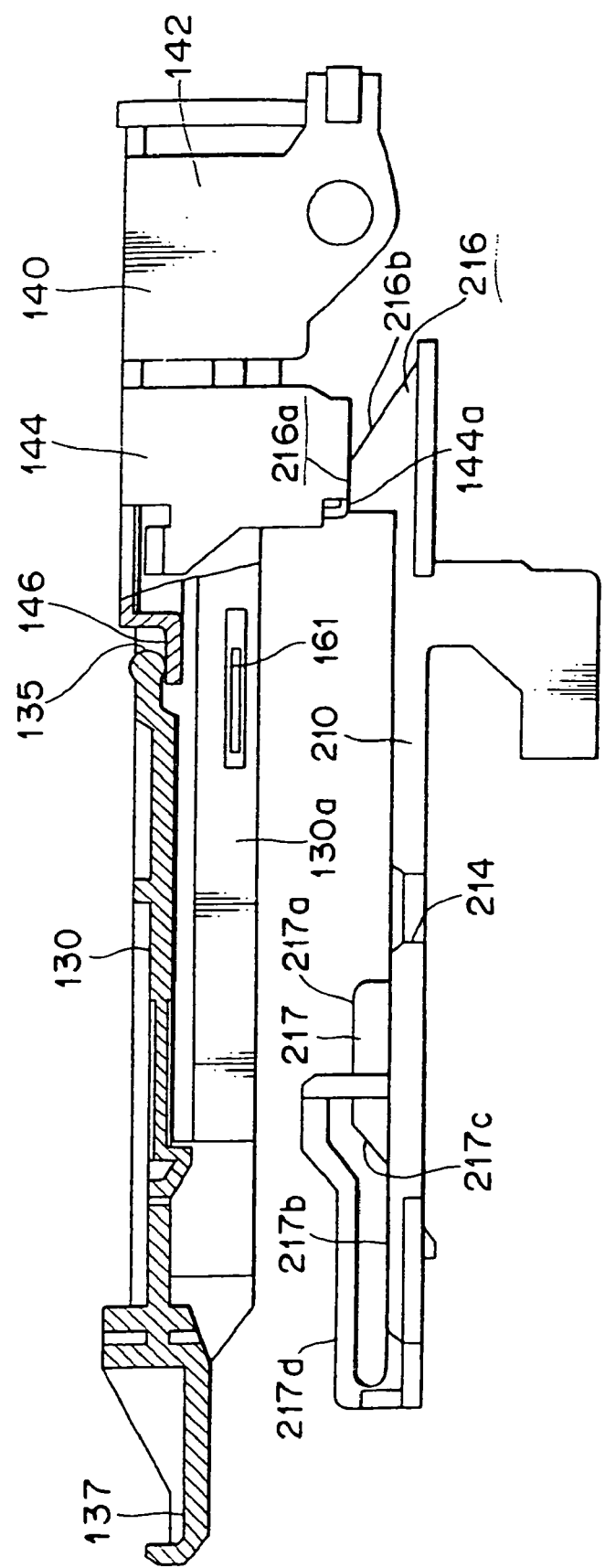
FIG. 41 is a left side view showing an essential portion of the mode formation mechanism located at the initial position.
Figure 42:
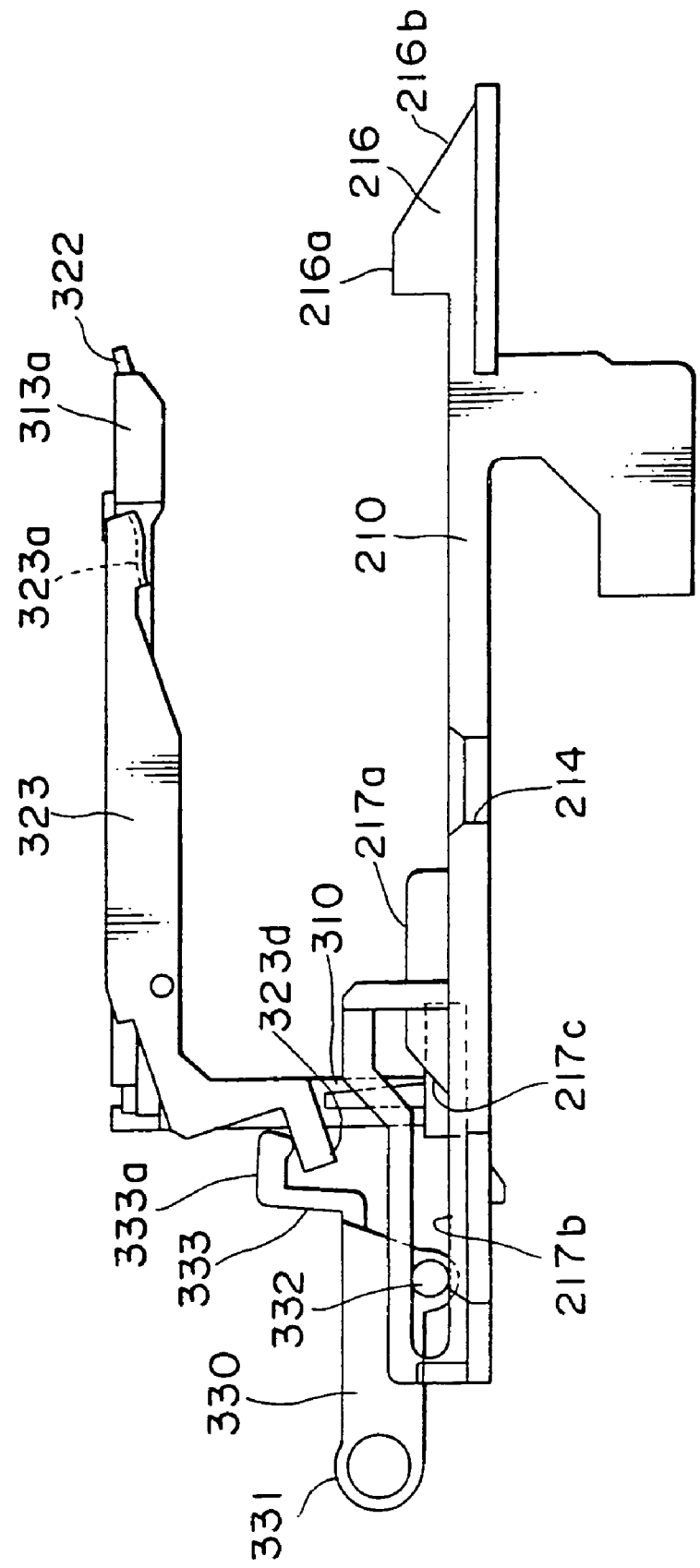
FIG. 42 is a left side view showing another essential portion of the mode formation mechanism located at the initial position.

An overwriting head mechanism 300 provided on the base chassis 110 will be described in detail with reference to FIGS. 38 and 39.

The overwriting head mechanism 300 has a connecting base body 310. The connecting base body 310 made from a synthetic resin is formed into a plate shape extending substantially in the vertical direction. The connecting base body 310 integrally includes a connecting portion 311 having a lower end portion fixed to a front end portion of the slide base 282 of the optical pickup apparatus 281, a head supporting portion 312 projecting rearwardly from the upper end of the connecting portion 311, and a restricting arm 313 projecting rearwardly from a right end portion of an upper end portion of the connecting portion 311. A contact portion 313a projecting leftwardly is formed on a rear end portion of the restricting arm 313.

A magnetic head device 320 is supported on the head supporting portion 312 of the connecting base body 310. The magnetic head device 320 includes a head supporting arm 322 for supporting, on its tip side, a magnetic head 321, and an arm supporting plate 323 for supporting the back side of the head supporting arm 322. The head supporting arm 322 is formed by punching an elastic thin metal plate made from phosphor bronze. The head supporting arm 322 integrally includes a base portion 322a, an arm portion 322b projecting rearwardly from the base portion 322a, and an elastic portion 322c projecting rearwardly leftwardly from a left end portion of the base portion 322a. The elastic portion 322c is shorter than the arm portion 322b. The base portion 322a is fixed on the upper surface of the head supporting portion 312 of the connecting base portion 310; the arm portion 322b and the elastic portion 322c are tilted rearwardly, downwardly; and the magnetic head 321 is supported on the tip portion of the arm portion 322b.

The arm supporting plate 323 made from a synthetic resin extends longer in the longitudinal direction. A portion, near the front end, of the arm supporting plate 323 is vertically turnably supported on the left side surface of a tip portion of the head supporting portion 312 of the connecting base body 310. A supporting piece 323a projecting rightwardly is formed on the rear end of the arm supporting plate 323. The supporting piece 323a supports the back surface of a tip portion of the arm portion 322b of the head supporting arm 322. A pressing piece 323b projects rightwardly from the upper surface of the portion, turnably supported by the head supporting portion 312, of the arm supporting plate 323. The pressing piece 323b presses, from above, the base portion 322a of the head supporting arm 322. A spring catch piece 323c is formed on a portion, slightly offset rearwardly from the portion turnably supported, of the arm supporting plate 323. A tip portion of the elastic portion 322c of the head supporting arm 322 is brought into elastic-contact with the upper surface of the spring catch piece 323c. Since the elastic portion 322c of the head supporting arm 322 is brought into elastic-contact with the spring catch piece 323c and the arm portion 322b of the head supporting arm 322 is brought into elastic-contact with the supporting piece 323a, the arm supporting plate 323 is biased such that a rear end portion thereof is moved downwardly. A piece 323d to be operated projects downwardly from a front end portion of the arm supporting plate 323. The piece 323d is viewed as L-shaped from the right side.

A head shift plate 330 is vertically turnably disposed on a right side portion of a front end portion of the base chassis 110. The head shift plate 330 made from a synthetic resin is formed into a plate shape longer in the approximately lateral direction. Pieces 331 to be supported, projecting forwardly from left and right side ends of the head shift plate 330 are vertically turnably supported on the front end portion of the base chassis 110. An operating pin 332 projects leftwardly from the left side edge of the head shift plate 330. The operating pin 332 is placed on the upper edge of the cam portion 217 formed on the mode slider 210. In addition, an auxiliary piece 217d is positioned immediately over the operating pin 332 placed on the upper edge of the cam portion 217 for preventing the operating pin 332 from being removed from the upper edge of the cam portion 217. A restricting piece 333 projects upwardly from the rear edge of the head shift plate 330. The restricting piece 333 is viewed substantially as inverse L-shaped from the right side. The piece 323d to be operated of the arm supporting plate 323 of the magnetic head device 320 is brought into elastic-contact with the back surface of an upper side 333a of the restricting piece 333.

During a period in which the mode slider 210 is moved from the initial position to the loading ended position, the operating pin 332 of the head shift plate 330 is kept as placed on the low level portion 217b of the cam portion 217 formed on the mode slider 210. As a result, the rear end of the head shift plate 330 is kept as located on the lower side. Accordingly, the rear end of the arm supporting plate 323 whose piece 323d pushed downwardly by the restricting piece 333 of the head shift plate 330 is kept as located on the upper side, and the rear end portion, whose back surface is supported by the supporting piece 323a of the arm supporting plate 323, of the arm portion 322b of the head supporting arm 322 is kept as located on the upper side. Consequently, the magnetic head 321 supported by the rear end portion of the arm portion 322b of the head supporting arm 322 is located at a position being not in contact with or in proximity to the magneto-optical disk 10.

In the case of recording signals on the magneto-optical disk 10, the mode slider 210 is further moved forwardly from the loading ended position. As the mode slider 210 is further moved forwardly from the loading ended position, the operating pin 332 of the head shift plate 330 is relatively moved on the upper edge of the cam portion 217 from the low level portion 217b to the tilt portion 217c (see FIG. 54). As the operating pin 332 is moved on the tilt portion 217c toward the high level portion 217a, the rear end portion of the head shift plate 330 is pushed up via the operating pin 332, whereby the restricting piece 333 is moved upwardly. Accordingly, the arm supporting plate 323 is turned by the biasing force applied thereto in such a manner that the rear end portion thereof is moved downwardly, and thereby the rear end portion of the arm portion 322b of the head supporting arm 322 is moved downwardly and the magnetic head 321 supported by the rear end portion of the arm portion 322b is also moved downwardly (see FIG. 54). When the operating pin 332 of the head shift plate 330 reaches the high level portion 217a of the cam portion 217, the magnetic head 321 is located at the lowest position. In such a lowest position, the magnetic head 321 enters in the cartridge case 2 through the head insertion port 5 of the disk cartridge 1, to be thus in contact with or in proximity to a portion, to be irradiated with laser light emitted from the optical pickup mechanism 280, of the upper surface of the magneto-optical disk 10. In such a state, new signals are recorded on the signal recording plane of the magneto-optical disk 10 by irradiating the signal recording plane of the magneto-optical disk 10 with laser light having an intensity larger than that used for reproducing by the optical pickup mechanism 280 and also imparting a magnetic field to the signal recording plane of the magneto-optical disk 10 by the magnetic head 321. The recording of new signals is performed by moving the optical pickup mechanism 280 in the radial direction of the magneto-optical disk 10 and also moving the magnetic head 321 together with the optical pickup mechanism 280.

After the recording of new signals on the magneto-optical disk 10 is ended, the drive motor 292 of the loading drive portion 290 is driven in the unloading direction, to rotate the pinion 291 counterclockwise as viewed from above via the transmission gear row 293. As a result, the mode slider 210 whose rack teeth 213 are meshed with the pinion 291 is first moved rearwardly, that is, toward the above-described loading ended position. As the mode slider 210 is moved toward the loading ended position, the operating pin 332 of the head shift plate 330 is moved on the upper edge of the cam portion 217 of the mode slider 210 from the high level portion 217a to the low level portion 217b via the tilt portion 217c, whereby the head shift plate 330 is turned downwardly and the restricting piece 333 is moved downwardly. Accordingly, the piece 323d to be operated of the arm supporting plate 323 is pushed downwardly by the upper side 333a of the restricting piece 333, and thereby the arm supporting plate 323 is turned such that the rear end thereof is moved upwardly. The rear end portion of the arm portion 322b of the head supporting arm 322 is moved upwardly by the supporting piece 323a of the arm supporting plate 323 turned with its rear end moved upwardly. As a result, the magnetic head 321 supported by the rear end portion of the arm portion 322b of the head supporting arm 322 is moved upwardly, to be thus separated upwardly from the upper surface of the magneto-optical disk 10. In addition, if a forward movement force is further applied to the rear end portion of the arm portion 322b of the head supporting arm 322 made from an elastic material for some reason, since the contact portion 313a of the restricting arm 313 of the connecting base body 310 is positioned immediately over the rear end portion of the arm portion 322b of the head supporting arm 322 and the rear end portion of the arm portion 322b of the head supporting arm 322 is brought into contact with the contact portion 313a, the rear end portion of the arm portion 322b is prevented from being excessively moved upwardly.

In this way, during the period in which the mode slider 210 is moved from the front end of the movement range to the loading ended position, the magnetic head 321 is separated from the upper surface of the magneto-optical disk 10 and is removed upwardly from the cartridge case 2 to be returned to the standby position.

The ejection of the disk cartridge 1 will be described in detail below.

When the operation for ejecting the disk cartridge 1, that is, the ejecting operation is performed, the drive motor 292 of the loading drive portion 290 is driven in the unloading direction, to rotate the pinion 291 counterclockwise as viewed from above via the transmission gear row 293. With this rotation of the pinion 291, the mode slider 210 whose rack teeth 213 are meshed with the pinion 291 is first moved rearwardly, that is, toward the initial position. As the mode slider 210 is moved toward the initial position, the restricting piece 144a of the connecting member 140 of the cartridge holder 120 reaches the rear end portion 216b of the cam portion 216 via the tilt portion 216a of the other cam portion 216 of the mode slider 210. When the restricting piece 144a reaches the rear end portion 216b of the cam portion 216 via the tilt portion 216a of the cam portion 216, the connecting member 140 is turned against the biasing force of the tensile coil spring 116 such that the front end thereof is moved upwardly, and the back surface of the portion, near the rear end, of the main support 130 of the cartridge holder 120 is pushed upwardly by the front end of the connecting member 140. As a result, the main support 130 is moved upwardly. Along with the upward movement of the main support 130 of the cartridge holder 120, the core 11 of the magneto-optical disk 10 is separated upwardly from the turn table 272 of the disk rotation drive mechanism 270.

When the mode slider 210 is moved up to a position immediately before the initial position, the rear end of the front side piece 211b to be pushed of the mode slider 210 is brought into contact with the front edge of the projecting rib 265 of the loading slider 220. As the mode slider 210 is moved from such a position to the initial position, the loading slider 220 is slightly moved rearwardly and thereby the rack teeth 251 of the loading slider 220 are meshed with the pinion 291 of the loading drive portion 290, and further, the lock pin 231 of the lock piece 230 is pushed leftwardly by the tilt surface 256b at the rear end of the projecting rib 256 of the loading slider 220 to be engaged in the engagement cutout 214 of the mode slider 210, whereby the mode slider 210 is locked at the initial position. After that, the loading slider 220 whose rack teeth 251 are meshed with the pinion 291 is moved rearwardly, that is, toward the initial position by the rotation of the pinion 291.

As the loading slider 220 is moved toward the initial position, the carrying slider 150 connected to the loading slider 220 via the connecting column 264 and the connecting piece 157 is moved rearwardly, that is, toward the standby position. During the period in which the carrying slider 150 is moved toward the standby position, the shutter 6, located at the open position, of the disk cartridge 1, is relatively pulled forwardly by the shutter closing piece 162 engaged in the engagement hole 6d, to be moved to the close position. When the shutter 6 is returned to the close position, the front side tilt edge 162a of the shutter closing piece 162 is slid on the front side opening edge of the engagement hole 6d to be moved rightwardly, with a result that the engagement of the shutter closing piece 162 in the engagement hole 6d is released. The shutter closing piece 162 is further slid on the outer (right) side surface of the intermediate portion 6c of the shutter 6 to be relatively moved forwardly, and then removed from the shutter 6. When the carrying slider 150 reaches the standby position, the loading slider 220 also reaches the initial position, and the drive motor 292 of the loading drive portion 290 is stopped.

When the carrying slider 150 reaches the standby position, most of the disk cartridge 1 excluding the front end portion projects from the rear end of the cartridge holder 120. When the disk cartridge 1 is pulled out of the cartridge holder 120 by an operator gripping the projecting portion thereof with his or her fingers, the engagement projection 183b of the lock lever 180 and the engagement projection 193 of the click member 190 are removed from the cutouts 9 of the disk cartridge 1. In this way, the disk cartridge 1 can be easily pulled out of the cartridge holder 120.

When the disk cartridge 1 is pulled out of the cartridge holder 120, the lock lever 180 is turned clockwise as viewed from above, that is, in the direction CW, so that the lock pin 181a of the first arm piece 181 is engaged in the lock portion 132a formed at the rear end of the sliding groove 132 of the main support 130; the lock projection 193a of the third arm piece 183 is engaged in the engagement hole 130d formed in the left side wall 130c; and the lock member 170 is turned downwardly and thereby the lock claw 173 of the lock member 170 is engaged in the hole 156a to be locked of the carrying slider 150, whereby the carrying slider 150 is locked at the standby position.

While the preferred embodiments of the present invention have been described using the specific terms, such description is for illustrative purposes only, and it is to be understood that changes and variations may be made without departing from the spirit or scope of the following claims.

What is claimed is:

1. A recording medium cartridge holder in which a recording medium cartridge containing a recording medium and having a flat cartridge case of rectangular shape having a long side and short side is inserted with the long side directed forwardly in an insertion direction, said recording medium cartridge holder comprising:

a main support portion;

a carrying portion supported on said main support portion so as to be movable from a standby position to a withdrawal position for withdrawing said recording medium cartridge held at said standby position to said withdrawal position;

a lock portion for locking said carrying portion at said standby position;

a biasing spring for biasing said lock portion toward a locking position; and an insertion restricting portion for prohibiting passing of said recording medium cartridge inserted in an orientation other than a predetermined orientation, wherein said lock portion is arranged directly above said insertion restricting portion, and wherein said lock portion releases the locking of said carrying portion by said recording medium cartridge passing through said insertion restricting portion.

* * * * *